(12) United States Patent
Matsuoka et al.

(10) Patent No.: US 9,791,839 B2
(45) Date of Patent: Oct. 17, 2017

(54) USER-RELOCATABLE SELF-LEARNING ENVIRONMENTAL CONTROL DEVICE CAPABLE OF ADAPTING PREVIOUS LEARNINGS TO CURRENT LOCATION IN CONTROLLED ENVIRONMENT

(71) Applicant: Google Inc., Mountain View, CA (US)

(72) Inventors: Yoky Matsuoka, Palo Alto, CA (US); Daniel A. Warren, San Francisco, CA (US); Anthony M. Fadell, Woodside, CA (US); Matthew L. Rogers, Los Gatos, CA (US); Helen Vo, San Carlos, CA (US)

(73) Assignee: Google Inc., Mountain View, CA (US)

( * ) Notice: Subject to any disclaimer, the term of this patent is extended or adjusted under 35 U.S.C. 154(b) by 603 days.

(21) Appl. No.: 14/229,659

(22) Filed: Mar. 28, 2014

(65) Prior Publication Data

US 2015/0276238 A1 Oct. 1, 2015

(51) Int. Cl.
*G05B 15/02* (2006.01)
*F24F 11/00* (2006.01)
(Continued)

(52) U.S. Cl.
CPC ......... *G05B 15/02* (2013.01); *F24D 19/1018* (2013.01); *F24D 19/1048* (2013.01);
(Continued)

(58) Field of Classification Search
None
See application file for complete search history.

(56) References Cited

U.S. PATENT DOCUMENTS 3,159,212 A 12/1964 Patrick
4,528,459 A 7/1985 Wiegel
(Continued)

FOREIGN PATENT DOCUMENTS

EP 447458 9/1991
EP 510807 10/1992
(Continued)

OTHER PUBLICATIONS

Aprilaire Electronic Thermostats Model 8355 User's Manual, Research Products Corporation, Dec. 2000, 16 pages.
(Continued)

*Primary Examiner* — Tuan Dao
(74) *Attorney, Agent, or Firm* — Kilpatrick Townsend & Stockton LLP

(57) ABSTRACT

A thermostat device may include a processing system configured to learn a heating schedule at a first location according to an automated schedule learning algorithm that processes inputs including user inputs and occupancy sensing inputs and derives schedule-affecting parameters therefrom that are processed to compute the heating schedule. The processing system may also be configured to determine whether the thermostat has been moved to a new location, and if it is determined that the thermostat has been moved to the new location, then determine one or more parameters associated with the new location and establish a new heating schedule for the new location, and where zero or more of the previously measured schedule-affecting parameters are re-used based on the one or more parameters associated with the new location.

20 Claims, 50 Drawing Sheets

(51) Int. Cl.
*G05D 23/19* (2006.01)
*F24D 19/10* (2006.01)
*G06Q 50/06* (2012.01)
*H04L 12/28* (2006.01)
*G06N 99/00* (2010.01)

(52) U.S. Cl.
CPC .......... *F24D 19/1081* (2013.01); *F24F 11/00* (2013.01); *F24F 11/006* (2013.01); *G05D 23/1905* (2013.01); *G05D 23/1934* (2013.01); *G06Q 50/06* (2013.01); *H04L 12/2816* (2013.01); *F24D 2220/04* (2013.01); *F24F 2011/0071* (2013.01); *F24F 2011/0075* (2013.01); *G05B 2219/2614* (2013.01); *G05B 2219/2642* (2013.01); *G06N 99/005* (2013.01); *H04L 2012/285* (2013.01); *Y02B 30/762* (2013.01)

(56) References Cited

U.S. PATENT DOCUMENTS

| | | |
|---|---|---|
| 4,898,229 A | 2/1990 | Brown et al. |
| 4,948,040 A | 8/1990 | Kobayashi et al. |
| 5,065,813 A | 11/1991 | Berkeley et al. |
| 5,107,918 A | 4/1992 | McFarlane et al. |
| 5,161,606 A | 11/1992 | Berkeley et al. |
| 5,181,389 A | 1/1993 | Hanson et al. |
| 5,251,813 A | 10/1993 | Kniepkamp |
| 5,381,950 A | 1/1995 | Aldridge |
| 5,422,808 A | 6/1995 | Catanese, Jr. et al. |
| 5,452,762 A | 9/1995 | Zillner, Jr. |
| 5,456,407 A | 10/1995 | Stalsberg et al. |
| 5,460,327 A | 10/1995 | Hill et al. |
| 5,462,225 A | 10/1995 | Massara et al. |
| 5,467,921 A | 11/1995 | Shreeve et al. |
| 5,570,837 A | 11/1996 | Brown et al. |
| 5,595,342 A | 1/1997 | McNair et al. |
| 5,611,484 A | 3/1997 | Uhrich |
| 5,635,896 A | 6/1997 | Tinsley et al. |
| 5,646,349 A | 7/1997 | Twigg et al. |
| 5,655,709 A | 8/1997 | Garnett et al. |
| 5,808,294 A | 9/1998 | Neumann |
| 5,918,474 A | 7/1999 | Khanpara et al. |
| 5,950,709 A | 9/1999 | Krueger et al. |
| 6,089,310 A | 7/2000 | Toth et al. |
| 6,102,749 A | 8/2000 | Lynn et al. |
| 6,213,404 B1 | 4/2001 | Dushane et al. |
| 6,315,211 B1 | 11/2001 | Sartain et al. |
| 6,336,593 B1 | 1/2002 | Bhatnagar |
| 6,356,038 B2 | 3/2002 | Bishel |
| 6,513,723 B1 | 2/2003 | Mueller et al. |
| 6,622,925 B2 | 9/2003 | Carner et al. |
| 6,623,311 B1 | 9/2003 | Dehan |
| 6,798,341 B1 | 9/2004 | Eckel et al. |
| 6,851,621 B1 | 2/2005 | Wacker et al. |
| 6,851,967 B2 | 2/2005 | Miyoshi et al. |
| 6,956,463 B2 | 10/2005 | Crenella et al. |
| 6,997,390 B2 | 2/2006 | Alles |
| 7,055,759 B2 | 6/2006 | Wacker et al. |
| 7,083,109 B2 | 8/2006 | Pouchak |
| 7,156,318 B1 | 1/2007 | Rosen |
| 7,167,079 B2 | 1/2007 | Smyth et al. |
| 7,174,239 B2 | 2/2007 | Butler et al. |
| 7,181,317 B2 | 2/2007 | Amundson et al. |
| 7,360,370 B2 | 4/2008 | Shah et al. |
| 7,476,988 B2 | 1/2009 | Mulhouse et al. |
| 7,510,126 B2 | 3/2009 | Rossi et al. |
| 7,537,171 B2 | 5/2009 | Mueller et al. |
| 7,562,536 B2 | 7/2009 | Harrod et al. |
| 7,571,865 B2 | 8/2009 | Nicodem et al. |
| 7,634,504 B2 | 12/2009 | Amundson |
| 7,648,077 B2 | 1/2010 | Rossi et al. |
| 7,673,809 B2 | 3/2010 | Juntunen |
| 7,748,640 B2 | 7/2010 | Roher et al. |
| 7,775,452 B2 | 8/2010 | Shah et al. |
| 7,841,542 B1 | 11/2010 | Rosen |
| 7,844,764 B2 | 11/2010 | Williams |
| 7,847,681 B2 | 12/2010 | Singhal et al. |
| 7,900,849 B2 | 3/2011 | Barton et al. |
| 8,067,912 B2 | 11/2011 | Mullin |
| 8,091,375 B2 | 1/2012 | Crawford |
| 8,594,850 B1 | 11/2013 | Gourlay et al. |
| 2003/0037555 A1 | 2/2003 | Street et al. |
| 2003/0090243 A1 | 5/2003 | Atherton |
| 2003/0213851 A1* | 11/2003 | Burd ...................... G05D 27/02 236/44 A |
| 2004/0130454 A1 | 7/2004 | Barton |
| 2004/0164238 A1 | 8/2004 | Xu et al. |
| 2004/0193324 A1 | 9/2004 | Hoog et al. |
| 2004/0238651 A1 | 12/2004 | Juntunen et al. |
| 2005/0040250 A1 | 2/2005 | Wruck |
| 2005/0043907 A1 | 2/2005 | Eckel et al. |
| 2005/0145705 A1 | 7/2005 | Shah et al. |
| 2005/0159846 A1 | 7/2005 | Van Ostrand et al. |
| 2005/0270151 A1 | 12/2005 | Winick |
| 2006/0186214 A1 | 8/2006 | Simon et al. |
| 2007/0045432 A1 | 3/2007 | Juntunen |
| 2007/0045441 A1 | 3/2007 | Ashworth et al. |
| 2007/0095082 A1 | 5/2007 | Garrett et al. |
| 2007/0105252 A1 | 5/2007 | Lee et al. |
| 2007/0131787 A1 | 6/2007 | Rossi et al. |
| 2007/0132503 A1 | 6/2007 | Nordin |
| 2007/0157639 A1 | 7/2007 | Harrod |
| 2007/0183475 A1 | 8/2007 | Hutcherson |
| 2007/0208461 A1 | 9/2007 | Chase |
| 2007/0221741 A1 | 9/2007 | Wagner et al. |
| 2007/0228183 A1 | 10/2007 | Kennedy et al. |
| 2007/0241203 A1 | 10/2007 | Wagner et al. |
| 2008/0015742 A1 | 1/2008 | Kulyk et al. |
| 2008/0054082 A1 | 3/2008 | Evans et al. |
| 2008/0094010 A1 | 4/2008 | Black |
| 2008/0128523 A1 | 6/2008 | Hoglund et al. |
| 2008/0161977 A1 | 7/2008 | Takach et al. |
| 2009/0057424 A1* | 3/2009 | Sullivan ............... F24F 11/0009 236/51 |
| 2009/0057425 A1 | 3/2009 | Sullivan et al. |
| 2009/0099697 A1 | 4/2009 | Li et al. |
| 2009/0140056 A1 | 6/2009 | Leen |
| 2009/0140057 A1 | 6/2009 | Leen |
| 2009/0140064 A1 | 6/2009 | Schultz et al. |
| 2009/0140065 A1 | 6/2009 | Juntunen et al. |
| 2009/0143879 A1 | 6/2009 | Amundson et al. |
| 2009/0143880 A1 | 6/2009 | Amundson et al. |
| 2009/0194601 A1 | 8/2009 | Flohr |
| 2009/0236433 A1 | 9/2009 | Mueller et al. |
| 2009/0259713 A1 | 10/2009 | Blumrich et al. |
| 2010/0006660 A1 | 1/2010 | Leen et al. |
| 2010/0045470 A1* | 2/2010 | Araiza ...................... F24D 1/00 340/603 |
| 2010/0070099 A1 | 3/2010 | Watson et al. |
| 2010/0076605 A1 | 3/2010 | Harrod et al. |
| 2010/0084482 A1 | 4/2010 | Kennedy et al. |
| 2010/0114382 A1 | 5/2010 | Ha et al. |
| 2010/0131112 A1 | 5/2010 | Amundson et al. |
| 2010/0163635 A1 | 7/2010 | Ye |
| 2010/0182743 A1 | 7/2010 | Roher |
| 2010/0193592 A1 | 8/2010 | Simon et al. |
| 2010/0298985 A1 | 11/2010 | Hess et al. |
| 2011/0253796 A1 | 10/2011 | Posa et al. |
| 2012/0017611 A1 | 1/2012 | Coffel et al. |
| 2012/0046859 A1* | 2/2012 | Imes .................. G05D 23/1905 701/409 |
| 2012/0061480 A1* | 3/2012 | Deligiannis .......... F24F 11/0012 236/51 |
| 2012/0173026 A1 | 7/2012 | Colby et al. |
| 2012/0248211 A1 | 10/2012 | Warren et al. |

(56) References Cited

U.S. PATENT DOCUMENTS

2013/0338839 A1* 12/2013 Rogers .............. G05D 23/1904
700/278

FOREIGN PATENT DOCUMENTS

| EP | 660287 | 6/1995 |
|---|---|---|
| EP | 690363 | 1/1996 |
| EP | 2302326 | 3/2011 |
| JP | 09298780 | 11/1997 |
| SI | 20556 | 10/2001 |
| WO | 2005019740 | 3/2005 |
| WO | 2007027554 | 3/2007 |
| WO | 2008054938 | 5/2008 |
| WO | 2015/148596 | 10/2015 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Thermostat Installation Manual, Jun. 29, 2011, 20 pages.
Ecobee Smart Thermostat User Manual, May 11, 2010, 20 pages.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
TB-PAC, TB-PHP, Base Series Programmable Thermostats, Carrier Corp., May 14, 2012, 8 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Bryant, SYSTXBBUID01 Evolution Control Installation Instructions, Feb. 2004, 16 pages.
Detroitborg, Nest Learning Thermostat: Unboxing and Review, [online]. Feb. 2012 [retrieved on Aug. 22, 2013]. Retrieved from the Internet: <URL: http://www.youtube.com/watch?v=KrgcOL4oLzc>.
International Search Report and Written Opinion mailed Aug. 4, 2015 for International Patent Application No. PCT/US2015/022366, filed Mar. 25, 2015, all pages.

* cited by examiner

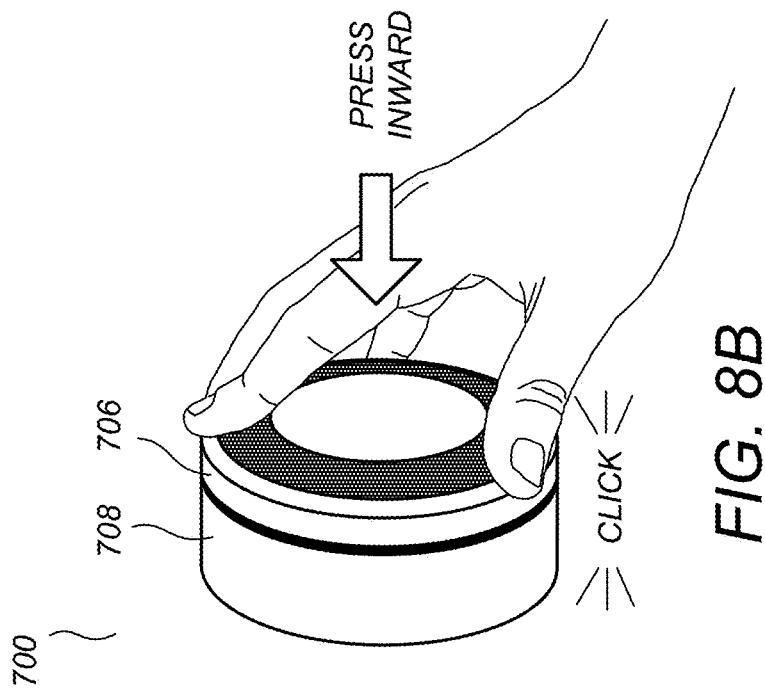
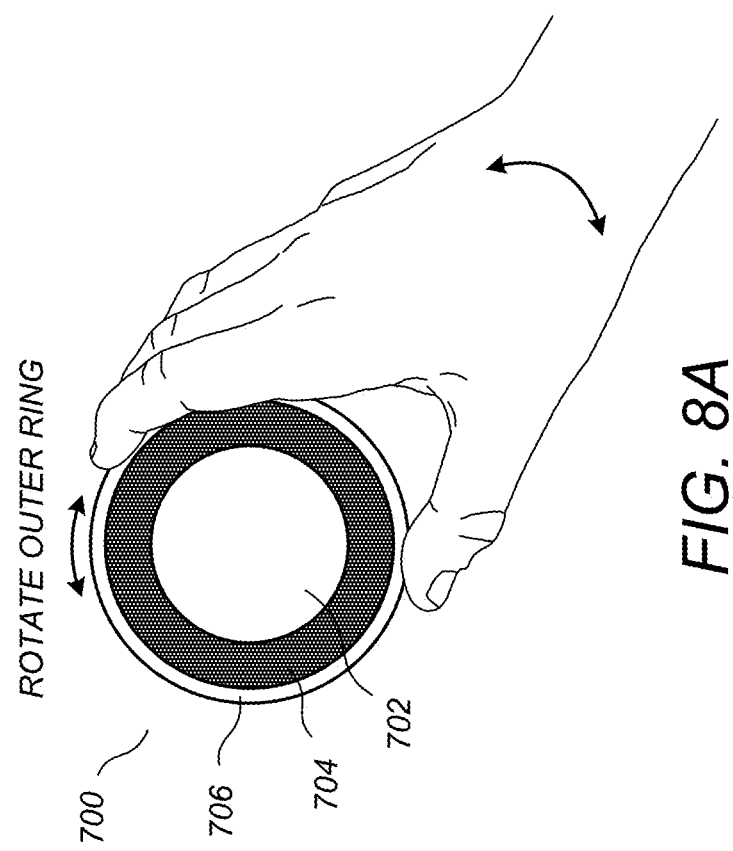
FIG. 8B
FIG. 8A

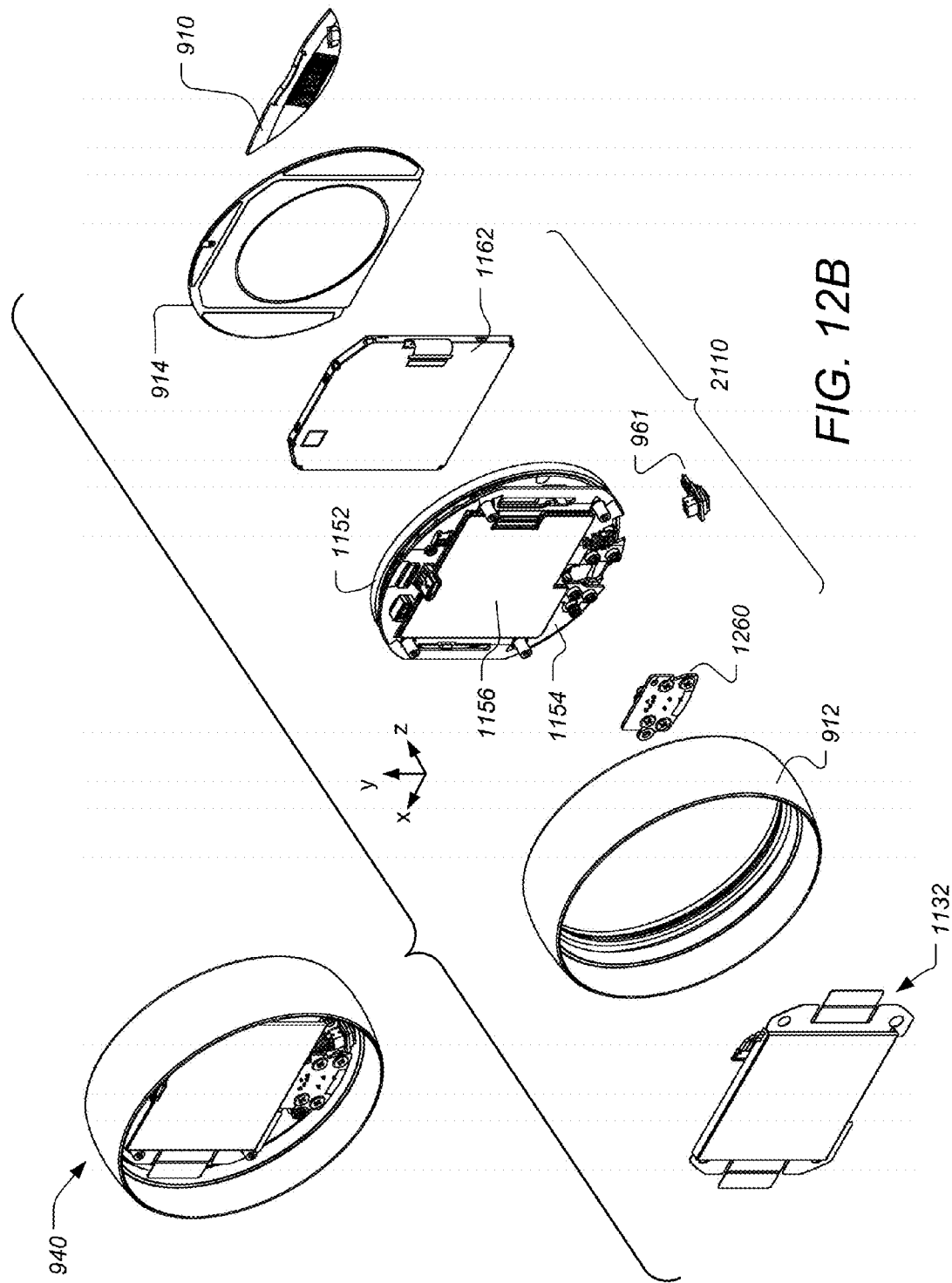

USER-RELOCATABLE SELF-LEARNING ENVIRONMENTAL CONTROL DEVICE CAPABLE OF ADAPTING PREVIOUS LEARNINGS TO CURRENT LOCATION IN CONTROLLED ENVIRONMENT

TECHNICAL FIELD

This patent specification relates to systems and methods for the monitoring and control of energy-consuming systems or other resource-consuming systems. More particularly, this patent specification relates to control units that govern the operation of energy-consuming systems, household devices, or other resource-consuming systems, including methods for interfacing with boiler-based heating systems.

BACKGROUND

In European countries, thermostats generally use a bimetallic strip to sense temperature and respond to temperature changes in the room. The movement of the bimetallic strip is used to directly open and close an electrical circuit. Power is delivered to an electromechanical actuator, usually relay or contactor in the boiler equipment whenever the contact was closed to provide heating and/or cooling to the controlled space. Since these thermostats do not require electrical power to operate, the wiring connections were very simple. A two-wire connection typically runs between the thermostat and the boiler system.

BRIEF SUMMARY

In some embodiments, a control system flexibly adapted for retrofit use with multiple types of pre-existing boiler-based heating systems may be presented. The control system may include a boiler control device for coupling to a boiler, a thermostat device having a processor and a memory and being in wireless communication with the boiler control device, and a user-movable stand for holding the thermostat device. The thermostat device may be configured to learn a heating schedule according to an automated schedule learning algorithm that processes inputs including user inputs and occupancy sensing inputs and derives schedule-affecting parameters therefrom that are processed to compute the heating schedule. The thermostat may include circuitry for determining whether the thermostat has been moved to a new location and for determining one or more parameters associated with the new location. The thermostat may establish a new heating schedule for the new location, where zero or more of the previously measured schedule-affecting parameters are re-used based on the one or more parameters associated with the new location.

In some embodiments, a thermostat device flexibly adapted for relocation within an enclosure may be presented. The thermostat may include a communication module configured to send control signals to a boiler control device for selectively controlling the activation of a boiler-based heating system, a user interface, one or more environmental sensors, and a processing system. The processing system may be configured to learn a heating schedule at a first location according to an automated schedule learning algorithm that processes inputs including user inputs and occupancy sensing inputs and derives schedule-affecting parameters therefrom that are processed to compute the heating schedule. The processing system may also be configured to determine whether the thermostat has been moved to a new location, and if it is determined that the thermostat has been moved to the new location, then determine one or more parameters associated with the new location and establish a new heating schedule for the new location, and where zero or more of the previously measured schedule-affecting parameters are re-used based on the one or more parameters associated with the new location.

In some embodiments, a method of detecting and adapting to location changes within an enclosure by a thermostat device may be presented. The method may include learning, by the thermostat device, a heating schedule at a first location according to an automated schedule learning algorithm that processes inputs including user inputs and occupancy sensing inputs and derives schedule-affecting parameters therefrom that are processed to compute the heating schedule. The method may also include sending, by the thermostat device, control signals to a boiler control device for selectively controlling the activation of a boiler-based heating system based on the heating schedule. The method may additionally include determining, by the thermostat device, whether the thermostat has been moved to a new location. The method may further include, if it is determined that the thermostat has been moved to the new location, determining one or more parameters associated with the new location and establish a new heating schedule for the new location, and where zero or more of the previously measured schedule-affecting parameters are re-used based on the one or more parameters associated with the new location. The method may also include sending, by the thermostat device, control signals to the boiler control device for selectively controlling the activation of a boiler-based heating system based on the new heating schedule.

Various embodiments may include one or more of the following features in any combination. The thermostat device may receive an indication from a user through a user interface that the thermostat device has been moved to the new location. The circuitry for determining whether the thermostat device has been moved to a new location may include an accelerometer. The circuitry for determining whether the thermostat device has been moved to a new location may include a power sensing circuit for detecting a loss of power to the thermostat device. Prior to establishing the new heating schedule for the new location, the thermostat device may receive an indication from a user through a user interface directing the thermostat device to establish the new heating schedule for the new location instead of continuing to use the heating schedule. The zero or more of the previously measured schedule-affecting parameters may include at least one schedule-affecting parameter. The schedule-affecting parameters may include a thermal characterization of a room of an enclosure. The schedule-affecting parameters may be used by the thermostat device to determine a time-to-temperature estimate between a measured ambient temperature and a received setpoint temperature.

A further understanding of the nature and advantages of the present invention may be realized by reference to the remaining portions of the specification and the drawings. Also note that other embodiments may be described in the following disclosure and claims.

BRIEF DESCRIPTION OF THE DRAWINGS

FIGS. 8A-8B illustrate an intelligent thermostat being controlled by a user, according to some embodiments.

FIGS. 12A-12B illustrate exploded front and rear perspective views, respectively, of a head unit frontal assembly of a head unit of an intelligent thermostat, according to some embodiments.

DETAILED DESCRIPTION OF THE INVENTION

Figure 1:
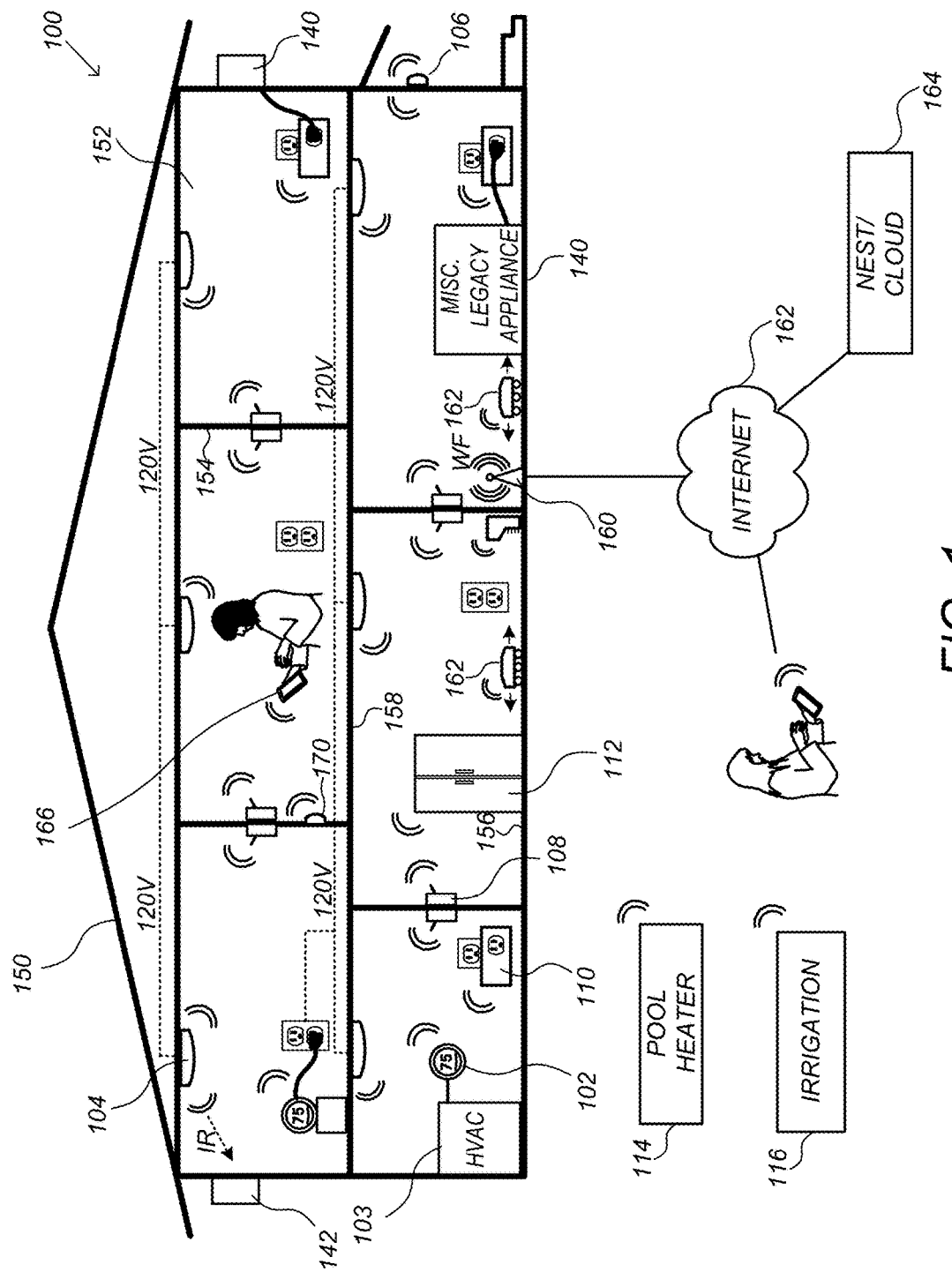
FIG. 1 is an example of a smart-home environment within which one or more of the devices, methods, systems, services, and/or computer program products described further herein will be applicable, according to an embodiment.

The subject matter of this patent specification relates to the subject matter of the following commonly assigned applications, each of which is incorporated by reference herein: U.S. Ser. No. 13/269,501 filed Oct. 7, 2011; U.S. Ser. No. 13/632,112 filed Sep. 30, 2012; U.S. Ser. No. 13/632,112 filed Sep. 30, 2012; U.S. Ser. No. 13/632,041 filed Sep. 30, 2012; PCT Application No. PCT/US12/00007, filed Jan. 3, 2012; U.S. Ser. No. 13/926,335 filed Jun. 25, 2013); U.S. Ser. No. 13/624,811 filed Sep. 21, 2012; U.S. Ser. No. 13/624,881 filed Sep. 21, 2012; U.S. Ser. No. 13/632,070 filed Sep. 30, 2012; U.S. Ser. No. 13/842,213 filed Mar. 15, 2013; PCT Application No. PCT/US13/61021 filed Sep. 20, 2013; U.S. Ser. No. 13/632,152 filed Sep. 30, 2012; U.S. Ser. No. 13/926,312 filed Jun. 25, 2013; and U.S. Ser. No. 13/926,302 filed Jun. 25, 2013. The above-referenced patent applications are collectively referenced herein as "the commonly-assigned incorporated applications."

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure. It will be apparent to one skilled in the art that the present invention may be practiced without some or all of these specific details. In other instances, well known details have not been described in detail in order not to unnecessarily obscure the present invention.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, intelligent thermostat systems according to one or more of the embodiments are applicable for a wide variety of enclosures having one or more HVAC systems including, without limitation, duplexes, townhomes, multi-unit apartment buildings, hotels, retail stores, office buildings, and industrial buildings. Further, it is to be appreciated that while the terms user, customer, installer, homeowner, occupant, guest, tenant, landlord, repair person, and/or the like may be used to refer to the person or persons who are interacting with the thermostat or other device or user interface in the context of one or more scenarios described herein, these references are by no means to be considered as limiting the scope of the present teachings with respect to the person or persons who are performing such actions.

Provided according to one or more embodiments are methods and systems for setting up, pairing, controlling, and/or programming one or more of intelligent, network-connected, intelligent thermostat systems. These intelligent thermostat systems may be configured and adapted to be implemented in a smart home environment, seamlessly interacting with other devices in the smart home environment. The term "intelligent thermostat systems" is used herein to represent a particular combination of devices that can be configured to control an HVAC system in an enclosure, e.g., a home, an office or another structure. However, this intelligent thermostat systems may also be capable of controlling other devices, controlling non-HVAC systems and events (e.g., security related events), and/or working in cooperation with other devices to provide additional features to the smart home environment. Again, it is within the scope of the present teachings for embodiments of the intelligent thermostat systems of the present invention to detect measurable characteristics other than environmental conditions (e.g., pressure, flow rate, height, position, velocity, acceleration, capacity, power, loudness, and brightness) and monitor and/or respond to one or more measurable characteristics of one or more physical systems.

It is to be appreciated that "smart home environments" may refer to smart environments for homes such as a single-family house, but the scope of the present teachings is not so limited, the present teachings being likewise applicable, without limitation, to duplexes, townhomes, multi-unit apartment buildings, hotels, retail stores, office buildings, industrial buildings, and more generally any living space or work space having one or more smart hazard detectors.

It is to be further appreciated that while the terms user, customer, installer, homeowner, occupant, guest, tenant, landlord, repair person, and the like may be used to refer to the person or persons who are interacting with the smart hazard detector or user interface in the context of some particularly advantageous situations described herein, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments—for example, the password-protected hazard detection functionality described further herein may be particularly advantageous where the landlord holds the sole password and can control hazard detection via the hazard detection device—such identity should not be construed in the descriptions that follow as necessarily limiting the scope of the present teachings to those particular individuals having those particular identities.

The detailed description includes two subsections: (1) an overview of smart home device networks and capabilities, and (2) a detailed description of an intelligent thermostat system for controlling boiler-based heating systems. The first subsection provides a description of the capabilities of the smart home devices. The second subsection provides a detailed description an intelligent thermostat system comprising a head unit, a backplate, and a base unit, along with methods for installation, setup, and/or controlling a boiler-based heater.

Smart Home Device Networks and Capabilities

Turning to the figures, FIG. 1 illustrates an example of a smart-home environment 100 within which one or more of the devices, methods, systems, services, and/or computer program products described further herein can be applicable. The depicted smart-home environment 100 includes a structure 150, which can include, e.g., a house, office building, garage, or mobile home. It will be appreciated that devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes a plurality of devices, including intelligent, multi-sensing, network-connected devices, that can integrate seamlessly with each other and/or with a central server or a cloud-computing system to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come).

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Still further, in some embodiments, the smart-home environment 100 of FIG. 1 includes a plurality of intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 112 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart wall switches 108, the smart wall plugs 110, and other devices of the smart-home environment 100 are modular and can be incorporated into older and new houses. For example, the devices are designed around a modular platform consisting of two basic components: a head unit and a backplate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information is then used to obtain data helpful for determining optimal times for watering, such data may include sun location information, temperature, due point, soil type of the land on which the home is located, etc.

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant can use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 makes inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 100. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response, the device presents the guest with a user interface, which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 166. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques descripted in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 102, 104, 106, 108, 110, 112, 114, and 116 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.)

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

According to embodiments, the smart devices combine to create a mesh network of spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices in the smart-home environment 100, such as the spokesman nodes, cannot send information to these low-power nodes.

As described, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able send messages across the entire smart-home environment 100 as well as over the Internet 162 to the central server or cloud-computing system 164. According to embodiments, the mesh network enables the central server or cloud-computing system 164 regularly receive data from all of the smart devices in the home, make inferences based on the data, and send commands back to one of the smart devices to accomplish some of the smart-home objectives descried herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photo resistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 108, 110, 112, and 170) can function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 100. For example, for each room in the house, the user provides a map of the best exit route. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Further included and illustrated in the exemplary smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home.

This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using onboard sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, Zigbee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, where the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, where any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's Disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
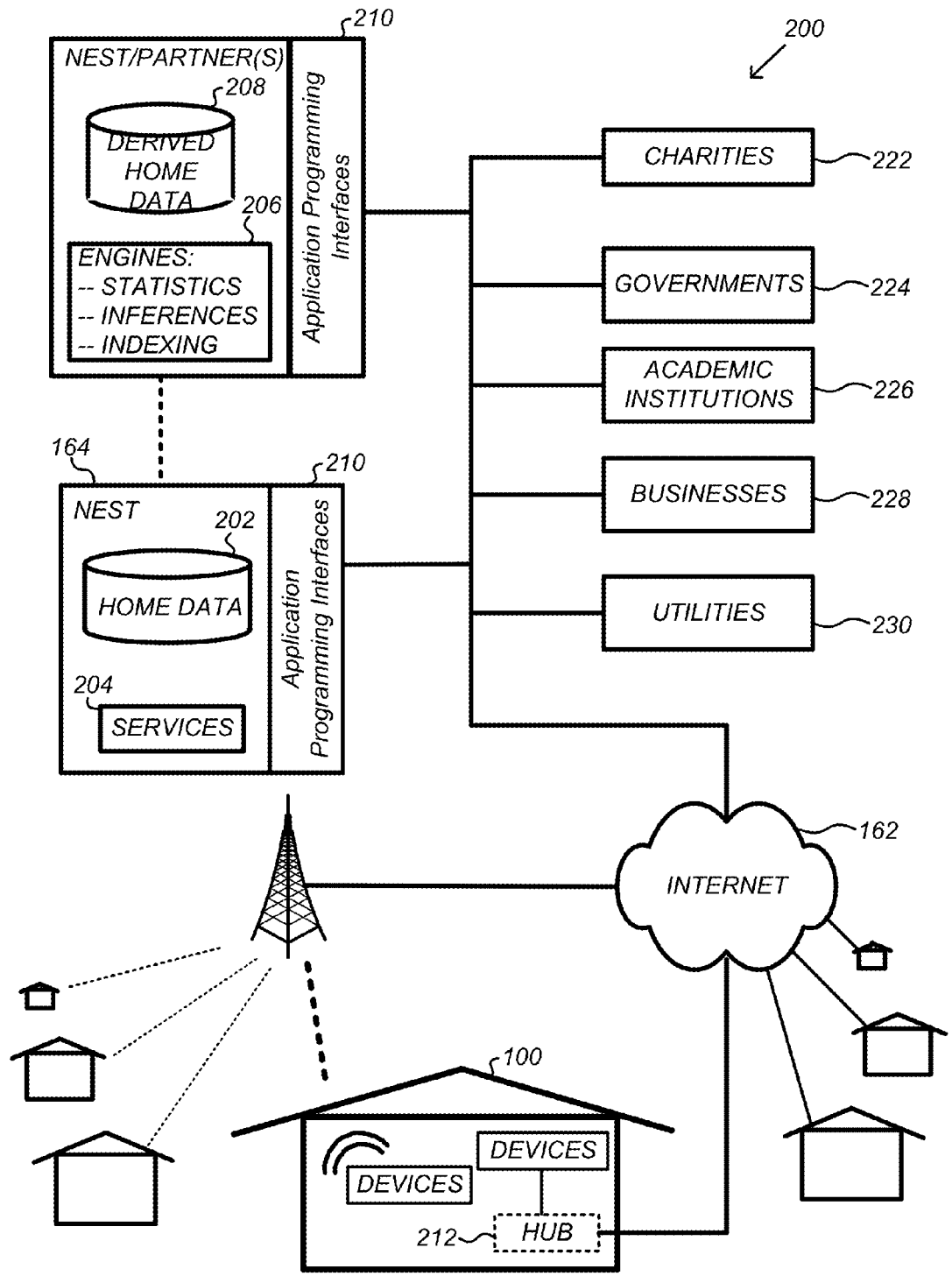
FIG. 2 illustrates a network-level view of an extensible devices and services platform with which the smart-home environment of FIG. 1 can be integrated, according to an embodiment.

FIG. 2 illustrates a network-level view of an extensible devices and services platform 200 with which a plurality of smart-home environments, such as the smart-home environment 100 of FIG. 1, can be integrated. The extensible devices and services platform 200 includes remote servers or cloud computing architectures 164. Each of the intelligent, network-connected devices 102, 104, 106, 108, 110, 112, 114, and 116 from FIG. 1 (identified simply as "smart devices" in FIGS. 2-3 herein) can communicate with the remote servers or cloud computing architectures 164. For example, a connection to the Internet 162 can be established either directly (for example, using 3G/4G connectivity to a wireless carrier), through a hubbed network 212 (which can be a scheme ranging from a simple wireless router, for example, up to and including an intelligent, dedicated whole-home control node), or through any combination thereof.

Although in some examples provided herein, the devices and services platform 200 communicates with and collects data from the smart devices of smart-home environment 100 of FIG. 1, it should be appreciated that the devices and services platform 200 communicates with and collects data from a plurality of smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 routinely collects data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 are coupled to and permit third-party systems to communicate with the central server or the cloud-computing system 164, including the services 204, the processing engine 206, the home data 202, and the derived home data 208. For example, the APIs 210 allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps, that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
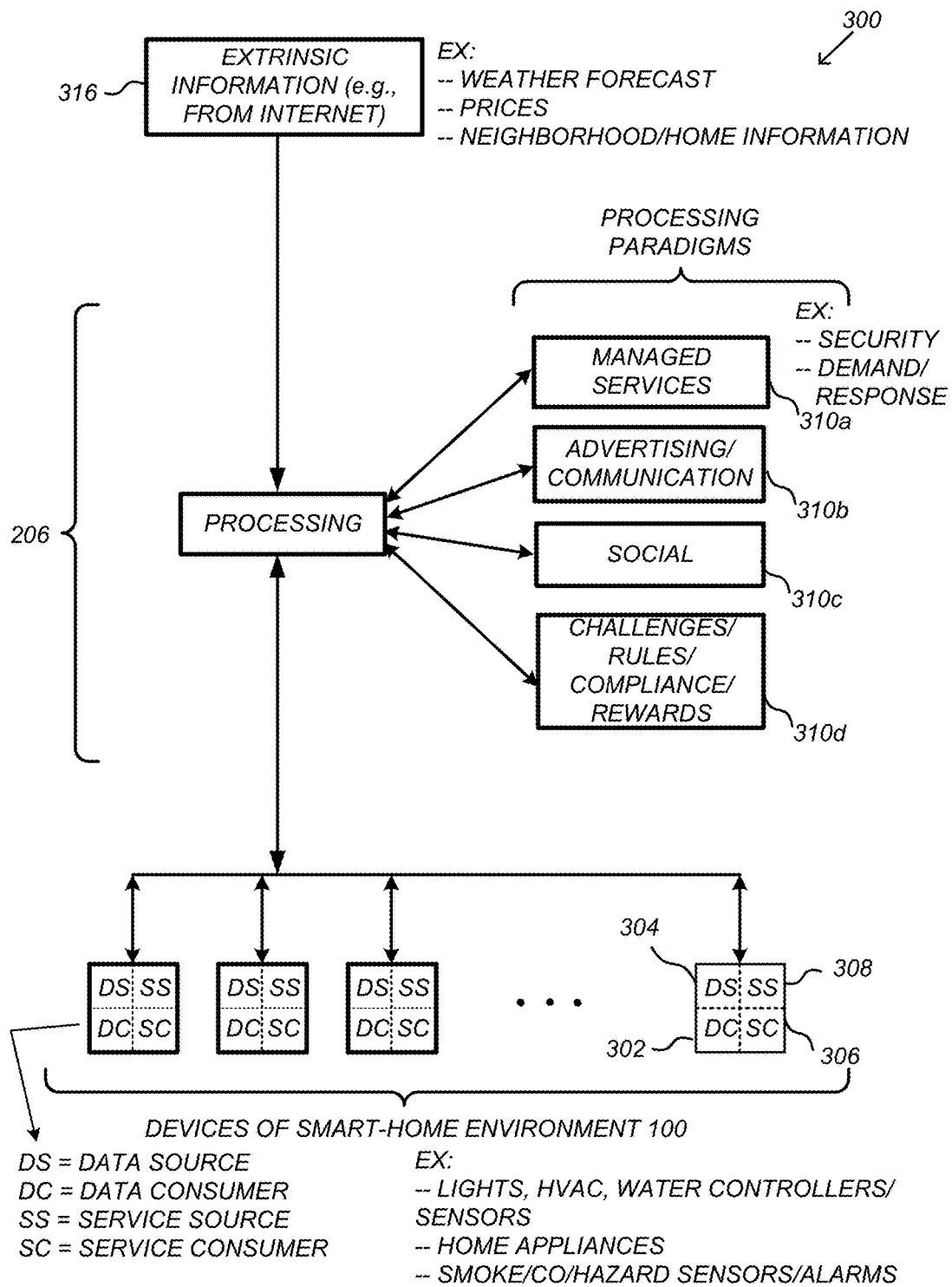
FIG. 3 illustrates an abstracted functional view of the extensible devices and services platform of FIG. 2, with reference to a processing engine as well as devices of the smart-home environment, according to an embodiment.

FIG. 3 illustrates an abstracted functional view of the extensible devices and services platform 200 of FIG. 2, with particular reference to the processing engine 206 as well as devices, such as those of the smart-home environment 100 of FIG. 1. Even though devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 can integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Intelligent Thermostat System for Boiler-Based Heating Systems

In this portion of the disclosure, an intelligent thermostat system for boiler-based heating systems will be presented. As used herein, the term "intelligent thermostat system" may refer to an environmental control system that is configured to measure and regulate a temperature within an enclosure by controlling one or more operations associated with a boiler-based heating system. In some embodiments, an intelligent thermostat system may include multiple components or devices that are distributed throughout an enclosure. For example, an intelligent thermostat system may include a head unit, a backplate, the base unit, and/or a reflective stand. Each of these components or combination of components may be distributed in different locations throughout the enclosure and may communicate using wired and/or wireless communication techniques.

Figure 4A:
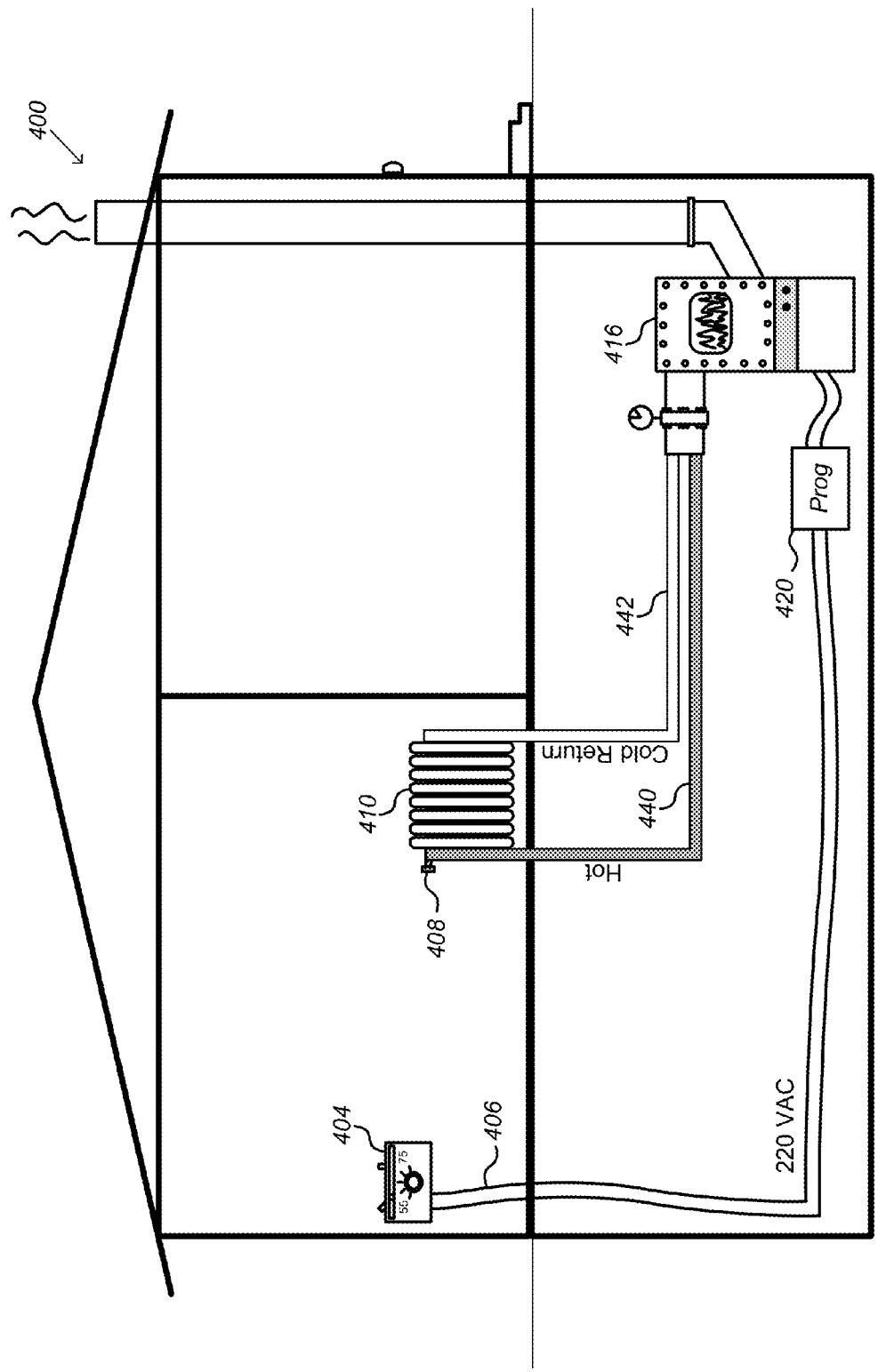
FIG. 4A illustrates a home environment with a boiler-based heating system controlled by a programmer, according to some embodiments.

FIG. 4A illustrates an enclosure 400 using a boiler-based heating system, according to some embodiments. Different enclosures may use different types of HVAC systems, depending on their location. Some geographic and/or political regions may primarily utilize force-air heating systems, while other regions may rely primarily on boiler-based heating systems. Merely by way of example, in the United States, there is a substantial population of homes that are heated by forced-air heating systems that are powered by natural gas, heating oil, other fossil fuel, or by electricity (heat pumps and/or resistive heating), although in other cases there can be radiant electrical heating or other types of radiant heating. In contrast, and by way of further example, many homes in the United Kingdom and Europe have HVAC systems that use a boiler system to heat water for use in the enclosure (e.g. showers, laundry) and/or to provide a means for heating the enclosure itself (e.g. radiators). The embodiments described herein may be applicable to boiler-based heating systems. Generally, a boiler 416 can be located within the enclosure 400, typically in a basement or ground-floor. In other configurations, the boiler 416 may be located outdoors, in a storage shed, in a laundry room, in a kitchen, in a closet, or in any other area relatively near the enclosure 400. The boiler 416 heats or super heats water that can be circulated throughout the enclosure 400 in order to heat the environment within the enclosure 400. Some boilers may use pressurized water systems that create superheated water vapor to increase the temperature.

Heated water or water vapor from the boiler 416 may be circulated throughout the enclosure 400 into one or more radiators 410. In some homes, each room may be equipped with its own radiator to provide localized heat. In other homes, radiators may be strategically placed throughout the enclosure to optimally heat the surrounding environment. Each radiator 410 may operate as a heat exchanger used to transfer thermal energy from the heated water provided from the boiler into the air within the enclosure 400. Single-type radiators are usually configured to work with either heated steam or water vapor, while double-type radiators are usually configured to work with both heated steam and heated water. Pump systems (not shown) may be co-located with the boiler 416 in order to continuously pump water through the radiators 410 during times when the boiler 416 is instructed to provide heat to the enclosure 400. Water can be pumped from the boiler 416 to the radiator 410 through a hot water line 440. As heat is exchanged between the radiator 410 and the environment of the enclosure 400, the water exiting the radiator 410 may have cooled substantially. The cooled water can exit the radiator 410 and return to the boiler 416 through a cold water return line 442.

Each of the radiators 410 may be provided with a means for exercising local control over the amount of heat provided by the radiator 410. Some radiators may include a control valve 408 on the radiator 410 that is configured to regulate the flow of heated water through the radiator 410. As the valve 408 is opened, the heated water flow through radiator 410 will increase, thereby causing the radiator 410 to heat the room more effectively. Conversely, as the valve 408 is closed, the heated water flow through the radiator 410 will decrease, thereby causing the radiator 410 to heat the room less effectively. It may be useful to consider the control valve 408 as analogous to local vent controls on a forced air system that would be found in the United States. Just as vent controls allow users to regulate the flow of heated air into a particular room in a forced air system, each control valve 408 allows users to regulate the heat of the radiator 410. In some cases, the control valve 408 may comprise a thermostatic radiator control valve (TRV) that automatically regulates the pressure in the radiator 410 according to a desired temperature that is mechanically specified using a dial or knob on the control valve 408. The TRV could also have electromechanical control, which, in various embodiments, may facilitate advanced features such as scheduling or remote control to be controlled by an intelligent thermostat system. The TRV can then detect the local air temperature and regulate the flow of hot water/steam through the radiator 410, depending on the temperature of the room.

In addition to the local temperature control provided by a control valve 408, additional controls may be located throughout the enclosure 400, including at or near the boiler 416. The simplest boiler control is an on/off switch for the boiler 416. Turning on the boiler on/off switch can activate a heating function and begin heating water/steam. For example, the boiler 416 can ignite a gas-based burner to begin heating water within its reservoir. In other boilers, turning on the boiler on/off switch can place the boiler in a standby mode to await a command from a programmer 420. Some boilers also include separate temperature controls for controlling the temperature of the water/steam. This allows the user to control the temperature of the water/steam as it leaves the boiler 416 to supply heat to the enclosure 400. Generally, the temperature controls for the boiler 416 will be set hotter in the winter and cooler in the summer.

In order to conserve energy, the programmer 420 may act as a gateway device that automatically controls the times during which the boiler 416 will actively heat water/steam. In some embodiments, a homeowner may wish to automatically turn off the boiler 416 during the day when the enclosure 400 is unoccupied. The homeowner may also desire to automatically activate the boiler 416 during times when the enclosure 400 is expected to be occupied. For example, the programmer 420 may comprise a timer that automatically turns the boiler off between the hours of 9:00 AM and 4:00 PM. Thus when a homeowner returns from work at approximately 5:00 PM, the boiler 416 will be on and ready to supply heated water/steam to the enclosure 400. The programmer 420 may be as simple as mechanical timer or complex enough to set heating schedules for individual days.

The boiler 416 shown in FIG. 4A may provide both heated water/steam to the enclosure 400 for heating the environment, as well as providing a reservoir of heated water for direct use, such as showering, washing dishes, providing bathwater, and/or the like. This direct use may be referred to as "demand hot water," or DHW. A boiler 416 that acts as both an environmental heater and a water heater may be referred to as a combination boiler, or "combi-boiler." When a combination boiler is installed, the programmer 420 may be configured to regulate one or both of the environmental heating function and/or the water heating function. A combi-boiler may use a single channel programmer that provides outputs to control both calls for heat and DHW commands with the same function.

In some cases, the programmer 420 may provide the primary means by which a user may regulate the temperature within the enclosure 400. For example, the user may set the programmer 420 to activate the boiler 420 for a few hours in order to keep the enclosure 400 warm. In some embodiments, this may be done at regularly scheduled intervals according to a schedule programmed manually for the enclosure 400. However, this method of controlling the operation of the boiler 416 is very coarse at best, and is not generally a reliable method of environmental temperature control, particularly as seasons change and outdoor weather effects affect the enclosure 400 differently throughout the year.

In order to provide more fine-grained control for heating the enclosure 400, one or more thermostats 404 may be provided that are communicatively coupled to the programmer 420 and/or the boiler 416. In the configuration illustrated by FIG. 4A, thermostat 404 is coupled to the programmer 420 via a wired connection 406. Thermostat 404 may receive power from the programmer 420. The thermostat 404 may be comprised of a bimetallic coil strip that can be adjusted according to a desired temperature. Power can be provided to both the boiler 416 and/or the programmer 420 through a mains AC power source. The mains AC power source may comprise any suitable power output. For example, in England the mains AC power source may comprise a 220 VAC power outlet. Typically, the 220 VAC signal may be propagated through one line of the wired connection 406 and returned to the other line of the wire connection 406 when the thermostat 404 calls for a heating function. Therefore, the thermostat 404 acts as a switch that determines when heated water/steam should be circulated through the radiators 410, 412. It should be noted that many different wiring configurations are possible due to the number of different makes, models, and/or installation scenarios for boiler-based heating systems. Although not shown explicitly in FIG. 4A, the boiler 416 may receive AC power from the mains AC power source through the programmer 420. Thus the programmer 420 may operate as a power switch for the boiler 416, determining when power should be connected in order to actively heat the water/steam. As known in the art, the mains AC power supplied to the boiler 416 most often does not constitute the actual fuel source for the heating process itself, which is usually natural gas, oil, or other high energy density fuel source, but rather, this mains AC power is used for powering the electrical/electronic components of the boiler 416 and furthermore serving as a signaling means for instantiating the heating function. In other configurations, the mains AC power source may be connected independently to the boiler 416 and/or the programmer 420. The programmer 420 may act as a gatekeeper between the thermostat 404 and the boiler 416. Thus, the programmer 420 may control when the boiler 416 is allowed to accept and respond to a call-for-heat command from the thermostat 404.

The thermostat 404 may be connected directly to the programmer 420 as illustrated in FIG. 4A. Alternatively, the thermostat 404 may be connected to one or more zone valves (not shown in FIG. 4A), which are then in turn coupled through the programmer 420 to the boiler 416. Zone valves can be used to independently control different radiators, such as radiator 410 throughout the enclosure 400. Valves may include switches, motors, conduits, and/or the like that can be opened and closed to allow heated water/steam to flow therethrough, and, when at the end of the opening process, cause a mains line voltage received from the thermostat 404 to be passed through to the boiler 416 to instantiate the heating process. Different models of the programmer 420 may be configured to control multiple valves using multiple thermostat inputs. The thermostat 404 may be routed through the programmer 420 or may be connected directly to one or more of the valve controls. In other cases, the thermostat 404 may also be connected directly to the boiler 416. The various wiring configurations will vary depending on the particular system and/or installation.

In some configurations, each zone may be equipped with its own thermostat 404. Typically, a thermostat 404 will be hardwired to the programmer 420 using wires that are hidden within the walls of the enclosure and/or within conduit attached to the walls. By providing a thermostat 404 with power from the mains AC power source, the thermostat 404 can both be powered by and communicate through the wired connection 406. Although not as common, some boiler-based heating systems may also utilize wireless communications between a thermostat and the programmer 420. A thermostat communicating with the programmer 420 via a wireless connection is not connected to the programmer 420 via a wired connection. Therefore, the thermostat 402 must receive power from an alternative power source, such as a local power outlet or primary-cell batteries. A detailed description of an enclosure with multiple zones and corresponding zone valves will be provided below in relation to FIGS. 5A-5B. The boiler-based heating system in FIG. 4A can be interpreted to represent a boiler system without zone valves that has only a single output, or to represent a boiler system with one or more internally-integrated zone valves.

While the simple system described in FIG. 4A may be adequate for modestly-sized enclosures with low comfort expectations, many consumers are beginning to demand more intelligent environmental control systems. Concern for the environment is prompting many home and building owners to demand a more finely-tuned control system for regulating when the boiler 416 actively heats water/steam, and when the heated water/steam is circulated throughout the enclosure 400. Additionally, many European countries have much higher utility rates than those in the United States. Therefore, many home and building owners may be motivated for monetary reasons to more efficiently control the temperature within (and thus the energy consumption of) the enclosure 400.

One problem with the embodiment illustrated in FIG. 4A is the bifurcation of the boiler control functions between the programmer 420 and the thermostat 404. In order to adjust the boiler schedule, the user needs to adjust the schedule on the programmer 420. Because the programmer 420 is usually co-located with the boiler 416, the user is less likely to adjust the programmer 420 when their daily schedule changes, which can lead to wasted energy if the programmer 420 enables the heat maintenance function of the thermostat 404/boiler 416 while the dwelling is unoccupied. Additionally, wire connections 406 are often required for many legacy thermostats 404 and involve high-voltage transmissions. As illustrated by FIG. 4A, the wired connection 406 between the thermostat 404 and the programmer 420 carries a 220 VAC signal. Therefore, the embodiments described herein implement an intelligent thermostat system in order to overcome these and many other problems with existing systems.

Figure 4B:
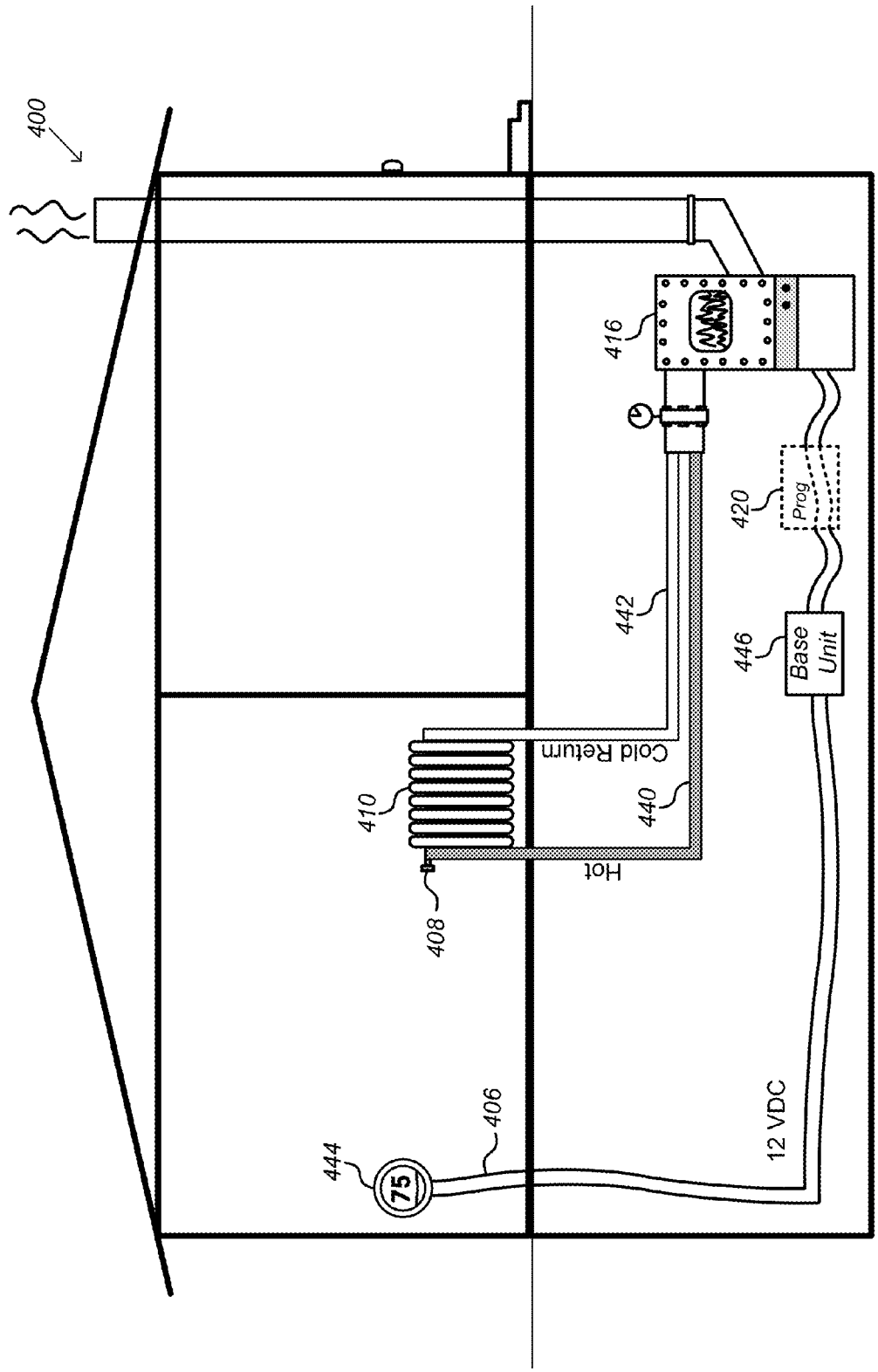
FIG. 4B illustrates a home environment with a boiler-based heating system controlled by an intelligent thermostat system, according to some embodiments.

FIG. 4B illustrates a home environment with a boiler-based heating system controlled by an intelligent thermostat system, according to some embodiments. The intelligent thermostat system may comprise one or more intelligent thermostats 444 and one or more base units 446. In some embodiments, each of the intelligent thermostats 444 may be paired with a unique base unit 446. In other embodiments, each of the intelligent thermostats 444 may be paired with the same base unit 446. For simplicity, FIG. 4B illustrates a single base unit 446 and a single intelligent thermostat 444, but it will be understood that multiple base unit and intelligent thermostat combinations may be present in the enclosure 400.

Generally, the base unit 446 may be co-located with the boiler 416 and may be used to interface directly with the boiler controls. In contrast, the intelligent thermostat 444 may be configured to perform advanced scheduling algorithms, time-to-temperature algorithms, environmental control algorithms, sunlight compensation algorithms, occupancy detection algorithms, and/or the like. The intelligent thermostat 444 may also be configured to communicate with the smart home system described herein comprising hazard detectors and other devices within a smart home environment. The intelligent thermostat 444 may also be configured to perform the functions of the programmer 420 in controlling when the boiler 416 is actively heating water/steam.

FIG. 4B illustrates one configuration where the base unit 446 is connected to the intelligent thermostat 444 via a wired connection 406. When installing the intelligent thermostat system in an enclosure with an existing boiler 416 and programmer 420, the same wire connection 406 may be used to connect the intelligent thermostat 444 to the base unit 446 as was used to connect the old thermostat to the programmer 420. Thus no new wires need to be pulled through walls of the enclosure 400 in order to install the intelligent thermostat system. As will be described later, the wire connection 406 can be used to communicate between the intelligent thermostat 444 and the base unit 446. Additionally, the base unit 446 can provide power to the intelligent thermostat 444 via the wired connection 406. The base unit 446 can provide a lower-voltage signal to the intelligent thermostat 444 than the 220 VAC connection provided by traditional boiler-based systems. For example, some embodiments may supply a 12 VDC signal to power the intelligent thermostat 444 and/or communicate with the intelligent thermostat 444.

In the configuration of FIG. 4B, a programmer 420 is still present. Occasionally, the programmer 420 may be built into the boiler 416 such that its removal is not practical. In other cases where a combi-boiler is not used, the programmer 420 may still be needed to control a hot water heating function for showers, laundry, and/or the like. In configurations such as this where the programmer 420 is still connected to the boiler 416, the base unit 446 may communicate with the programmer 420 and/or directly with the boiler 416 (not shown). Similarly, the mains AC power supply may be connected to any combination of the programmer 420, the base unit 446, and/or the boiler 416 in series or in parallel, depending on the particular installation. In order to operate with the base unit 446, the programmer 420 may be set such that the programmer is always "on." In one embodiment, an installation manual included with the intelligent thermostat system may include a sticker provided for the user to place on the programmer 420. The sticker may include instructions, notifications, or warnings that indicate to the user that the programmer 420 should be left on such that the intelligent thermostat system may operate as intended. In some embodiments, the base unit 446 could have separate control channels for heating and hot water, thus comprising all functionality of the previous programmer and allowing a configuration as shown in FIG. 4B. In other words, some embodiments of the base unit 446 can also replace the hot water function of the programmer for use with combi-boilers.

Generally, when an intelligent thermostat system includes a base unit 446 as described herein, the programmer 420 can be bypassed or otherwise neutralized with respect to the central heating (CH) function. The programmer 420 can either be disconnected and removed from the boiler-based heating system, or wiring connections can be made such that the programmer 420 simply passes signals through from the base unit 446 to the boiler 416. For example, many modern combi-boilers include an integrated programmer that cannot be simply removed from the system. In these embodiments, the programmer 420 can be wired or configured such that the programmer 420 is always in an "on" state. This can include shorting actual wired connections, and/or manipulating settings on the programmer 420.

In cases where the programmer 420 does not control a hot water heater for laundry/bathing, some embodiments will remove the programmer 420 during installation of the intelligent thermostat system. In this case, the base unit 446 can communicate directly with the boiler 416, and in some cases can regulate the flow of power from the mains AC power source to the boiler 416. The base unit 446 can be configured with one or more switches, such as relays, triacs, and/or power FETs to switch the 220 VAC signals required to control the boiler 416. The base unit 446 can also be configured to convert and regulate the 220 VAC signals for use in other parts of the system; e.g., it may be configured to convert the signals into lower voltage DC signals that can be used to power the intelligent thermostat 444. Therefore, user interactions may mainly involve the intelligent thermostat 444. In contrast, the base unit 446 can operate largely independent of user interactions by receiving instructions from the intelligent thermostat 444. Thus, the user can control the operation of the boiler 416 without having to adjust the programmer 420, if the programmer 420 is still connected. The programmer functions can instead be implemented using the intelligent thermostat 444.

Figure 4C:
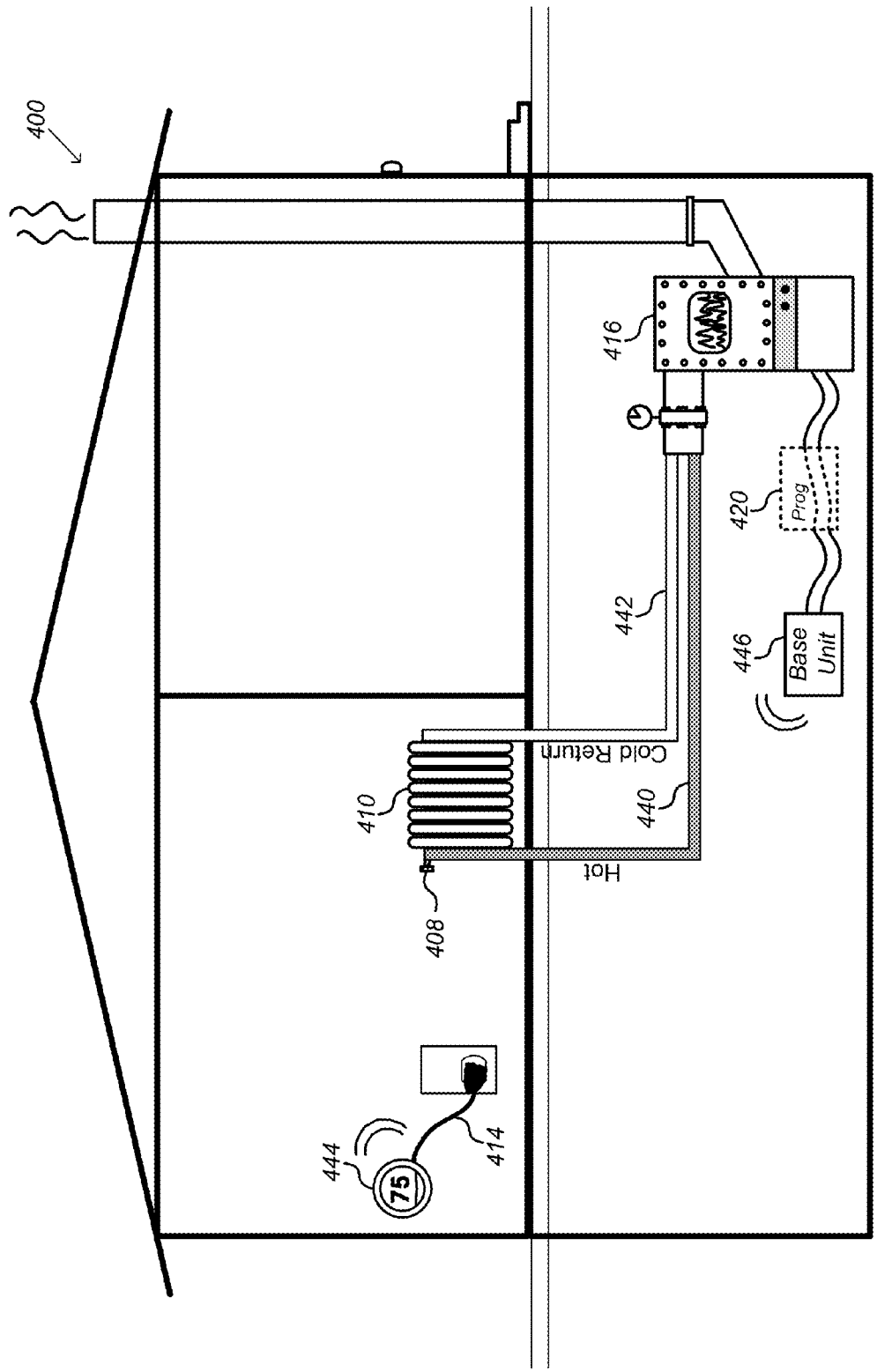
FIG. 4C illustrates an intelligent thermostat system incorporating wireless connections, according to some embodiments.

FIG. 4C illustrates an intelligent thermostat system incorporating wireless connections, according to some embodiments. The base unit 446 may additionally or alternatively be equipped with a radio device to communicate wirelessly with the intelligent thermostat 444. Wireless communication can be enabled for systems that that are not connected via a wired connection. In this case, the intelligent thermostat 444 may receive power through a local power source 414 such as a power outlet, battery, etc. Consequently, the base unit 506 may be configured to accept wired and/or wireless communications from an intelligent thermostat 444. Note that in some embodiments, the intelligent thermostat 444 can communicate with the base unit 446 both wirelessly and through a wired connection. As will be described further below, such dual-mode communication can include cases where the intelligent thermostat 444 is powered by the base unit 446 through a wired connection, and where the wireless communication replaces or supplements any wired communications. This may be done for purposes of reliability, redundancy, adherence to local wireless and/or wired communication codes, and/or the like.

Figure 5A:
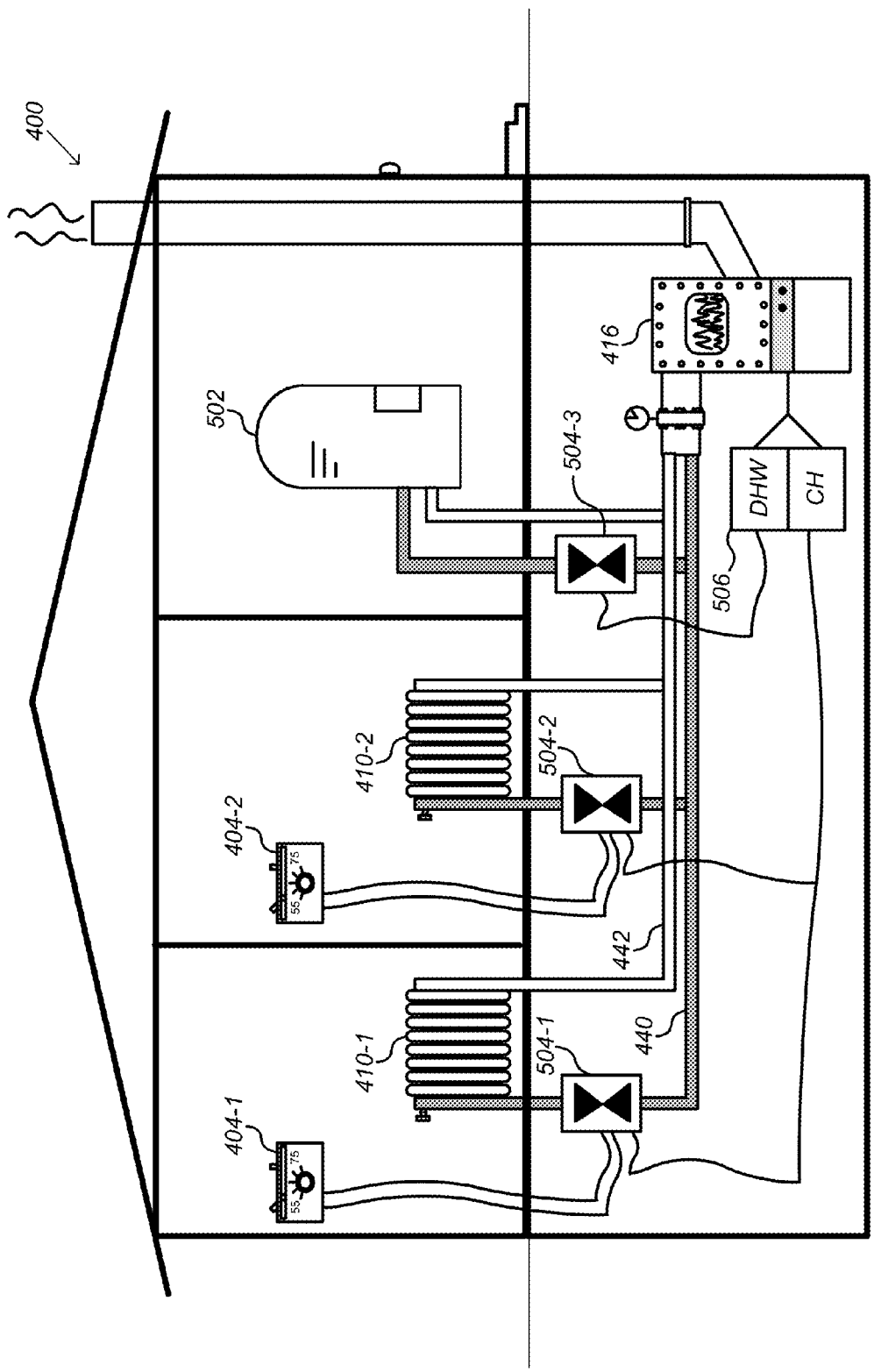
FIG. 5A illustrates a home environment with a boiler-based heating system controlled with zone valves, according to some embodiments.

FIG. 5A illustrates an example of a more complicated boiler-based heating system with multiple zone valves and an external reservoir for DHW, according to some embodiments. In this embodiment, the enclosure 400 is divided into multiple zones. Each zone is associated with its own thermostat 404 and radiator 410 combination. In order to independently control each of the various zones, independent zone valves 504 can be coupled to each of the thermostats 404 and radiators 410. Specifically, flow of heated steam/water through the hot water line 440 into each of the radiators 410 can be controlled by the opening and closing of the respective zone valves 504.

As illustrated in FIG. 5A, thermostat 404-1 is communicatively coupled to zone valve 504-1. When thermostat 404-1 determines that a call for heat is required, a signal can be sent to zone valve 504-1 that causes zone valve 504-1 to open and allow heated water/steam to flow through radiator 410-1. It will be understood that the same process can be followed for other zones. For example, thermostat 404-2 can cause zone valve 504-2 to open and thereby allow heated steam/water to flow through radiator 410-2. Although only two zones are shown in FIG. 5A, other embodiments may have more or fewer zones without restriction, within the enclosure 400.

As described above, combi-boiler systems combine the provisioning of demand hot water (DHW) destined for domestic use and the provisioning of call-for-heat (CH) hot water destined for radiators into the same physical boiler system. By way of contrast, the embodiment of FIG. 5A illustrates a separate domestic water reservoir, often termed a cylinder 502, that stores water for DHW purposes. For example, the cylinder 502 can supply water for dishwashers, water faucets, washing machines, and/or the like. In embodiments such as these, a dual-channel programmer 506 may be used to separately control the boiler 416 in conjunction with the cylinder 502 for DHW commands, and the boiler 416 in conjunction with the zone valves 504 for CH commands.

In this embodiment, the zone valves 504 are shown as being separate for the cylinder 502 and each of the zones. However, in some embodiments, one or more of the zone valve 504 may be combined into a single multifunction unit. For example, a mid-position valve (not shown) can be used that will provide multiple flow configurations. One midposition valve can allow heated steam/water to flow to (1) a radiator 410 in a particular zone, (2) to the cylinder 502, or (3) to both the particular radiator 410 and the cylinder 502 simultaneously.

The wiring illustrated in FIG. 5A will be understood to be simplified for illustrative purposes. In actual systems, many different wiring configurations are possible. For example, one embodiment may accept a mains line power supply (220 VAC) from the enclosure 400 through the dual-channel programmer 506. The power signal can be routed from the dual-channel programmer 506 to the zone valves 504. The zone valves 504 can then provide power to the thermostats 404, and the thermostats 404 can provide a signal that controls the open/closed setting of the valves 504. When the thermostats 504 send a signal that causes the valves 504 to open, power can then be connected through the valves 504 to the boiler 416 by way of the dual-channel programmer 506. Providing power to the boiler 416 may also power one or more pumps (not shown) that force heated steam/water to circulate through the boiler-based heating system via the hot water line 440 and returning through the cold water return 442. This configuration allows the dual-channel programmer 506 to regulate when the thermostats 404 are allowed to actuate the zone valves 504 and provide power to the boiler 416. When the dual channel programmer 506 is off, the thermostats 404 may be unable to activate the zone valves 404 or the boiler 416.

It should also be noted that many boiler-based heating systems use a junction box into which all of the wiring connections illustrated by FIG. 5A can be routed. During installation, a technician can then make connections between the thermostats 404, the dual channel programmer 506, the zone valves 504, and/or the boiler 416 all in a single location. For illustrative purposes, the junction box is not shown explicitly in FIG. 5A in order to clearly show the locations of various system elements and the communication therebetween. It should also be understood that the locations of system elements, such as the thermostats 404, the radiators 410, the zone valves 504, the dual channel programmer 506, and/or the boiler 416, may be relocated throughout the enclosure 400 depending on various factors. For example, the zone valves 504 may be co-located with the boiler 416, or they may be distributed throughout the enclosure, such as in the floor, in a closet, and/or the like.

Figure 5B:
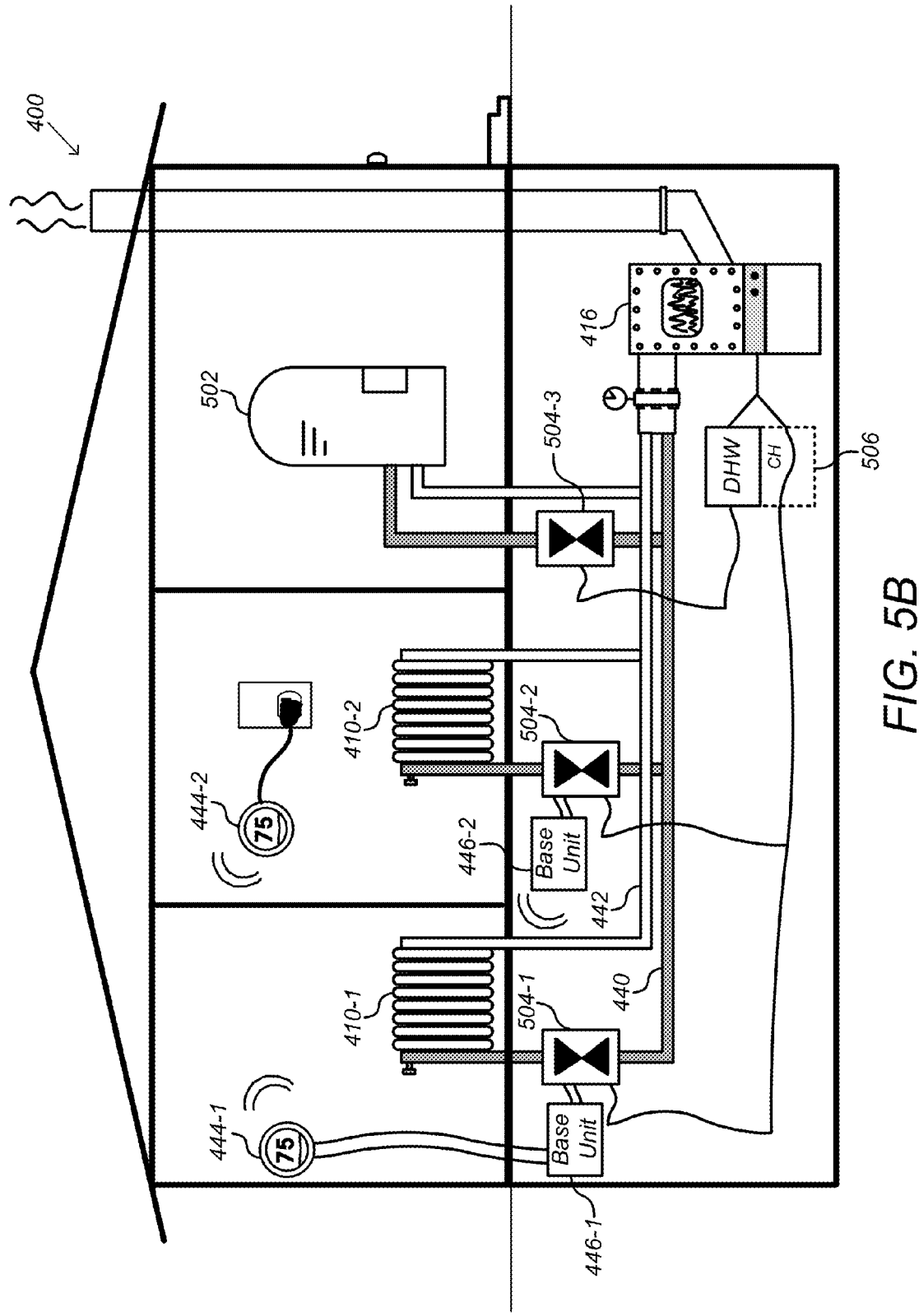
FIG. 5B illustrates a home environment with a boiler-based heating system controlled with zone valves and an intelligent thermostat system, according to some embodiments.

FIG. 5B illustrates a boiler-based heating system with multiple zones controlled by an intelligent thermostat system, according to some embodiments. The thermostats 404 of FIG. 5A have been replaced with intelligent thermostats 444 in FIG. 5B. As with the single-channel programmer of FIGS. 4A-4B, the dual-channel programmer 506 can be bypassed or otherwise neutralized for the CH function. However, in this embodiment, the DHW function can continue to operate as normal. Each intelligent thermostat 444 can be connected to a base unit 446 that in turn communicates with the zone valves 504. As illustrated, the intelligent thermostats 444 can communicate wirelessly and/or through a wired connection with the base units 446. The wired connection between base unit 446-1 and intelligent thermostat 444-1 may comprise a low-voltage signal, such as 12 VDC. In this embodiment, each intelligent thermostat 444 is uniquely paired with an associated base unit 446. Thus, intelligent thermostat 444-1 can communicate wirelessly with base unit 446-1 without interfering with wireless communications between intelligent thermostat 444-2 and base unit 446-2.

Figure 6:
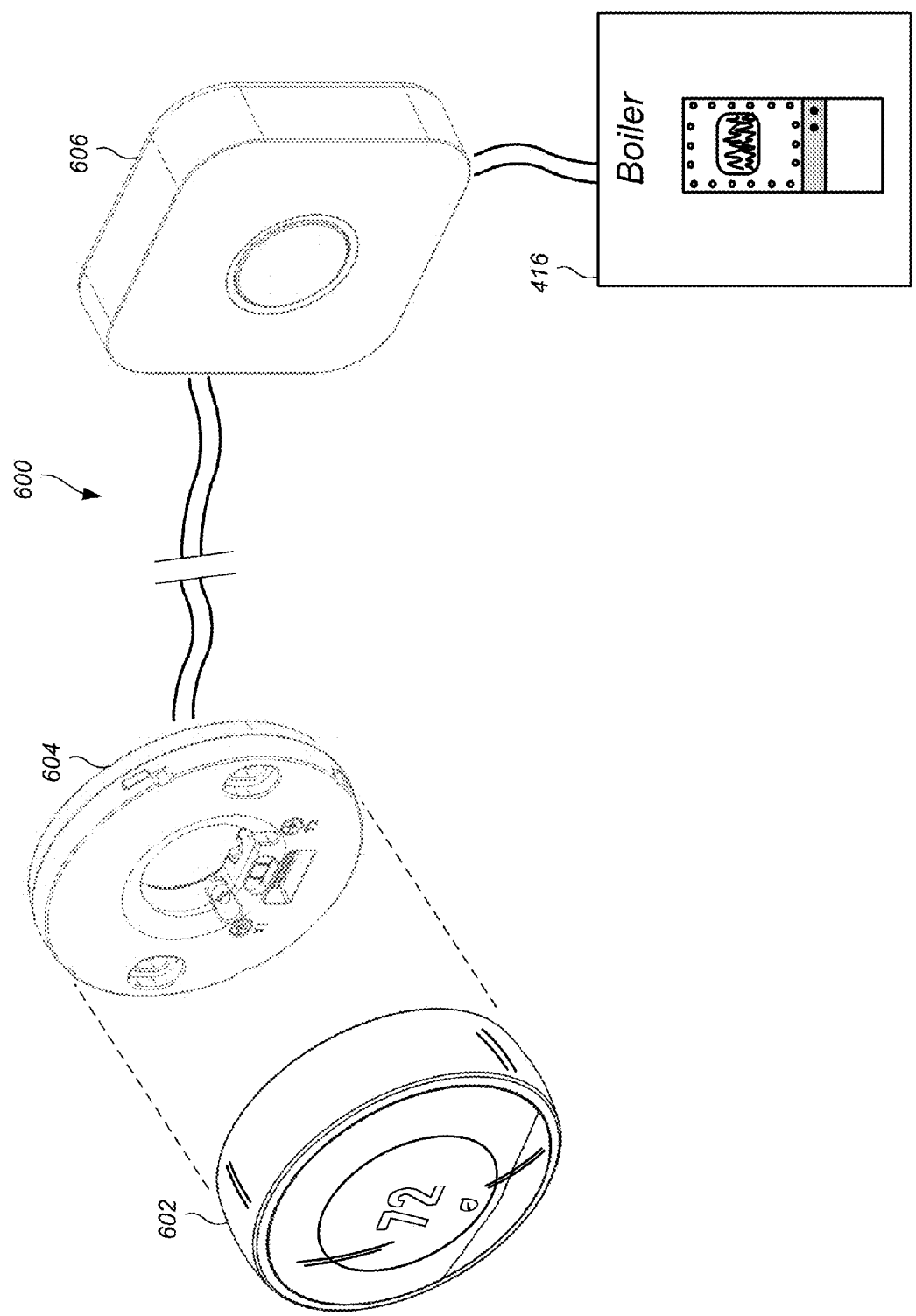
FIG. 6 illustrates an intelligent thermostat system comprising a head unit, a backplate, and a base unit, according to some embodiments.

FIG. 6 illustrates an intelligent thermostat system 600 comprising a head unit 602, a backplate 604, and a base unit 606, according to some embodiments. By designing a modular intelligent thermostat system 600, some components can be reused/repurposed depending on the geographic location. For example, the head unit 602 that includes a user interface and high power processing functions can be programmed with different software modules depending on which country the intelligent thermostat system 600 is being installed in, e.g., whether the intelligent thermostat system 600 is being installed in the United States or in Europe. The backplate 604 can be configured to interface directly with a forced air HVAC system comprising three or more wired connections, while other versions of the backplate 604 can be configured to interface with a two wire connection in a boiler-based system, while both versions may advantageously be configured to couple to an identical hardware version of the head unit 602, such that a single hardware version of the head unit can be produced and only require software modifications to be compatible with different versions of the backplate 604. The base unit 606 can be configured to interface with the boiler 416 and to communicate and/or provide power to the backplate 604 for the head unit 602.

Another advantage gained by a modular intelligent thermostat system 600 involves ease of installation. During installation, and after removal of the old thermostat, two wires will generally be exposed protruding from the wall of the enclosure. These wires can be inserted into the wire connections of the backplate 604 through the center hole. The backplate 604 can then be screwed to the wall and the head unit 602 can then be secured to the backplate 604. The base unit 606 can be installed in close proximity to the boiler 416 and attached to an existing wired connection and/or wirelessly paired with the head unit 602.

This modular design also allows the high-power 220 VAC signals from the mains AC power source to be isolated near the boiler 416. This eliminates the need for high voltages to run through wires within the home, thus eliminating a possible fire hazard. Additionally, the lower voltage sent to the wire connection by the base unit 606 will pose less of a danger to the installer of the thermostat comprising the backplate 604 and the head unit 602. The base unit 606 can take the 220 VAC power supply and regulate/reduce it to a safer DC level, such as 12 VDC. This allows the head unit 602 and the backplate 604 to operate at lower DC voltages, while the base unit 606 can interact with the boiler 416 at higher AC voltages.

In order to understand the operation in the interaction between each of the three modules of the intelligent thermostat system 600 (the head unit 602, the backplate 604, and the base unit 606), each of these modules will be discussed individually below. A description of the intelligent thermostat comprised of the head unit 602 and the backplate 604 will be described first, followed by individual descriptions of the head unit 602, the backplate 604, and then the base unit 606.

Figure 7:
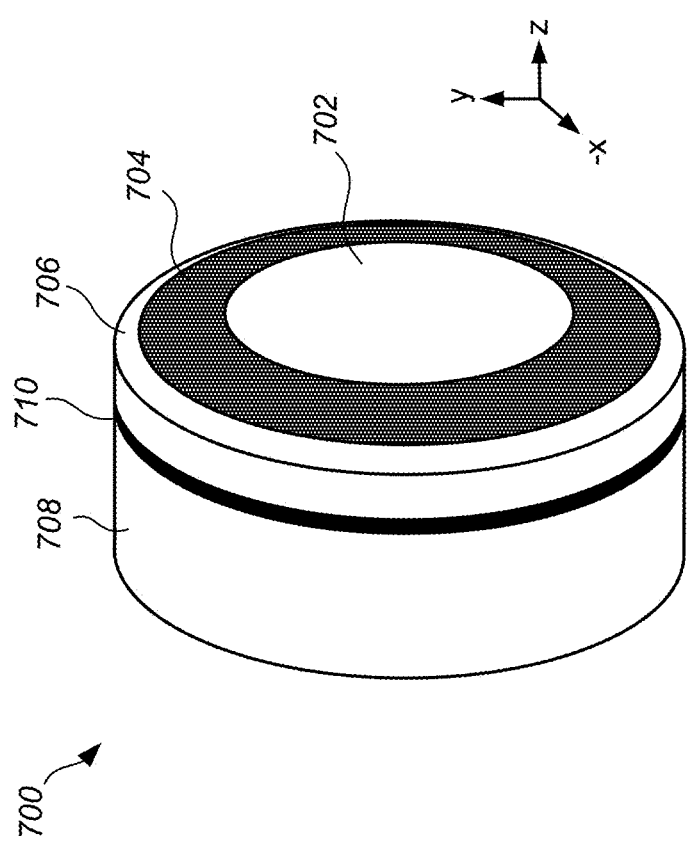
FIG. 7 illustrates a perspective view of an intelligent thermostat, according to some embodiments.

FIG. 7 illustrates a perspective view of an intelligent thermostat found to be particularly advantageous for use in conjunction with one or more of the described embodiments. The intelligent thermostat 700 has a sleek, elegant appearance. The intelligent thermostat 700 comprises a circular main body 708 with a diameter of about 8 cm and that has a visually pleasing outer finish, such as a satin nickel or chrome finish. A cap-like structure comprising a rotatable outer ring 706, a sensor ring 704, and a circular display monitor 702 is separated from the main body 708 by a small peripheral gap 710. The outer ring 706 may have an outer finish identical to that of the main body 708, while the sensor ring 704 and circular display monitor 702 may have a common circular glass (or plastic) outer covering that is gently arced in an outward direction and that provides a sleek yet solid and durable-looking overall appearance. The sensor ring 704 contains any of a wide variety of sensors, including infrared sensors, visible-light sensors, and acoustic sensors. The glass or plastic that covers the sensor ring 704 may be smoked or mirrored such that the sensors themselves are not visible to the user. An air venting functionality may be provided, via the peripheral gap 710, which allows the ambient air to be sensed by the internal sensors without the need for gills or grill-like vents.

FIGS. 8A-8B illustrate the intelligent thermostat 700 of FIG. 7 as it is being controlled by a user. The intelligent thermostat 700 is controlled by at least two types of user inputs: (1) a rotation of the outer ring 706 illustrated in FIG. 8A; and (2) an inward push on the outer ring 706 illustrated by FIG. 8B. The inward push may include an audible and/or tactile "click" that occurs when the input has mechanically registered with the thermostat. The inward push may cause the outer ring 706 to move forward towards the main body and/or towards a wall on which the intelligent thermostat 700 is mounted, while in another implementation, the entire cap-like structure, including the outer ring 706, the glass covering of the sensor ring 704, and circular display monitor 702, may move inwardly together when pushed. The sensor ring 704, the circular display monitor 702, and the common glass covering do not rotate with outer ring 706 in one implementation. In the drawings shown herein, the "z" direction is outward from the wall, the "y" direction is the toe-to-head direction relative to a walk-up user, and the "x" direction is the user's left-to-right direction.

By rotation of the outer ring 706, or ring rotation, and inward pushing of the outer ring 706, or inward click, the intelligent thermostat 700 can receive some or all of the necessary information from the user for basic setup and operation. The outer ring 706 is mechanically mounted in a manner that provides a smooth yet viscous feel to the user, for further promoting an overall feeling of elegance while also reducing spurious or unwanted rotational inputs. To summarize, the intelligent thermostat 700 may be operable to recognize a variety of user inputs, such as: (1) ring rotate left, (2) ring rotate right, and (3) inward click. In other implementations, more complex fundamental user inputs can be recognized, such as double-click or triple-click inward presses, along with speed-sensitive or acceleration-sensitive rotational inputs.

Figure 9A:
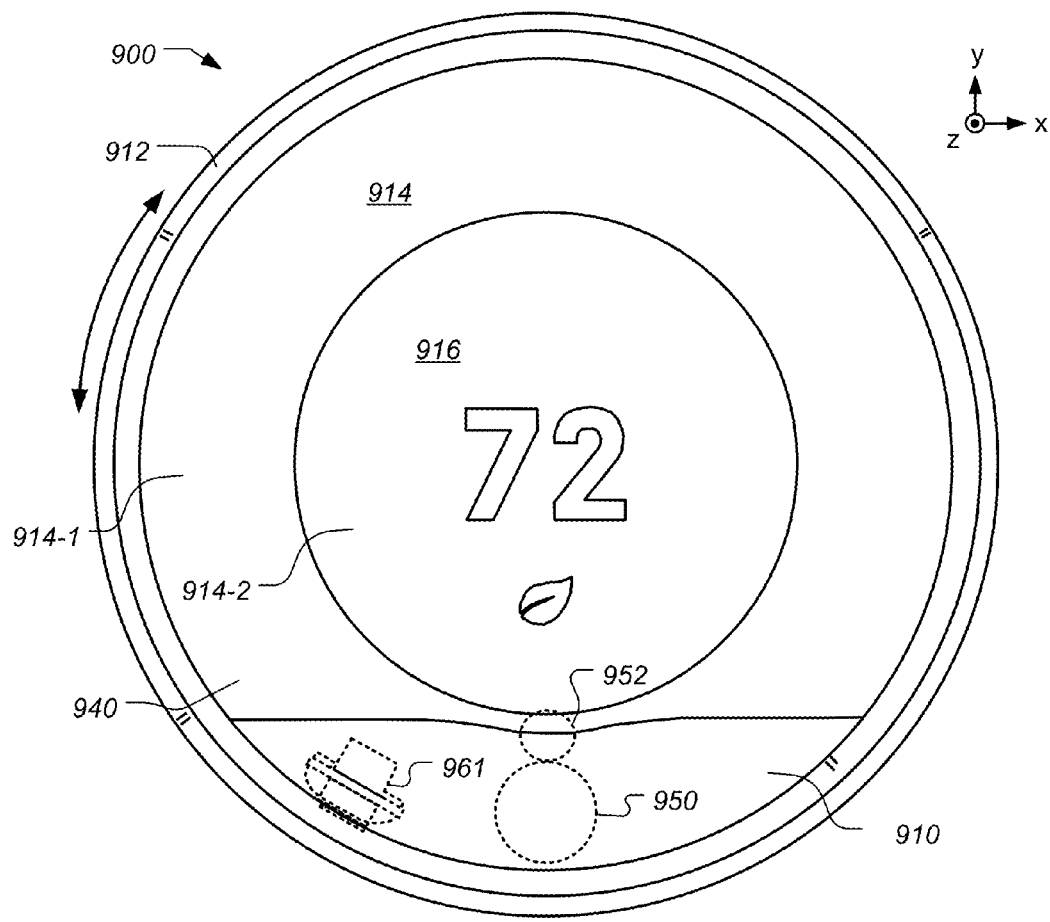
FIGS. 9A-9D illustrate front, bottom, side, and perspective views, respectively, of an intelligent thermostat, according to some embodiments.
Figure 9B:
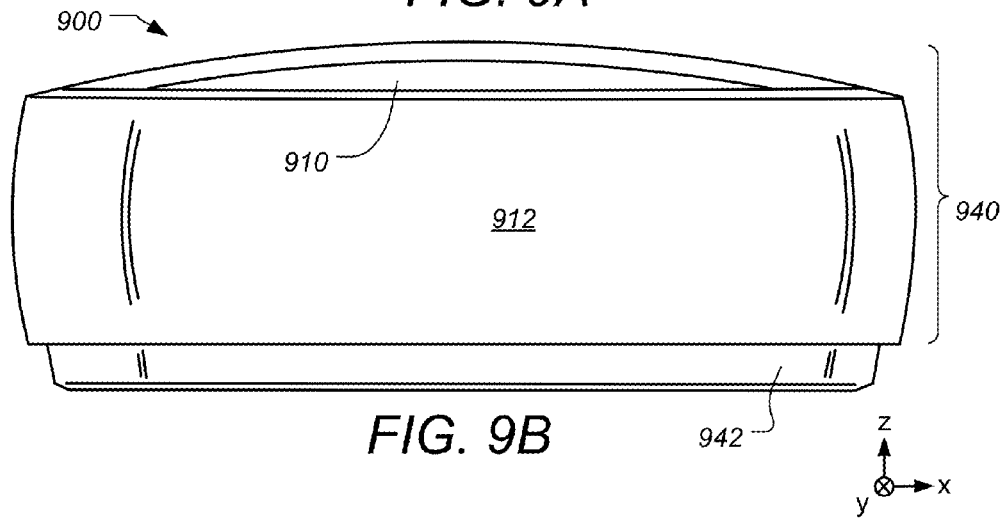
Figure 9C:
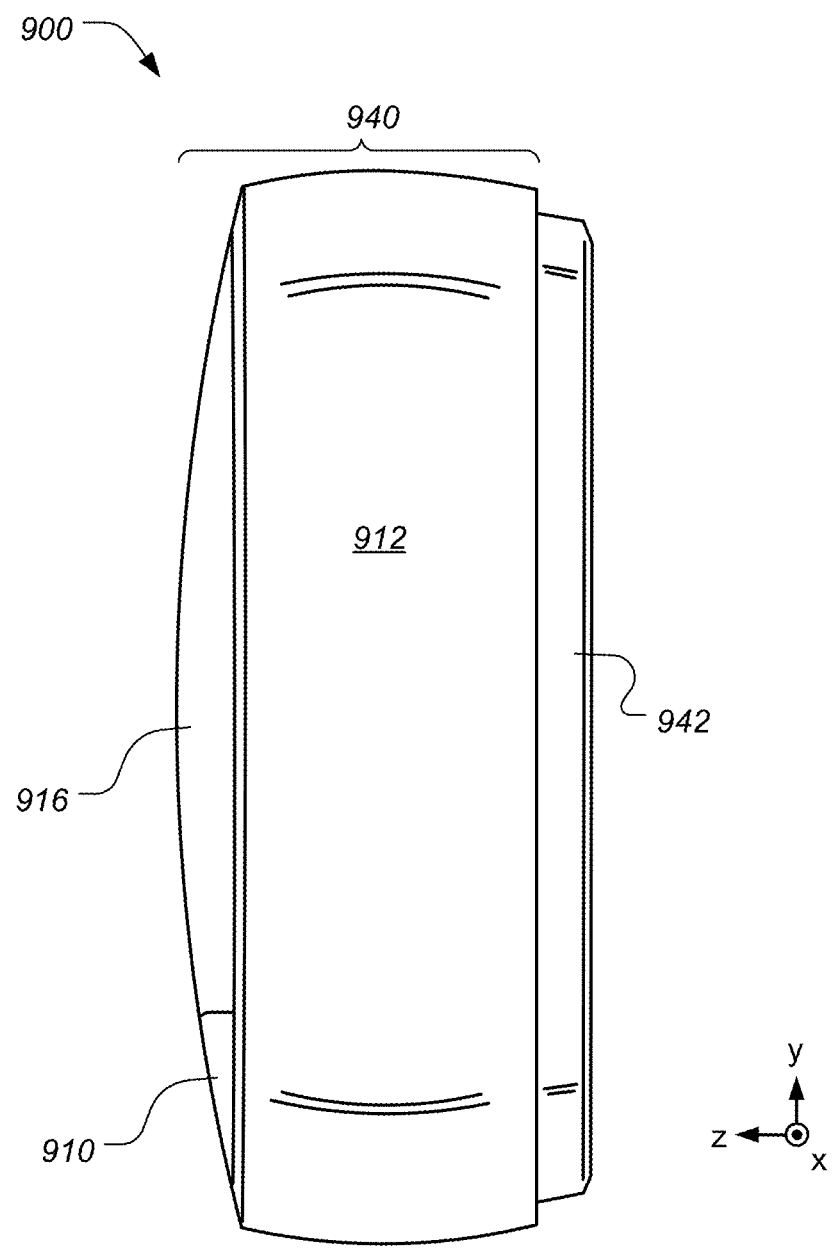
Figure 9D:
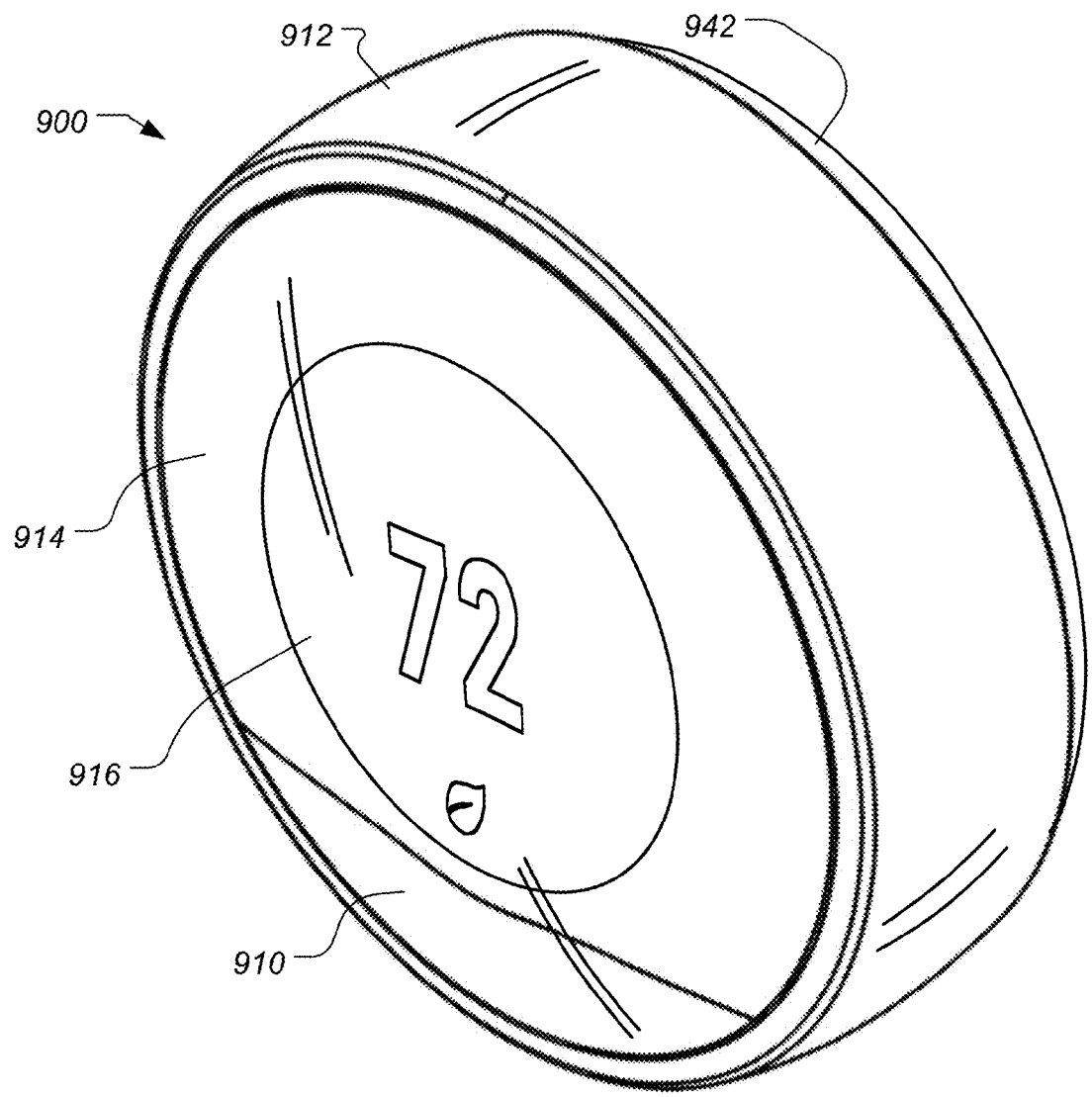

FIGS. 9A-9D illustrate an intelligent thermostat 900 that is similar in certain respects to the intelligent thermostat 700 of FIGS. 7-8B, supra, the intelligent thermostat 900 having a visually pleasing, smooth, sleek and rounded exterior appearance while at the same time including multiple environmental sensors, multiple occupancy sensors, intelligent processing and logging capability, and network connectivity capability. FIG. 9A is a front view, FIG. 9B is a bottom elevation view, FIG. 9C is a right side elevation view, and FIG. 9D is a perspective view of intelligent thermostat 900. Intelligent thermostat 900 is wall mountable, is circular in shape, and has an outer rotatable ring 912 for receiving user input(s). The outer rotatable ring 912 allows the user to make adjustments, such as selecting a new setpoint temperature. Rotation of the outer ring 912 can be sensed by an onboard optical finger navigation (OFN) module 961 that is configured and positioned to sense movement of a textured surface relative to an inner surface of the outer ring 912. The front face of the intelligent thermostat 900 comprises a clear cover 914 that according to some embodiments is polycarbonate, and a Fresnel lens 910 having an outer shape that matches the contours of the curved outer front face of the intelligent thermostat 900. For some embodiments, an inward pressing of the outer ring 912 and/or the clear cover 914 of the intelligent thermostat 900 causes inward motion of the entire outer ring 912 and cover 914 ("inward click") toward the wall, and therefore a very large percentage of the visible portion of the intelligent thermostat 900 moves toward the wall during an inward click. This can be contrasted with the intelligent thermostat 700 of FIG. 7, supra, for which an inward pressing of the outer ring 706 and/or the glass covering over display monitor 702 and sensor ring 704 causes an inward motion of the outer ring 706 and glass covering toward the stationary circular main body 708 to reduce the thickness of the peripheral gap 710, and therefore a relatively modest percentage of the visible portion of the intelligent thermostat 700 moves toward the wall during an inward click. Behind the Fresnel lens is a passive infrared sensor 950 for detecting occupancy, i.e., for detecting the presence of a person who is generally in the same room or space as the intelligent thermostat 900. As shown in FIGS. 9A-9D, the front edge of rotating ring 912, front face 914 and Fresnel lens 910 are shaped such that they together form an integrated convexly rounded front face that has a common outward arc or spherical shape gently arcing outward.

Although being formed from a single lens-like piece of material such as polycarbonate, the cover 914 has two different regions or portions including an outer portion 914-1 that is painted or smoked and a central portion 914-2 that is visibly clear so as to facilitate viewing of an electronic display 916 disposed thereunder. According to one embodiment in which the diameter of the intelligent thermostat 900 is about 80 mm, the diameter of the electronic display 916 is about 45 mm. A second downwardly-tilted PIR sensor 952 is provided to detect an approaching user, i.e., a person who is close enough that they may be intending to physically interact with the intelligent thermostat 900 and/or may be intending to read the electronic display 916. The proximity sensor 952 can be used to detect proximity in the range of about one meter so that the intelligent thermostat 900 can initiate "waking up" when the user is approaching the thermostat. Such use of proximity sensing is useful for enhancing the user experience by being "ready" for interaction or viewing as soon as, or very soon after, the user is ready to interact with or view the thermostat. Further, the wake-on-proximity functionality also allows for energy savings within the thermostat by allowing the electronic display 916 and certain of its internal components to "sleep" when no user interaction or viewing is taking place or about to take place.

The intelligent thermostat 900 further includes a processing system (not shown in FIGS. 9A-9D), a display driver (not shown in FIGS. 9A-9D), and a wireless communication system (not shown in FIGS. 9A-9D). The processing system is configured and programmed to carry out the governance of the operation of intelligent thermostat 900 including various user interface features. The processing system is further programmed and configured to carry out other operations as described further herein, and/or in other ones of the commonly assigned incorporated applications, such as, but not limited to: automated self-programming of an HVAC schedule based on user temperature setting inputs and other factors; automated and optimally-timed determination based on historical occupancy statistics that the house is likely unoccupied and corresponding automated temperature setback to reduce energy use during those times; automated prediction of an estimated time to reach a target temperature and corresponding displayed advisory on the user interface; automated data logging and uploading of data logs to a central cloud-based server; automated and optimized control of particular HVAC equipment based on current and historical operating statistics and current and forecasted outside weather; automated gradual schedule migration (with informed user consent) to lower-energy settings over selected periods of time such that users are less likely to feel uncomfortable at the lower-energy temperature setpoints; automated generation and continuous updating of a home thermal model and HVAC characteristics for improved HVAC control; automated and optimized cooperation (with informed user consent) with utility demand-response event notifications by computation and continual updating of optimal temperature setpoint trajectories to maximize selected metrics of energy time-shifting while also minimizing selected metrics of user discomfort; and a variety of other useful and energy-saving, comfort-producing functionalities. In furtherance of these objectives, the wireless communications system is used to communicate with devices such as home wireless routers, other thermostats or HVAC system components, or other smart-home devices, with such communications being, for example, peer-to-peer communications, communications through one or more servers located on a private network, and/or communications through a cloud-based service.

Figure 10A:
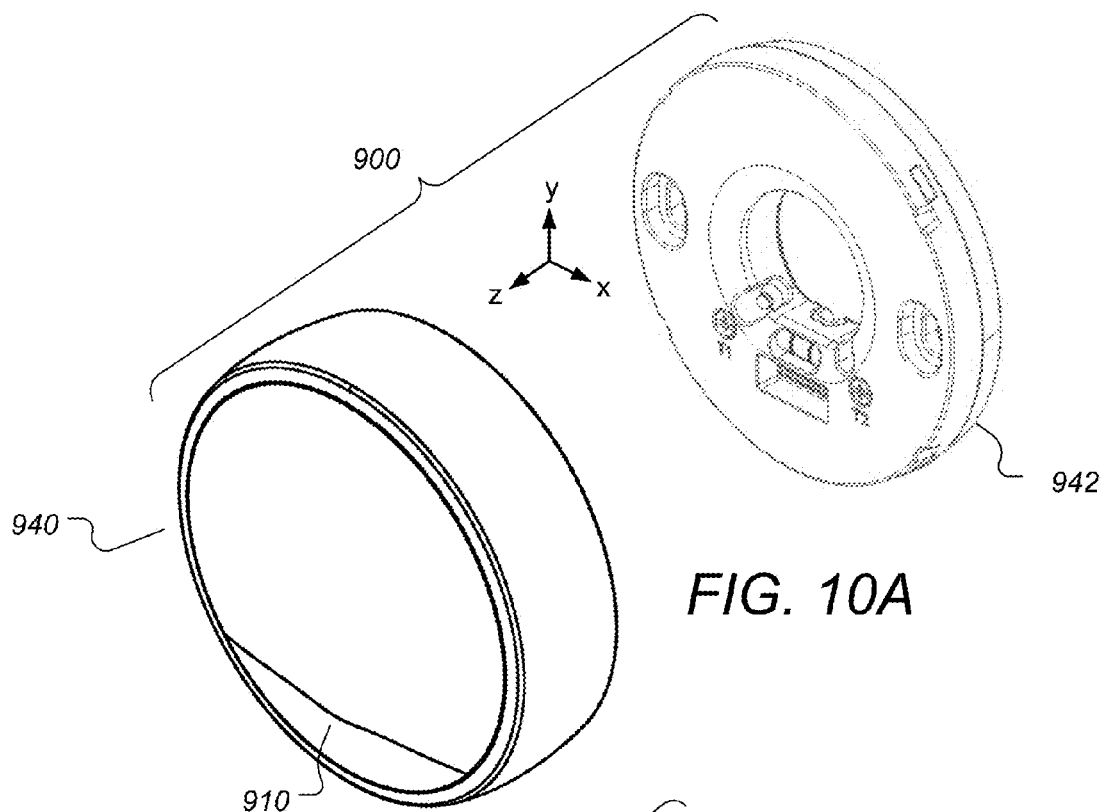
FIGS. 10A-10B illustrate exploded front and rear perspective views, respectively, of an intelligent thermostat, according to some embodiments.
Figure 10B:
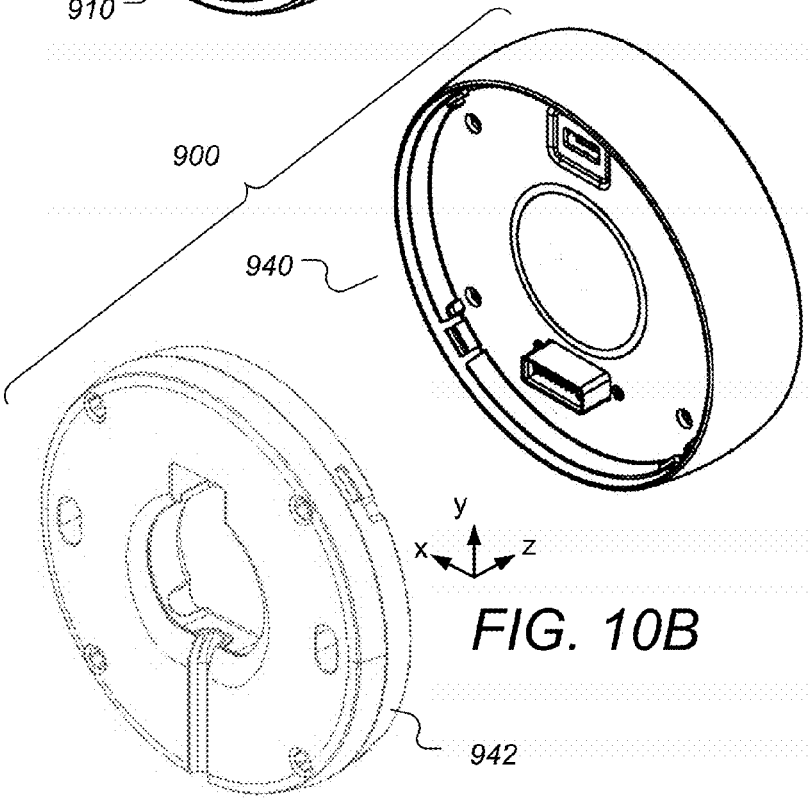

FIGS. 10A-10B illustrate exploded front and rear perspective views, respectively, of the intelligent thermostat 900 with respect to its two main components, which are a head unit 940 and a backplate 942. For ease of installation, configuration and/or upgrading, especially by a non-expert installer such as a user, as well as for providing other features and advantages, the intelligent thermostat 900 comprises a two-part mechanical assembly including the head unit 940 and the backplate 942. The backplate 942 is configured and dimensioned to be affixed to a wall or other supporting surface, and comprises wiring terminals for coupling to HVAC wires that lead to the HVAC system being controlled. The head unit 940 is removably mountable to the backplate 942. Different portions of the functionality of the intelligent thermostat 900 are judiciously apportioned between the head unit 940 and the backplate 942 such that a variety of different goals, objectives, and functionalities are achieved by virtue of their combination.

Figure 11A:
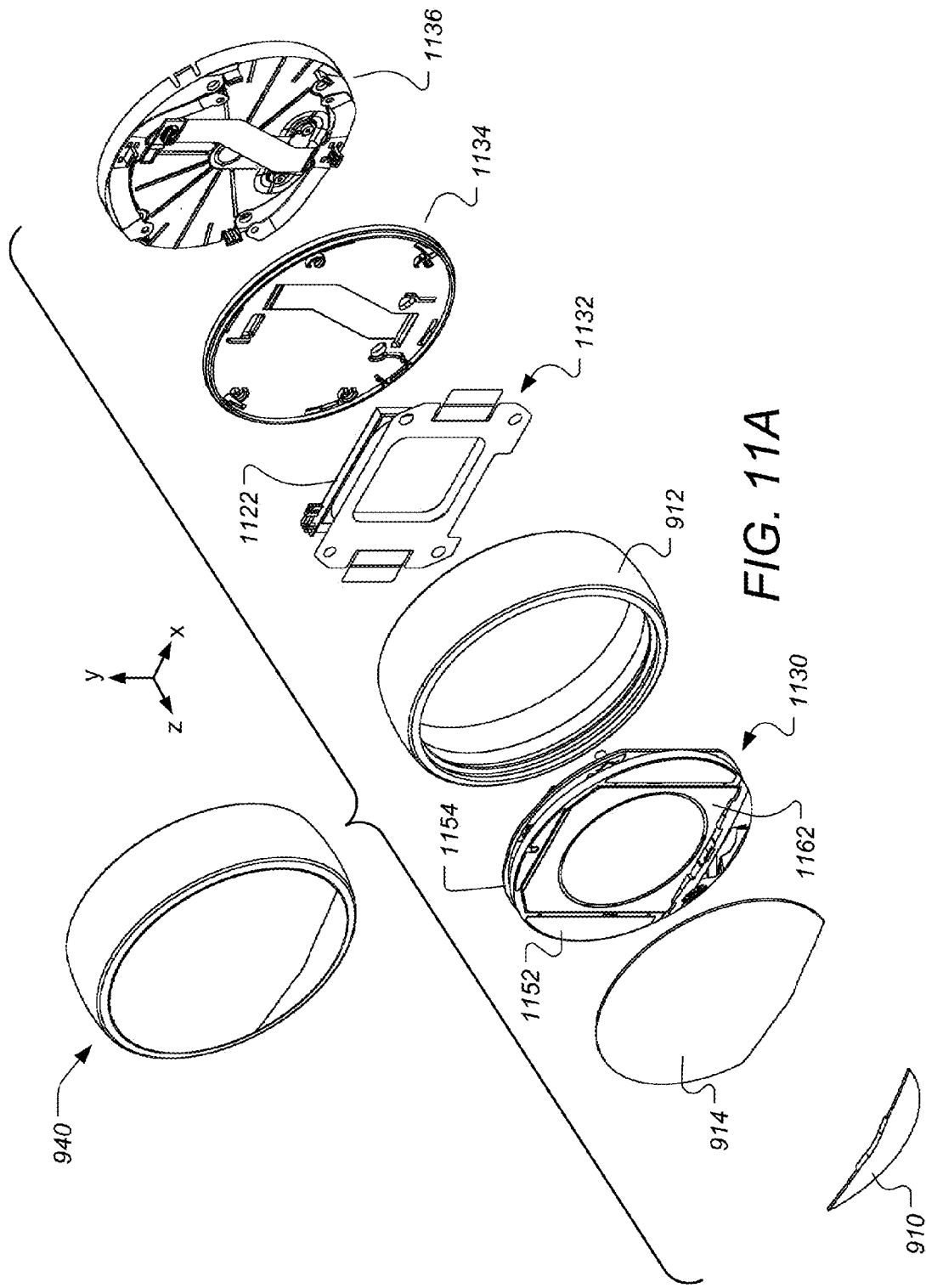
FIGS. 11A-11B illustrate exploded front and rear perspective views, respectively, of a head unit of an intelligent thermostat, according to some embodiments.
Figure 11B:
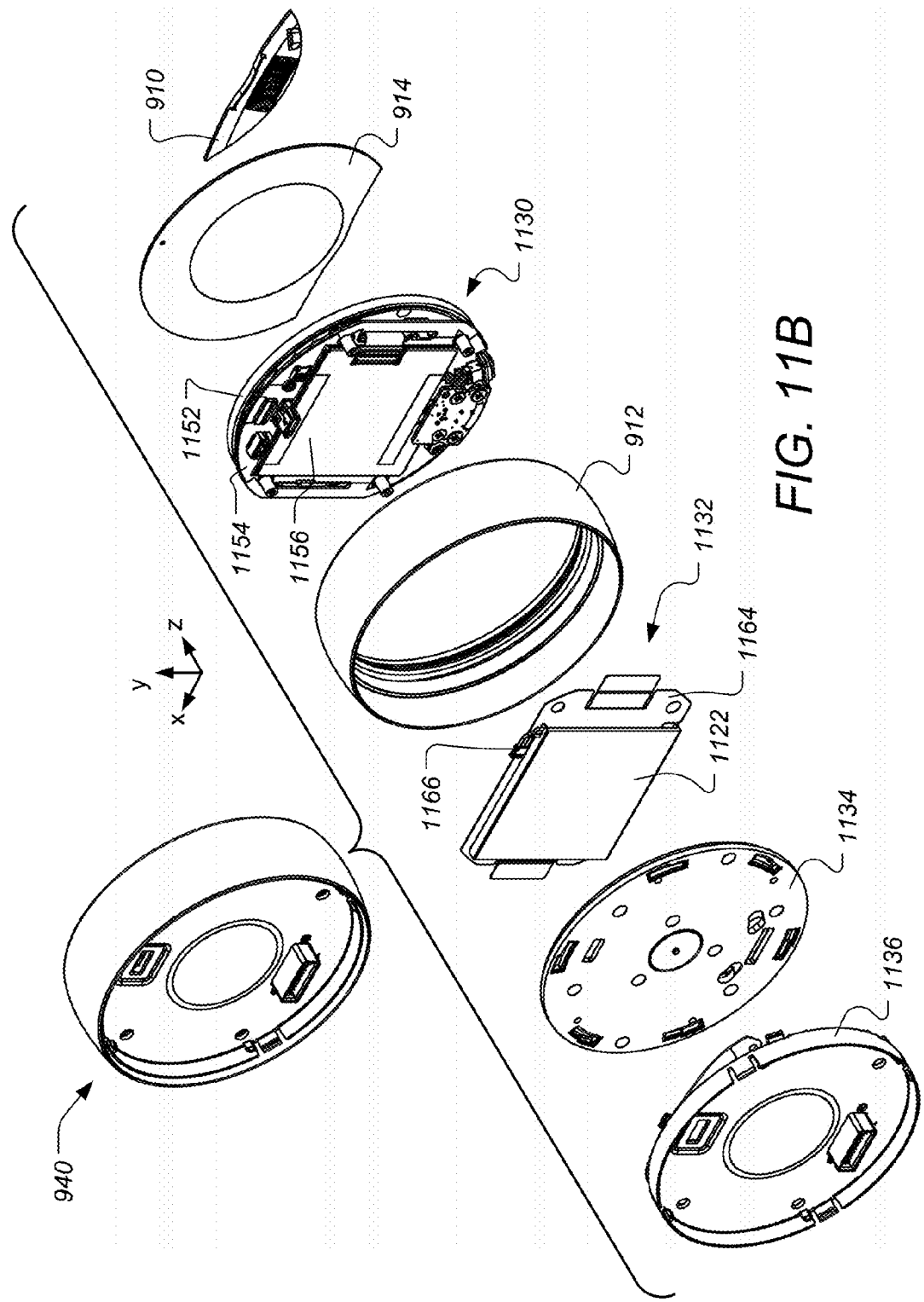

FIGS. 11A-11B illustrate exploded front and rear perspective views, respectively, of the head unit 940 with respect to its primary components. Head unit 940 includes a back cover 1136, a bottom frame 1134, a battery assembly 1132, the outer ring 912 (which is manipulated for ring rotations), a head unit frontal assembly 1130, the front lens 914, and the Fresnel lens 910. Head unit frontal assembly 1130 includes a top frame 1152 that contains an LCD module 1162, and further comprises a head unit printed circuit board (PCB) 1154 that contains a substantial portion of the head unit electronic components including processing, memory, wireless communication, powering and battery charging, and other electronic components. Electrical components on the head unit frontal assembly 1130 can connect to electrical components on the backplate 942 by virtue of ribbon cables and/or other plug type electrical connectors on back cover 1136. According to some embodiments, circuitry and components are mounted on both sides of PCB 1154, while in other embodiments the majority of the circuitry and components are contained on the forward-facing side (i.e., facing outward from the wall) of the head unit PCB 1154. An RF shielding can 1156 (visible in FIG. 11B) surrounds most or all of the circuitry and components of the head unit PCB 1154 and serves to shield the circuitry and components from electromagnetic interference. The portion of RF shielding 1156 that is visible in FIG. 11B shields the underside of the electrical components on the forward-facing side of the PCB 1154. The RF shielding 1156 is also present over the forward-facing side of the PCB 1154 (not visible in FIG. 11B) such that those components are fully surrounded by RF shielding.

Battery assembly 1132 includes a rechargeable Lithium-Ion battery 1122, which for one preferred embodiment has a nominal voltage of 3.7 volts and a nominal capacity of 560 mAh. To extend battery life, however, the battery 1122 is normally not charged beyond 450 mAh by the thermostat battery charging circuitry. Moreover, although the battery 1122 is rated to be capable of being charged to 4.2 volts, the thermostat battery charging circuitry normally does not charge it beyond 3.95 volts. Battery assembly 1132 also includes connecting wires 1166, and a battery mounting film 1164 that is attached to battery 1122 using a strong adhesive and to the rear shielding can 1156 of head unit PCB 1154 using a relatively weaker adhesive. By using a weaker adhesive to mount the film 1164 of battery assembly 1132 to shielding can 1156 of the PCB 1154, subsequent replacement of battery assembly 1132 (including battery 1122) is facilitated. According to some embodiments, the battery assembly 1132 is user-replaceable.

Figure 12A:
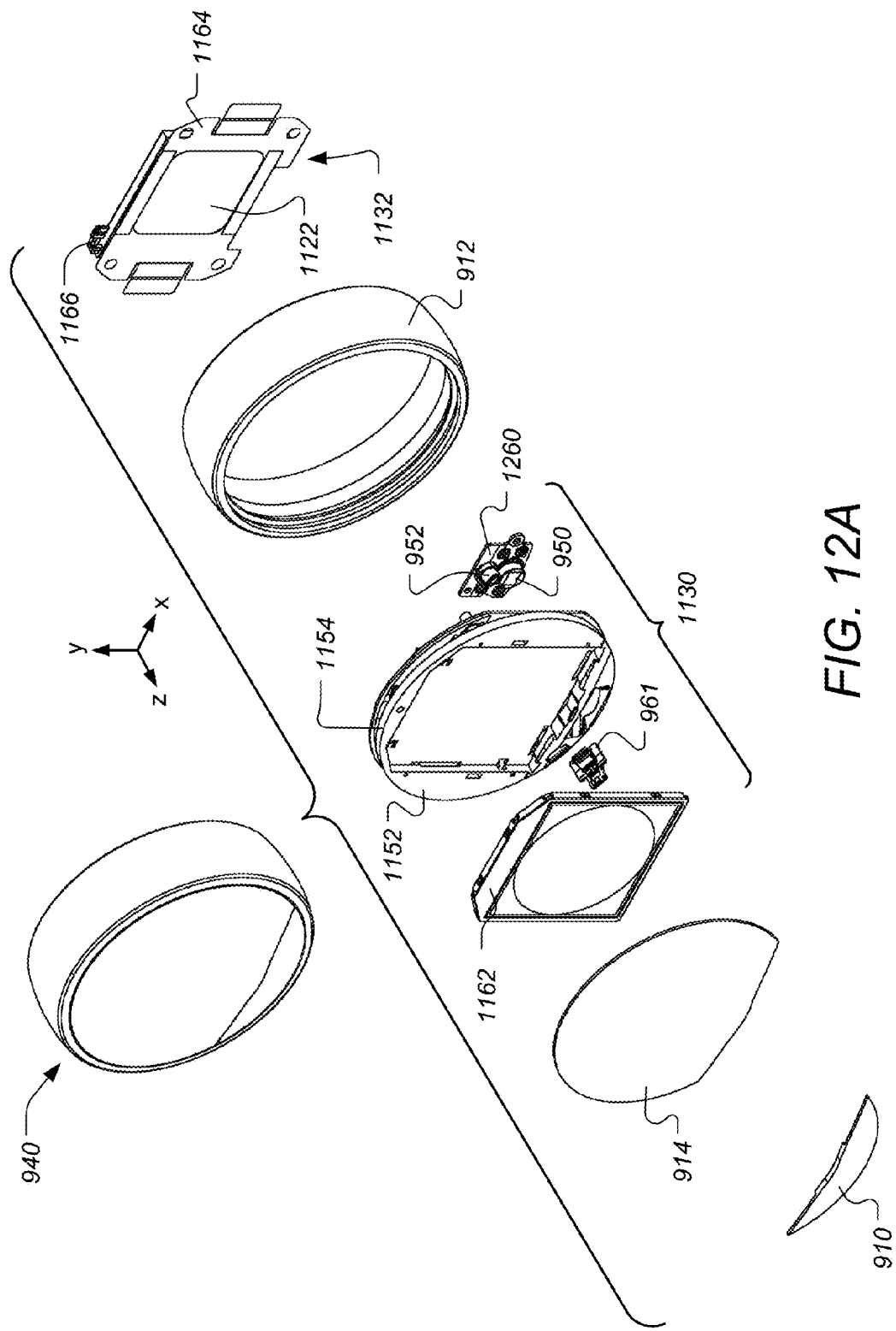

FIGS. 12A-12B illustrate additional exploded front and rear perspective views, respectively, of the head unit 940, with further illustration of enumerated components of the head unit frontal assembly 1130. Head unit frontal assembly 1130 comprises the head unit top frame 1152, the head unit PCB 1154, and the LCD module 1162. As illustrated, the optical finger navigation (OFN) module 961 (see FIG. 9A, supra) is implemented as a daughter board that connects to the head unit PCB 1154 and is positioned thereon so that it can sense rotation of the outer ring 912. The OFN module 961 is directed radially outwardly (that is, perpendicular to the z-axis and away from the center of the thermostat). The OFN module 961 uses methods analogous to the operation of optical computer mice to sense the movement of a textured surface on an inner face of the outer ring 912. Notably, the OFN module 961 is one of the very few sensors that are controlled by a relatively power-intensive head unit microprocessor rather than a relatively low-power backplate microprocessor, which are discussed further below. Among other functions, the relatively low-power backplate microprocessor is used for polling and controlling sensors for temperature, humidity, infrared proximity, ambient light level detection, and inward-click user inputs so that the relatively high-powered head unit microprocessor can be in a low-power sleep state for most of the time. Notably, control of the OFN module 961 by the head unit microprocessor can be achieved without confounding this power conservation strategy, because the head unit processor will already be awake (by virtue of detection by the PIR motion sensors 950/952) by the time the user manually turns the rotatable ring 912. Advantageously, very fast response to the user's turning of the rotatable ring 912 can be provided by the head unit microprocessor. In some embodiments, the OFN module 961 may be a relatively "smart" sensor that manages its own power and stores data locally until retrieved. This may be contrasted with the other sensors on the intelligent thermostat that may not have either of these capabilities. Also, since the OFN module 961 may be used primarily for user interface operations and not for occupancy/HVAC control, it connects to the processor driving the user interface.

Also visible in FIGS. 12A-12B is Fresnel lens 910 that operates in conjunction with the two PIR motion sensors 950 and 952 (see FIG. 9A, supra) that are mounted on a PIR mini-board 1260, which in turn attaches to the back side (i.e., the wall-facing side) of PCB 1154. Openings at corresponding locations of the top frame 1152 and PCB 1154 allow infrared radiation that has passed through Fresnel lens 910 to impinge upon the PIR motion sensors 950 and 952. Two or more temperature sensors are also located in the head unit 940 and cooperate to acquire reliable and accurate room temperature data. One of the temperature sensors is located on the daughter board of the OFN module 961 and the other is mounted on the head unit PCB 1154.

Figure 13:
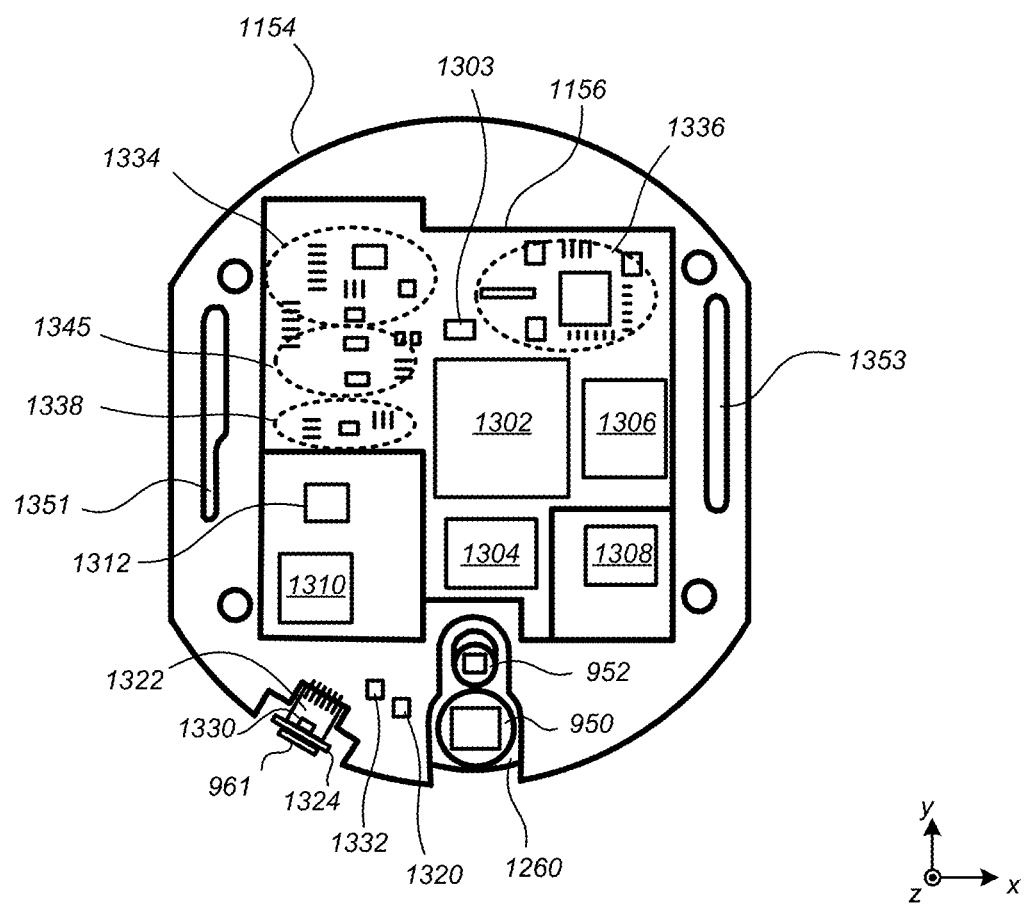
FIG. 13 illustrates a front view of a head unit circuit board of a head unit of an intelligent thermostat, according to some embodiments.

FIG. 13 illustrates a front aerial view of the head unit PCB 1154. The head unit circuit board 1154 comprises a head unit microprocessor 1302, such as a Texas Instruments AM3703 chip, and an associated oscillator 1303, along with DDR SDRAM memory 1304 (which may be, for example, 64 MB or greater in size), and mass NAND flash storage 1306 (which may be, for example, 256 MB or greater in size). A Wi-Fi module 1308, such as a Murata Wireless Solutions LBWA19XSLZ module, which is based on the Texas Instruments WL1270 chipset supporting the 802.11 b/g/n WLAN standard, is provided in a separate compartment of RF shielding 1156 for Wi-Fi capability. Associated with Wi-Fi module 1308 is supporting circuitry (not shown) such as a 26 MHz crystal oscillator (not shown). Head unit PCB further comprises an IEEE 802.15.4-compatible wireless communication module 1310, such as an Ember EM357 chip available from Silicon Laboratories, Inc., also in a separately shielded RF compartment. Using a protocol that is compatible with IEEE 802.15.4, which is a standard that specifies the physical and media access control layers for relatively low-rate wireless personal area networks, the intelligent thermostat 900 may be provided with an ability to communicate directly with different smart-home sensors for achieving any of a variety of useful environmental control and monitoring objectives. Associated with the IEEE 802.15.4 module 1310 is supporting circuitry such as a 24 MHz crystal oscillator (not shown) and a front end chip 1312, such as a SKY65384 Front-End Module available from Skyworks Solutions, Inc., that comprises a transmit amplifier, a low-noise amplifier for receive, and a transmit/receive switch. Preferably, both the Wi-Fi module 1308 and IEEE 802.15.4 module 1310 are dynamically programmable, with programs for each being stored in the mass NAND flash storage 1306 and loaded thereon upon reboot, which provides an ability for respective new, different, or updated programs to be downloaded from a central server, stored in the mass NAND flash storage 1306, and then loaded into the respective wireless modules 1308/1310.

Head unit PCB 1154 further includes the PIR mini-board 1260 that is screw-mounted thereto (screws not shown) below the plane thereof, the PIR mini-board 1260 for supporting the forward-facing (occupancy detecting) PIR detector 950, and the diagonally-downward-facing (proximity detecting) PIR detector 952, such that each of the PIR detectors protrudes through an inwardly extending opening of the head unit PCB 1154. By way of example and not by way of limitation, the forward-facing (occupancy detecting) PIR detector 950 may be a PYD 1794 pyroelectric detector, and the diagonally-downward-facing (proximity detecting) PIR detector 952 can be a PYD 5731 pyroelectric detector, both available from Excelitas Technologies Corp.

Head unit PCB 1154 further includes a physical/electrical connector 1322 that mounts thereto inside of an inwardly facing recess along a perimeter thereof. Mateably attached to the physical/electrical connector 1322 is a daughterboard 1324 that, when so attached, rises perpendicular to the head unit PCB 1154 (i.e., in the z-direction in FIG. 13). Mounted on an outwardly facing surface of the daughterboard 1324 is the optical finger navigation (OFN) module 961 (see FIG. 9, supra) for tracking rotation of the outer ring 912. By way of example, the OFN module 961 can be an ADBS-A350 OFN Sensor available from Avago Technologies. Mounted on an inwardly facing surface of the daughterboard 1324, and rising substantially above the plane of the head unit PCB 1154, is a first temperature sensor 1330. Mounted on the surface of the head unit PCB 1154 is a second temperature sensor 1332, along with a nearby ambient light sensor (ALS) module 1320. The temperature sensors 1330 and 1332 can each be, for example, a TMP112 Digital Temperature Sensor available from Texas Instruments.

Head unit PCB further includes, inside the RF shielding 1156, battery charging circuitry 1334, preferably including an LTC4085-4 chip available from Linear Technologies Corporation, or other devices or circuitry that provides equivalent functionality and advantages. The LTC4085-4 is a USB power manager and Li-Ion/Polymer battery charger chip originally developed for portable battery-powered applications. Head unit PCB 1154 further includes main power management circuitry 1336 including DC/DC step-down conversion and voltage regulation circuitry. Head unit PCB 1154 further includes piezoelectric driving circuitry 1345 for actuating a piezoelectric buzzer that is mounted on a bottom surface of a top lid of the RF shielding 1156, for providing optional audible sounds such as a "tick" sound responsive to user ring rotations. Head unit PCB 1154 further includes display backlight voltage generation circuitry 1338.

Slotted openings 1351 and 1353 are provided in the head unit PCB 1154 to facilitate mechanical assembly including providing space for ribbon cables, such as a ribbon cable that runs from the back side of head unit PCB 1154 to the LCD module 1162 (see FIG. 11A, supra). Two RF antennae (not shown) are provided in the head unit PCB 1154, the antennae running alongside the respective slotted openings 1351 and 1353.

Figure 14:
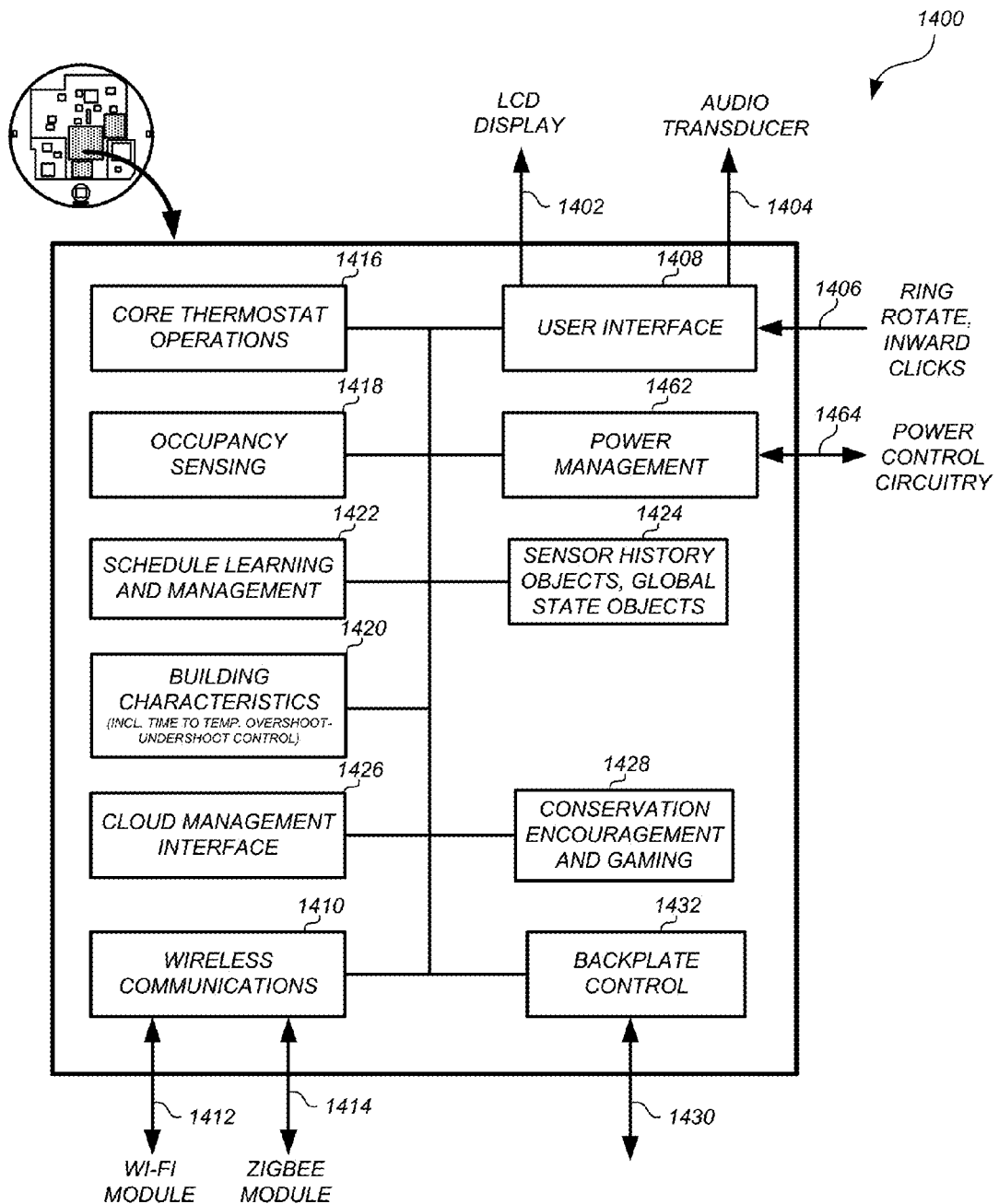
FIG. 14 illustrates a simplified functional block diagram for a head unit, according to one embodiment.

In addition to physical divisions within the thermostat that simplify the installation process, the thermostat may also be divided functionally between the head unit and the backplate. FIG. 14 illustrates a simplified functional block diagram 1400 for a head unit, according to one embodiment. The functions embodied by block diagram 1400 are largely self-explanatory, and may be implemented using one or more processing functions. As used herein, the term "processing function" may refer to any combination of hardware and/or software. For example, a processing function may include a microprocessor, a microcontroller, distributed processors, a lookup table, digital logic, logical/arithmetic functions implemented in analog circuitry, and/or the like. A processing function may also be referred to as a processing system, a processing circuit, or simply a circuit.

In this embodiment, a processing function on the head unit may be implemented by an ARM processor. The head unit processing function may interface with the electronic display 1402, an audio system 1404, and a manipulation sensor 1406 as a part of a user interface 1408. The head unit processing function may also facilitate wireless communications 1410 by interfacing with various wireless modules, such as a Wi-Fi module 1412 and/or a ZigBee-style module 1414. Furthermore, the head unit processing function may be configured to control the core thermostat operations 1416, such as operating the HVAC system. The head unit processing function may further be configured to determine or sense occupancy 1418 of a physical location, and to determine building characteristics 1420 that can be used to determine time-to-temperature characteristics. Using the occupancy sensing 1418, the processing function on the head unit may also be configured to learn and manage operational schedules 1422, such as diurnal heat and cooling schedules. A power management module 1462 may be used to interface with a corresponding power management module on the backplate and/or base unit, the rechargeable battery, and a power control circuit 1464.

Additionally, the head unit processing function may include and/or be communicatively coupled to one or more memories. The one or more memories may include one or more sets of instructions that cause the processing function to operate as described above. The one or more memories may also include a sensor history and global state objects 1424. The one or more memories may be integrated with the processing function, such as a flash memory or RAM memory available on many commercial microprocessors. The head unit processing function may also include a cloud management interface 1426 configured to interface with a cloud management system, and may also operate to conserve energy and/or facilitate gaming 1428 wherever appropriate. An interface 1432 to a backplate processing function 1430 may also be included, and may be implemented using a hardware connector.

One particularly advantageous feature of the head unit is its ability to operate with different types of backplates. For example, the head unit described above can be coupled with a backplate that is configured to accept wire connections from a forced air HVAC system. The head unit can be coupled to a backplate that accepts connections from an HVAC system comprising an air conditioner, a humidifier, a forced air heating system, a radiant flooring system, and/or the like. This particular backplate may also be configured to harvest power from an HVAC system by stealing power from an HVAC call relay wire. Additionally or alternatively, the backplate may be configured to operate using a common "C" wire from the HVAC system.

Figure 15B:
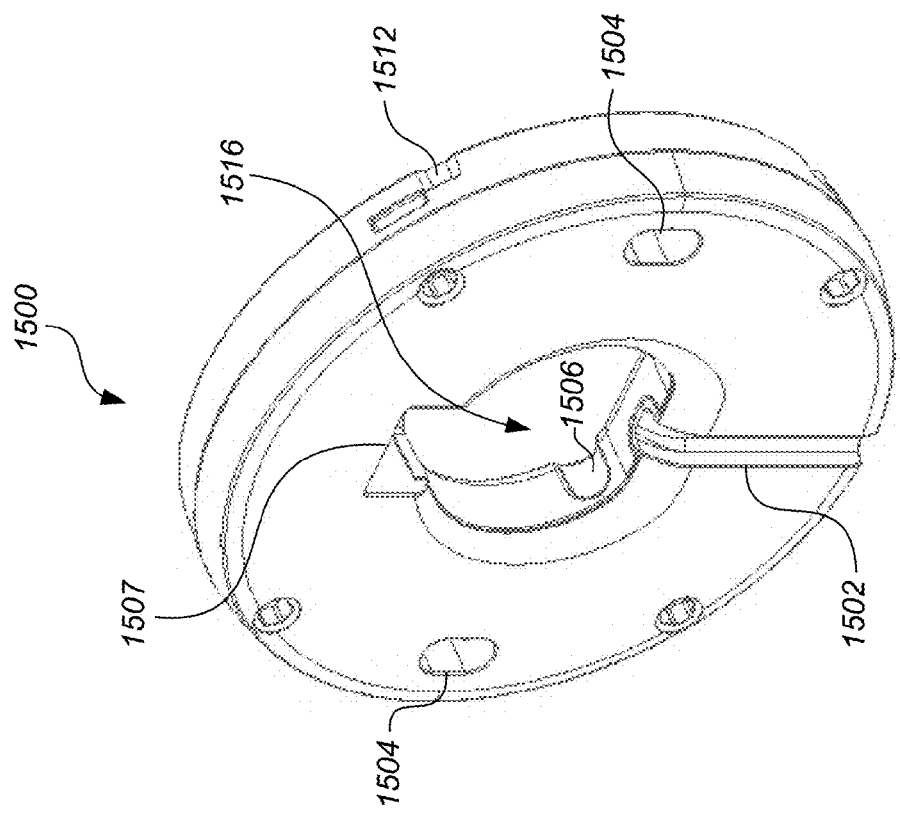
FIGS. 15A-B illustrate front and rear perspective views of a backplate of an intelligent thermostat, according to some embodiments.
Figure 15A:
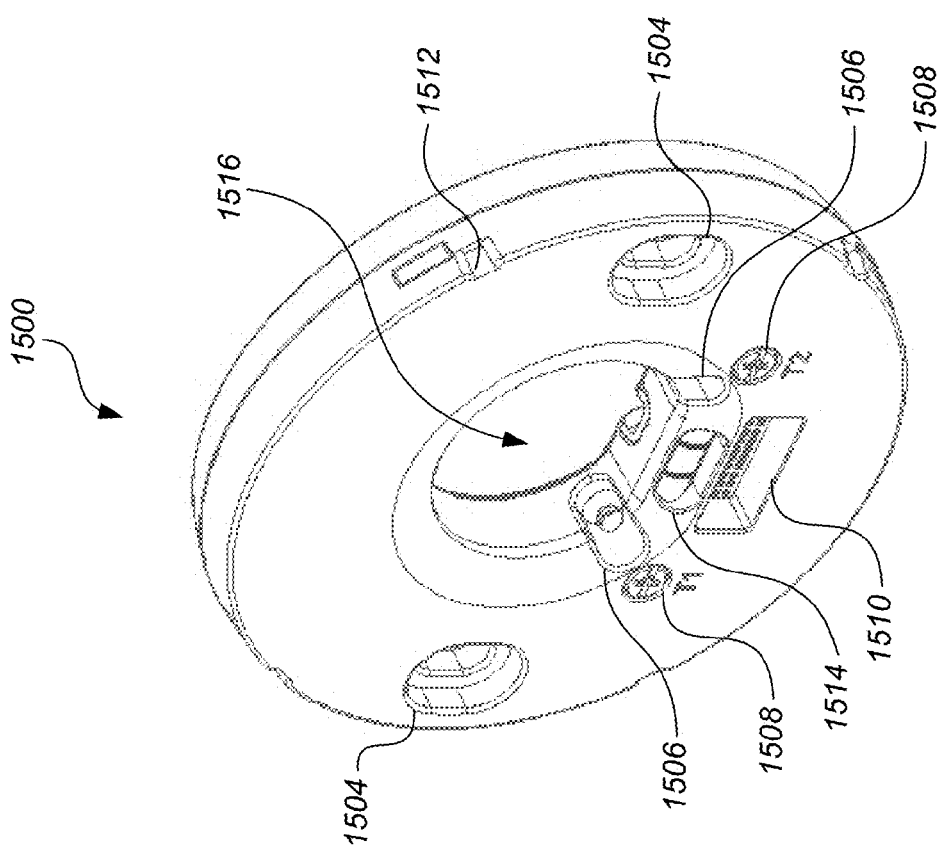

In the intelligent thermostat system for boiler-based systems, the head unit can be coupled to a backplate that is simpler than the backplate described above for forced air HVAC systems. FIGS. 15A-15B illustrate front and rear perspective views of a backplate 1500 of an intelligent thermostat, according to some embodiments. FIGS. 15A-15B only illustrate the external form factor and features of the backplate 1500; the internal circuitry and functional operational are described below. To provide for easy installation, the backplate 1500 may include wire insertion points 1506 configured to receive a two-wire connection from the base unit. In this embodiment, screws 1508 may be used to secure wires into the insertion points 1506 after they are inserted. Screws may be advantageous because the wires inserted into the insertion points 1506 will typically be from an old installation. Therefore, these wires will generally be large gauge wires that were suitable for carrying 220 VAC. In other embodiments, mechanical insertion devices may include a finger-pressable tab that allows wire to be inserted when pressed and secures the wire therein when released. During installation, the user can slide the exposed wires through the opening 1516 in the center of the backplate 1500, insert the wires into the insertion points 1506, and secure the wires using the screws 1508. A groove 1502 is formed in the back of the backplate and configured to allow the wires to run through the groove 1502 from the insertion points 1506 and out the bottom side of the backplate 1500 such that the backplate 1500 can be mounted flush to a wall.

After installation of the wires connecting the backplate 1500 to the base unit, the backplate 1500 can be mounted to, for example, a wall of the enclosure. The backplate 1500 can be mounted through screw holes 1504 on the sides of the backplate 1500. The opening for the screw holes 1504 on the front side of the backplate 1500 (FIG. 15A) may be large enough to accommodate a mounting screw head. In contrast, the opening for the screw holes 1504 in the backside of the backplate 1500 (FIG. 15B) may be tapered, or shelved to catch the mounting screw head. Additionally, the screw holes 1504 may be vertically oversized or oval-shaped, such that once the screws are inserted into the screw holes 1504 and partially screwed into the wall, the backplate 1500 can still be rotated around a center axis in order to ensure a level installation. A bubble level 1514 is built into the backplate 1500 such that a user can visually determine when the backplate 1500 is correctly mounted to the wall.

In some installations, the backplate 1500 will not be connected to a base unit via a wired connection. Therefore, the base unit cannot provide power to the backplate 1500 through the insertion points 1506. In order to receive power, the backplate 1500 can include a USB port 1507 that can accept a micro USB connector that provides power to the backplate 1500 and head unit. The micro USB connector can be wired to a USB power converter brick that is well-known in the art, which can in turn be inserted into a traditional AC outlet. As with the two-wire installation, the wire for the USB connector can be routed through the groove 1502 in the backside of the backplate 1500.

Once the backplate 1500 is mounted to the wall, the head unit can be connected to the backplate. Connecting the backplate 1500 to the head unit can include connecting a connector on the head unit (shown in FIG. 10B) to a connector 1510 on the backplate 1500. The connector 1510 can communicate between microprocessors on the backplate 1500 and microprocessors in the head unit, as well as provide power from the backplate to the head unit to operate circuitry or charge the rechargeable battery. Connecting the backplate 1500 to the head unit can also include a physical connection using recesses 1512 in the backplate 1500 to accept corresponding tabs in the head unit. The tab connection can provide an additional mechanical resistance to separating the head unit from the backplate 1500.

Figure 16:
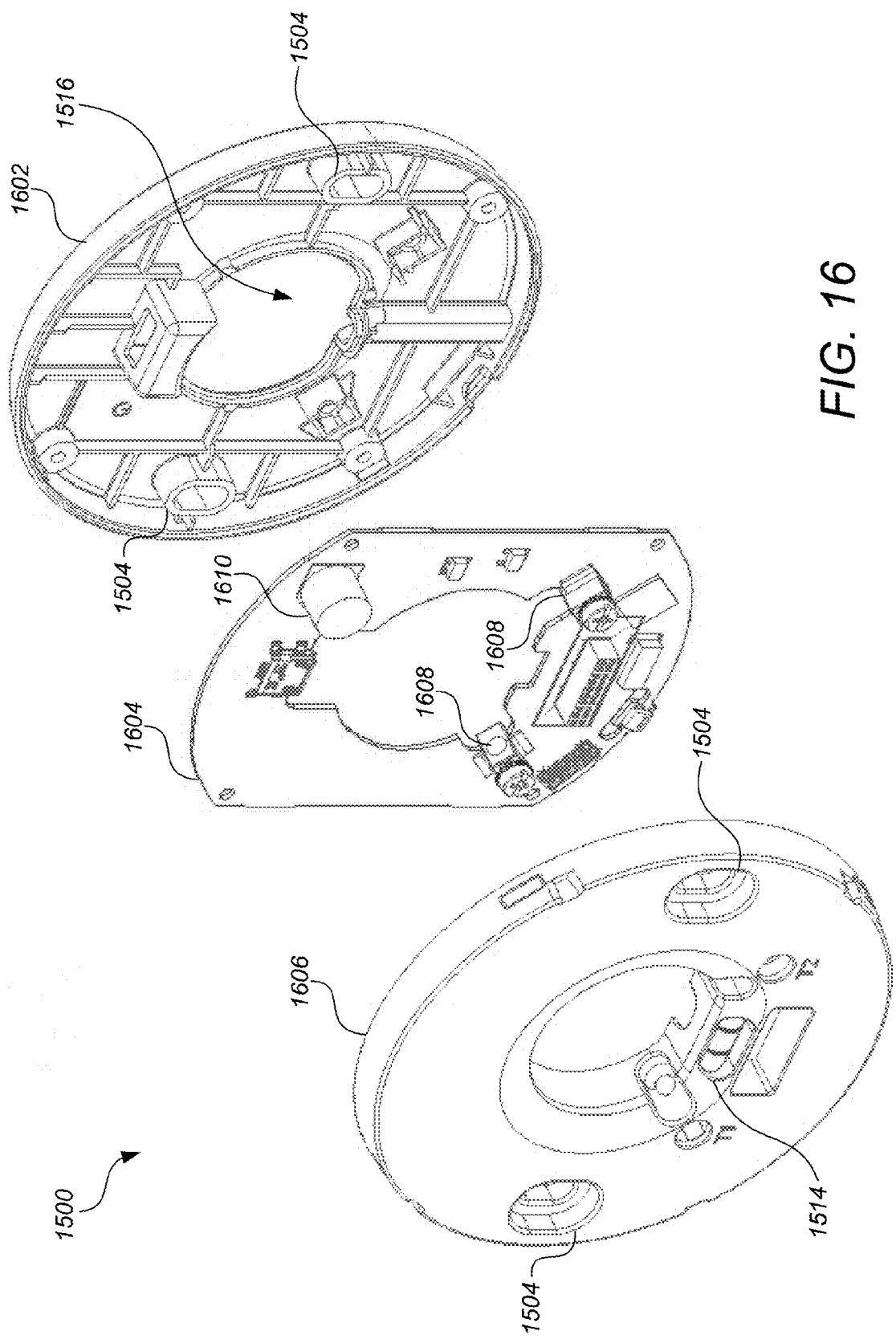
FIG. 16 illustrates exploded front and rear perspective views, respectively, of a backplate of an intelligent thermostat, according to some embodiments.

FIG. 16 illustrates exploded front and rear perspective views, respectively, of a backplate 1500 of an intelligent thermostat, according to some embodiments. The backplate 1500 comprises a backplate rear plate 1602, a backplate circuit board 1604, and a backplate cover 1606. Visible in FIG. 16 are base unit wire connectors 1608 that can include integrated mechanical wire insertion sensing circuitry, and capacitors 1610 that are used by part of the power management circuitry that is mounted on the backplate circuit board 1604. According to some embodiments, backplate circuit board 1604 includes a microcontroller, and various functional support and power electronics. For some embodiments, the backplate circuit board 1604 further contains a temperature/humidity sensor integrated together in a common IC chip. Wire connectors 1608 are provided to allow for connection to the base unit wires, which pass though the large central circular opening 1516 when the backplate unit 1500 is mounted to the wall. Also visible in FIG. 16 are the two mounting holes 1504 for use in fixing the backplate to the wall. The vertically extended mounting holes 1504, together with an integrated bubble level 1514 facilitate leveling during installation without requiring an external leveling gauge, thereby further enhancing the ease of a non-expert installation of the intelligent thermostat. The backplate circuit board 1604 is shaped such that the mounting screws can pass through the mounting holes 1504 without interfering with the backplate circuit board 1604. For example, the edges of the backplate circuit board 1604 can be trimmed such that the backplate circuit board 1604 is narrower than the backplate as illustrated in FIG. 16. This board shape not only facilitates coupling of the backplate 1500 to a wall but also improves the antenna radiation pattern from the head unit and saves cost by reducing the PCB board area. A detailed description of the backplate circuit board 1604 and the functions performed thereby are included below.

Figure 17:
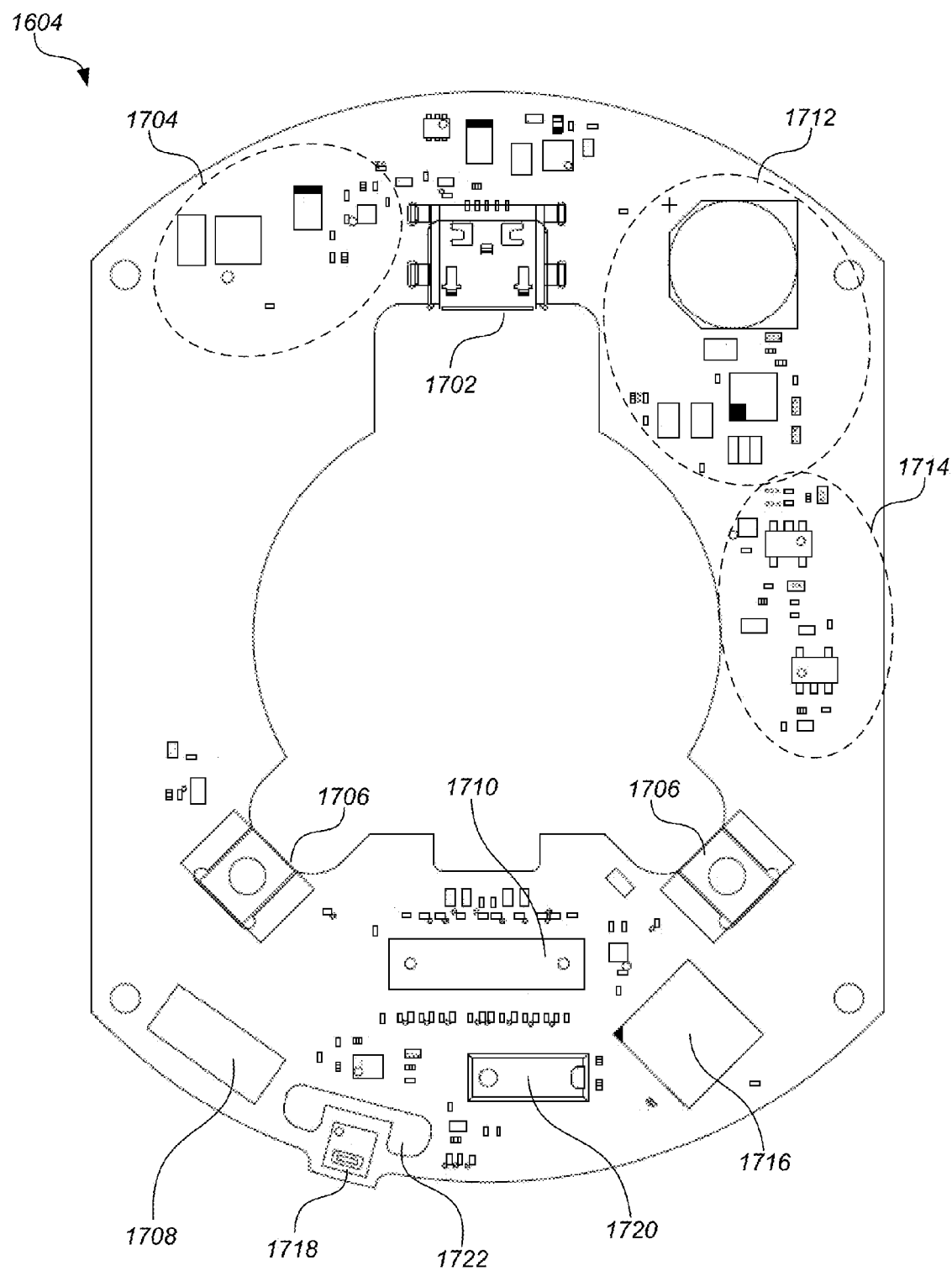
FIG. 17 illustrates a front view of a backplate circuit board of a backplate of an intelligent thermostat, according to some embodiments.

FIG. 17 illustrates an aerial view of a backplate circuit board 1604 for a backplate of an intelligent thermostat, according to some embodiments. The backplate circuit board 1604 comprises a backplate processor/microcontroller 1716 that is responsible for generally orchestrating the operation of the backplate, including controlling and polling most of the environmental sensors of the intelligent thermostat system. The backplate processor/microcontroller 1716 may comprise, for example, an ST Micro STM32L151VB microcontroller unit that includes an ultra-low-power ARM 32-bit Cortex-M3 CPU, 128 Kbytes of flash memory, 16 kB of RAM, and various other components such as direct memory access controllers, analog to digital converters, input/output ports, communication interfaces, and so forth for achieving the described functionalities.

To maximize the amount of time for which the relatively high-powered head unit processor can remain in a low-power sleep state, the relatively low-powered backplate processor/microcontroller 1716 may control and poll not only the sensors contained in the backplate 1500, but also control and poll most of the sensors contained in the head unit. For one embodiment, in addition to controlling and polling a temperature/humidity sensor chip 1718 contained on the backplate circuit board 1604, the backplate processor/microcontroller 1716 can also control and poll any or all sensors contained in the head unit with the possible exception of the optical finger navigation (OFN) module in some embodiments. As such, the backplate processor/microcontroller 1716 controls and polls the following components of the head unit: the first temperature sensor, the second temperature sensor, the ambient light sensor (ALS), the forward-facing (occupancy detecting) PIR detector, and the diagonally-downward-facing (proximity detecting) PIR detector. Electrical connectivity between the backplate processor/microcontroller 1716 and the subject head unit sensors is achieved using a 20-pin connector 1710, along with one or more port expanders on the head unit circuit board, by which the electrical connections are established when the head unit is mated to the backplate. Backplate circuit board 1604 may further comprise a timing crystal chip 1720 that may provide, for example, a 32.768 kHz signal that may be used by the backplate processor/microcontroller 1716 for timing reference purposes. In other embodiments, an internal oscillator in the backplate processor/microcontroller 1716 may be used instead of the timing crystal chip 1720. The backplate processor/microcontroller 1716 performs, in addition to the controlling and polling of the various sensors, sensing for mechanical wire insertion at installation, alerting the head unit regarding current vs. setpoint temperature conditions, and other functions such as looking for appropriate signals on the inserted HVAC wires at installation and thereafter.

Backplate circuit board 1604 further comprises the combined temperature/humidity sensor chip 1718 positioned near a lower periphery thereof. The temperature/humidity sensor chip 1718 can comprise, by way of example and not by way of limitation, a Sensirion SHT20 module. Thermal isolation of the temperature/humidity sensor chip 1718 from the rest of the backplate circuit board 1604 is facilitated by virtue of a through-hole 1722. Further disposed on the backplate circuit board 1604 in an arcuate arrangement neararound a peripheral portion of the center cutout wire connectors 1706 that may include integrated mechanical wire insertion sensing capability in some embodiments.

In backplate circuit boards used to directly control the HVAC functions in intelligent thermostats used in countries such as the United States, encapsulated transformer/diode circuits can be used for transformer-based isolation of the control and logic circuitry from the HVAC connection and switching circuitry. Disposed on the back side of the backplate circuit board (not shown) are field effect transistor (FET) switches (not shown) that perform the HVAC switching functionality and that are electrically disposed on the isolated HVAC connection and switching circuitry side of the transformer/diode circuits (not shown). The FET switches perform, inter alia, the basic closing and opening between the requisite HVAC terminals according to the desired HVAC function. One or more of the FET switches (not shown) are also judiciously configured and controlled to facilitate power stealing during active HVAC cycles for circumstances in which there is no "C-wire" available to power the thermostat. The use of FETs in the switching circuitry allows for active power stealing, i.e., taking power during the HVAC ON cycle, by briefly diverting power from the HVAC relay circuit to the reservoir capacitors for a very small interval, such as 100 micro-seconds. This time is small enough not to trip the HVAC relay into the OFF state but is sufficient to charge up the reservoir capacitors. The use of FETs allows for this fast switching time (100 micro-seconds), which would be difficult to achieve using relays (which stay on for tens of milliseconds). Also, such relays would readily degrade with fast switching, and they would also make audible noise. In contrast, the FETs operate with essentially no audible noise.

In the backplate circuit board 1604 illustrated in FIG. 17, the HVAC switching circuitry and power stealing circuitry described in the previous paragraph can be omitted. Because power is provided directly to both power the thermostat and charge the rechargeable battery, no power stealing circuitry is required. If power is provided from an external source, such as the base unit (describe below) or the micro USB connector 1702, the power will be in the form of a constant DC voltage. Additionally, the backplate circuit board 1604 is configured to operate with a base unit, and the HVAC interaction and switching circuitry described above can be moved from the backplate circuit board 1604 to the base unit as will be described below.

Power can be received from a micro-USB connector 1702, such as the molex micro-USB B receptacle, with mid-mount and through hole solder tab (Molex 47642-1001). Additionally or alternatively, DC power can be received from the base unit through the wire connectors 1706.

Backplate circuit board 1604 further comprises various other DC-power regulation circuitry for providing power that is used by the backplate processor/microcontroller 1716, the environmental sensors controlled thereby, the various other backplate circuit board components, and for providing a DC power rail voltage (e.g., 4.4 VDC) that is input to the battery charging circuitry of the head unit. Such DC-power generation circuitry includes, for example, bootstrap and primary LDO circuitry.

Bridge rectifier circuitry 1704 may include, for example, a 0.5 A SBR bridge super barrier rectifier (Diodes Inc.® part no. SBR05M100BLP), such that the user need not be concerned with matching wires between the wire connector 2010-3 at the base unit 2000 (FIG. 22) with the corresponding wire connectors 1706 on the backplate 1500. A high-voltage buck converter circuit 1712 may use, for example, a 3-17 V 0.5 A step-down converter (e.g., TPS62170 from Texas Instruments®) for generating a converted voltage output, such as 4.704 V nominal output. A low dropout (LDO) regulator circuit mounted on the back side of the backplate circuit board 1604 (not shown) may utilize, for example, a Ricoh three mode 150 mA regulator with reverse current protection (R1163x Series and/or R1191x series) to filter the output of the high-voltage buck converter circuit 1712 and generate, for example, a 4.4 V output. A similar LDO regulator circuit 1714 may utilize similar components to generate a regulated power supply for the backplate processor/microcontroller 1716. The backplate circuit board 1604 may further comprise wired communications circuitry for communicating with the base unit (described below), a slew rate limiting circuit, bootstrap and primary LDO circuitry, a sensor power control circuit that allows the backplate processor/microcontroller 1716 to power cycle all of the sensors, a reset and boot loading circuit, and a debug connection circuit 1708 to allow JTAG/UART programming.

Figure 18:
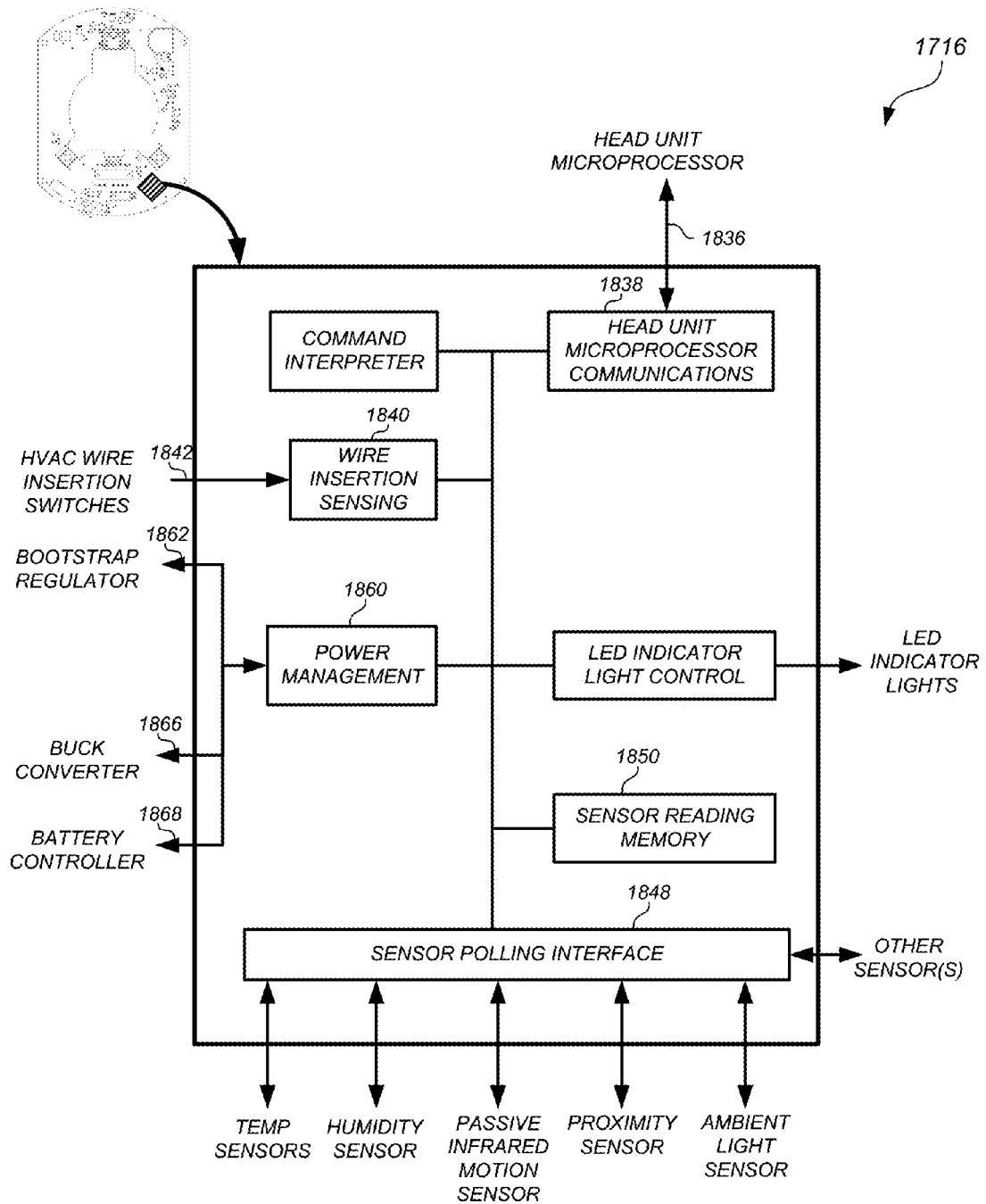
FIG. 18 illustrates a simplified functional block diagram for a backplate, according to some embodiments.

FIG. 18 illustrates a simplified functional block diagram for a backplate processor/microcontroller 1716, according to some embodiments. Using an interface 1836 that is matched to the interface 1432 shown in FIG. 14, the backplate processor/microcontroller 1716 can communicate with the head unit processing functions. The backplate processor/microcontroller 1716 can include wire insertion sensing 1840 that is coupled to external circuitry 1842 configured to provide signals based on different wire connection states and wiring configurations.

The backplate processor/microcontroller 1716 may also include a sensor polling interface 1848 to interface with a plurality of sensors. In this particular embodiment, the plurality of sensors may include temperature sensors, a humidity sensor, PIR sensors, a proximity sensor, an ambient light sensor, and or other sensors not specifically listed. This list is not meant to be exhaustive. Other types of sensors may be used depending on the particular embodiment and application, such as sound sensors, flame sensors, smoke detectors, and/or the like. The sensor polling interface 1848 may be communicatively coupled to a sensor reading memory 1850. The sensor reading memory 1850 can store sensor readings and may be located internally or externally to a microcontroller or microprocessor.

Finally, the backplate processing function can include a power management unit 1860 that is used to control various digital and/or analog components integrated with the backplate and used to manage the power system of the thermostat. Although one having skill in the art will recognize many different implementations of a power management system, the power management system of this particular embodiment can include the functions described above in relation to FIG. 17, such as a bootstrap regulator, a buck converter, a battery controller, and/or various voltage regulation circuits.

Figure 19C:
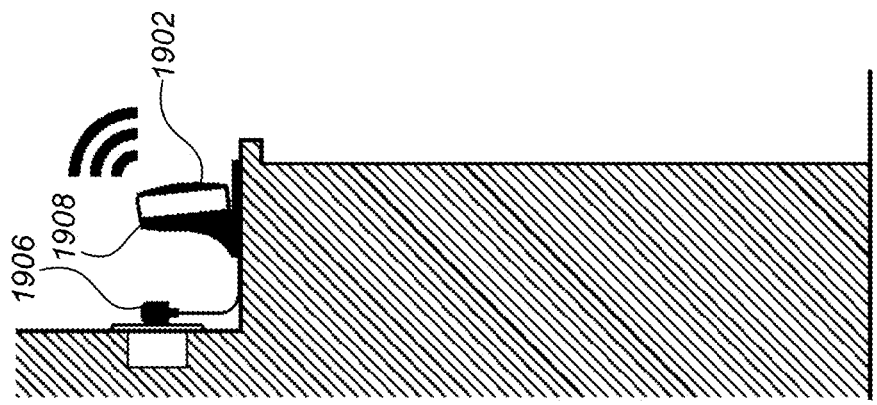
FIGS. 19A-19C illustrate different installation configurations of an intelligent thermostat, according to some embodiments.
Figure 19B:
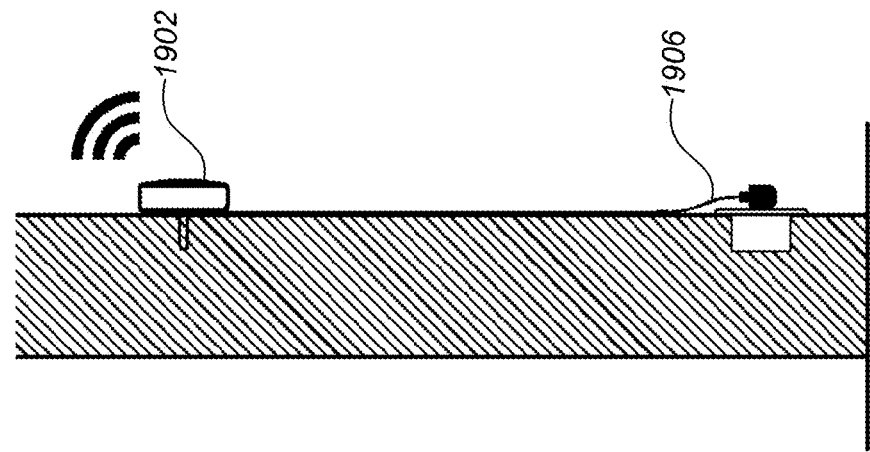
Figure 19A:
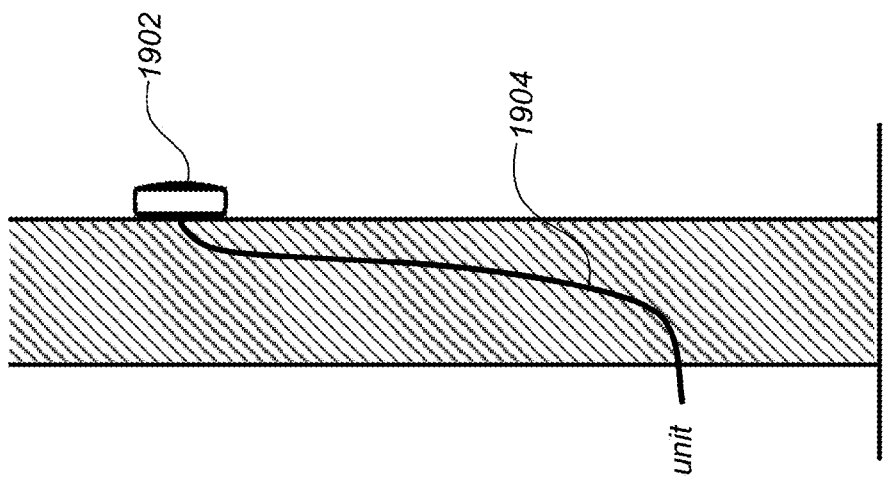

Having described the connection between the head unit and the backplate, the intelligent thermostat can be assembled and powered as described above. For convenience during installation and operation, multiple installation configurations are possible depending upon the particular type of enclosure, the preference of the homeowner, and/or the condition of existing thermostat circuitry within the enclosure. FIGS. 19A-19C illustrate different installation configurations of an intelligent thermostat, according to some embodiments.

FIG. 19A illustrates an installation configuration utilizing existing thermostat wires connected to a programmer and/or boiler system. When upgrading an existing thermostat with the intelligent thermostat 1902, a wire connection 1904 may already run through the walls of the enclosure. When installing the intelligent thermostat 1902, the same two wires used in the wire connection 1904 may be used to connect the intelligent thermostat 1902 to the base unit near the boiler system. In this configuration, the 220 VAC main power line supply may be converted by the base unit into DC power and provided to the intelligent thermostat 1902 through the wired connection 1904. Additionally, the wire connection 1904 may be used to communicate information between the base unit and the intelligent thermostat 1902.

Additionally or alternatively, the intelligent thermostat 1902 may use a wireless connection to communicate with the base unit. In some embodiments, the wired connection 1904 may be considered a primary connection, while the wireless connection may be used as a backup connection. Various configurations are possible. In one embodiment, both the wired connection 1904 and the wireless connection may operate in parallel transmitting the same information. In another embodiment, the wired connection may be active during times when the wireless connection is unavailable, for example due to interference, low-power situations, or situations where the intelligent thermostat 1902 is out of wireless range for the radio. In another embodiment, the wired connection 1904 may transmit signals that determine when the boiler should supply heated water/steam to the area monitored by the intelligent thermostat 1902, while the wireless connection transmits more advanced diagnostic information, such as user occupancy patterns, collocated schedules, and/or the like for storage or analysis in the base unit. The base unit may also communicate information back to the thermostat, such as wireless signal strength, input power, relay state, temperature, time since last successful RF communication, number of onboard power cycles since last successful RF communication, and/or other diagnostic data.

In some embodiments, the intelligent thermostat may include a first radio and a second radio. The first radio may be configured for high data rate communications, such as those that take place with a local Wi-Fi network. The second radio may be configured for relatively low data rate communications, such as communications between the thermostat and the base unit. The second radio may be compatible with the IEEE 802.15.4 standard and may use a ZigBee protocol or a similar protocol. The second radio on the thermostat may be compatible with a third radio on the base unit that is also configured for relatively low data rate communications. While the second radio is communicating control signals for the boiler system to the third radio on the base unit, the first radio may transmit auxiliary communications to a local Wi-Fi network. For example, the first radio may transmit sensor data, occupancy data, user commands, and other such auxiliary information to a cloud-based server or network.

FIG. 19B illustrates a second installation configuration where the intelligent thermostat 1902 is mounted to the wall of the enclosure, but power is provided through an outlet power brick 1906 to the intelligent thermostat 1902 via, e.g., the micro USB connector of the intelligent thermostat 1902. In this case, no wired connection exists to the base unit, so the intelligent thermostat 1902 can instead communicate with the base unit using a wireless connection.

FIG. 19C illustrates a third installation configuration where the intelligent thermostat 1902 is not mounted to a wall of the enclosure, but is instead mounted to an intelligent thermostat stand 1908. The intelligent thermostat stand 1908 may be set on a desk, countertop, table, bookshelf, and/or the like, such that no permanent mounting needs to take place on the wall of the enclosure. Power may be provided through an outlet power brick 1906 through, e.g., the micro USB connector of the backplate.

Figure 20B:
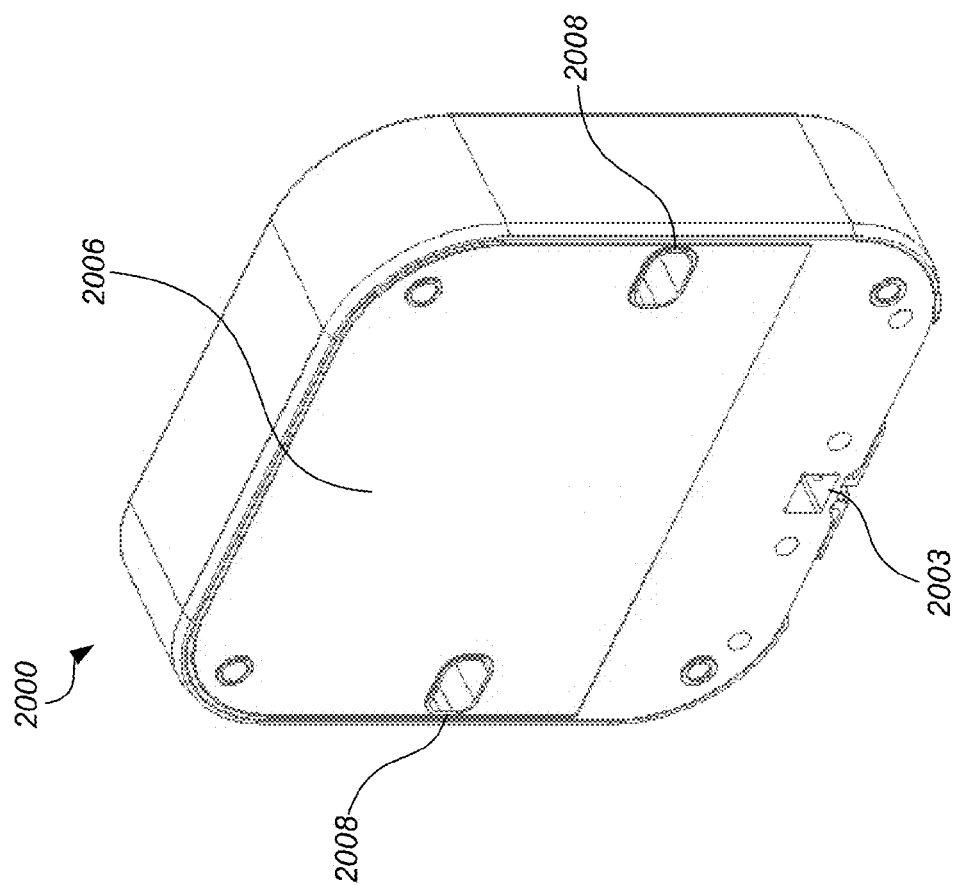
FIGS. 20A-20B illustrate front and rear views of a base unit of an intelligent thermostat system, according to some embodiments.
Figure 20A:
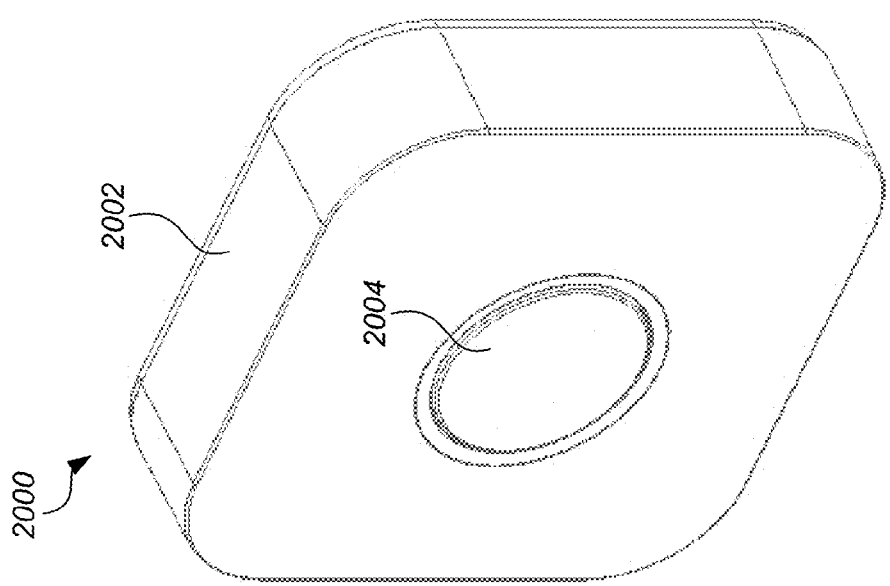

Turning now to a detailed description of the base unit, FIGS. 20A-20B illustrate front and rear views of a base unit 2000 of an intelligent thermostat system, according to some embodiments. The base unit 2000 may include a front cover 2002 that is designed to both protect the internal circuitry and provide for a sleek and elegant visual appearance that can blend in with its surroundings. The front cover 2002 hides the internal complexity of the base unit 2000 in order to provide users with a comforting interface that can inspire confidence and user-friendliness, as well as isolate the user from the high-voltage wires beneath.

In some embodiments, at least one external control may be accessible through the front cover 2002. For example, a button 2004 may be provided such that a user can easily provide a limited set of commands to the base unit 2000 without a programming interface. The button 2004 may be large such that is easily identifiable, and may include a logo or trademark of a manufacturer, such as "Nest." The button 2004 may include a "click" mechanism such that the user can readily determine when depressing the button 2004 has registered a command to the internal circuits of the base unit 2000.

The button 2004 may be used to provide a plurality of commands. In order to immediately call for heat regardless of the temperature, schedule, and/or commands from the intelligent thermostat, a user can depress the button 2004. This can close internal relays of the base unit and activate the boiler system such that heated water/steam is circulated throughout radiators in the enclosure. Similarly, a second depression of the button 2004 can deactivate a call for heat, regardless of whether the original heating command was provided from the button 2004 or from the intelligent thermostat. Additionally, pressing button 2004 and holding it for a duration, such as 3 seconds, 5 seconds, or 10 seconds, may be used to reset the internal circuitry of the base unit 2000 in cases where the user believes a software malfunction has occurred. In some embodiments, other input patterns with button 2004 may be used, such as double-clicks, triple clicks, etc. and button depressions lasting for varying time intervals. These additional input patterns may provide commands that cause the base unit 2002 to wirelessly pair with an intelligent thermostat, commands the cause the base unit 2000 to call for heat for a specified period of time, and/or any other commands that would normally be provided from the intelligent thermostat.

The front cover 2002 can connect to a back cover 2006 of the base unit 2000. The base unit can be mounted flush to the boiler, to a wall near the boiler, and/or to any other surface in proximity to the boiler. Alternatively, the base unit 2000 may be placed on a surface in proximity to the boiler. The base unit 2000 may be mounted through screw holes 2008 that are visible through the back of the back cover 2006, yet covered by the front cover 2002. The front cover 2002 may be coupled to the rest of the base unit 2000 by way of tabs near the top of the front cover 2002 (not shown), and secured in place using a screw mechanism 2003.

Figure 21:
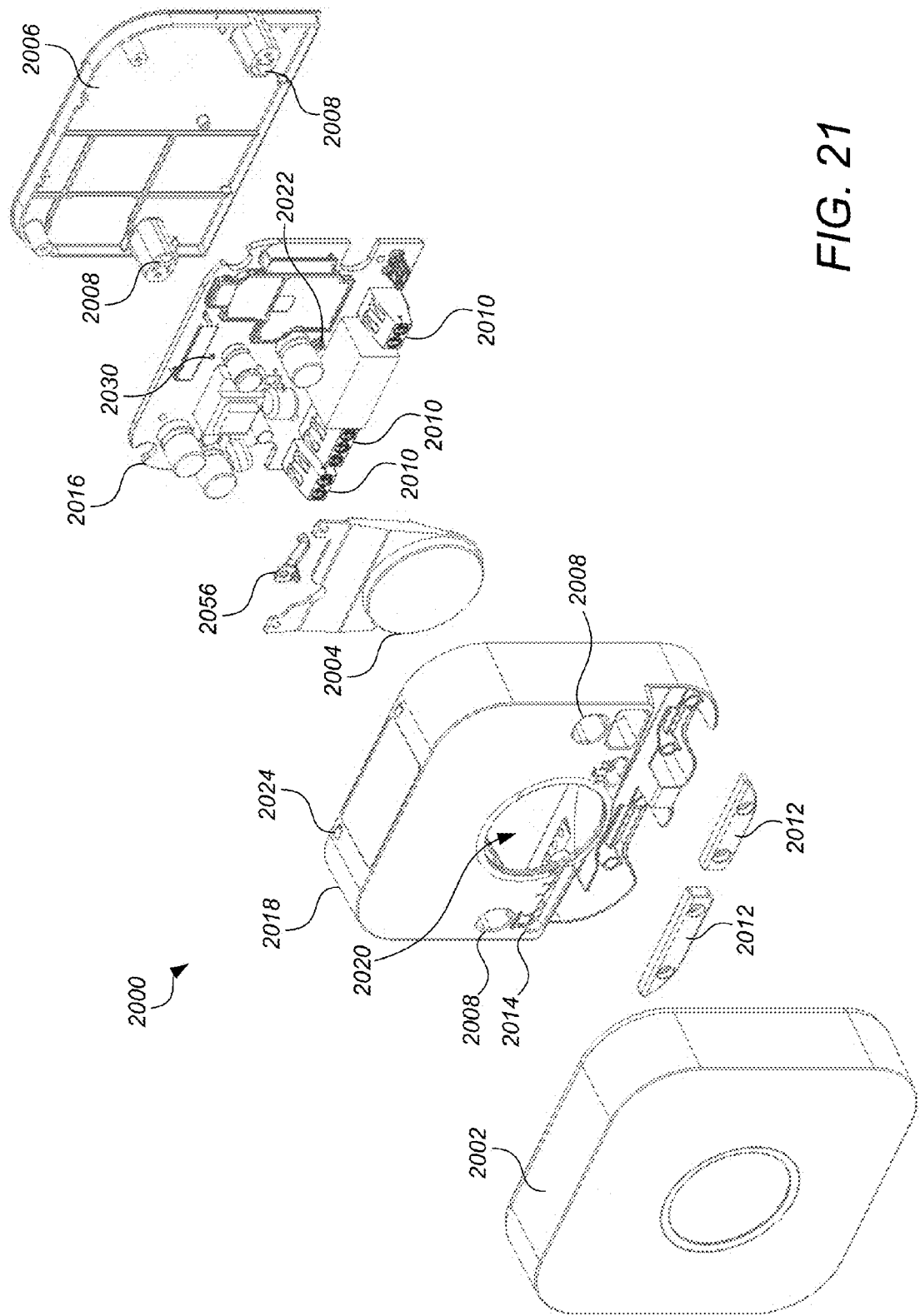
FIG. 21 illustrates an exploded front perspective view of a base unit of an intelligent thermostat system, according to some embodiments.

FIG. 21 illustrates an exploded front perspective view of a base unit 2000 of an intelligent thermostat system, according to some embodiments. In this embodiment, the base unit 2000 may be comprised of the front cover 2002, the back cover 2006, a body 2018, the button 2004, and a base unit circuit board 2016. Like the front cover 2002, the body 2018 may be constructed using a molded plastic that exposes an interface for connecting wires to/from the boiler system as well as wires to/from the intelligent thermostat. The wires may enter through gaps in the bottom of the front cover 2002 and the body 2018 and may be held in place by screw-down clamps 2012 to prevent wire slippage or accidental disconnection. The body 2018 may also include cutouts through which the wires may be inserted as well as cutouts 2014 through which a user can secure the wires using a screwdriver into the wire insertion terminals 2010 on the base unit circuit board 2016. The body 2018 may include labels for each of the terminals. The labels may be printed, etched, and/or integrated into the body of the molded plastic. The body 2018 may also include recesses through which the screw holes 2008 may be accessed. As will be apparent in FIG. 21, the entirety of the base unit may be assembled with the exception of the front cover 2002. This assembly can be mounted to a surface through the screw holes 2008, after which the front cover 2002 can be secured to the rest of the base unit 2000.

The button 2004 may be accessible through a recess 2020 in the body 2018 of the base unit 2000. Next to the button 2004, a light pipe 2056 may direct light from an LED 2030 such that light emitted from the LED is visible through the front cover 2002. The button 2004 may also be mechanically adjacent to a corresponding button 2022 on the base unit circuit board 2016 such that depressing the button 2004 actuates the button 2022 on the base unit circuit board 2016. The base unit circuit board 2016 may include circuitry for switching and/or connecting HVAC functions associated with the boiler system, processor circuitry, wireless and wired communications circuitry, and wire insertion terminals 2010. The base unit circuit board 2016 will be described in greater detail below. The base unit circuit board 2016 can be secured to the back cover 2006 through screw holes in the base unit circuit board 2016, and the body 2018 and button 2004 can be secured to the back cover 2006. As described above, the front cover 2002 can be secured to the body 2018 using a combination of the tabs 2024 at the top of the body 2018 and a screw mechanism (not visible) at the bottom of the body 2018.

Figure 22:
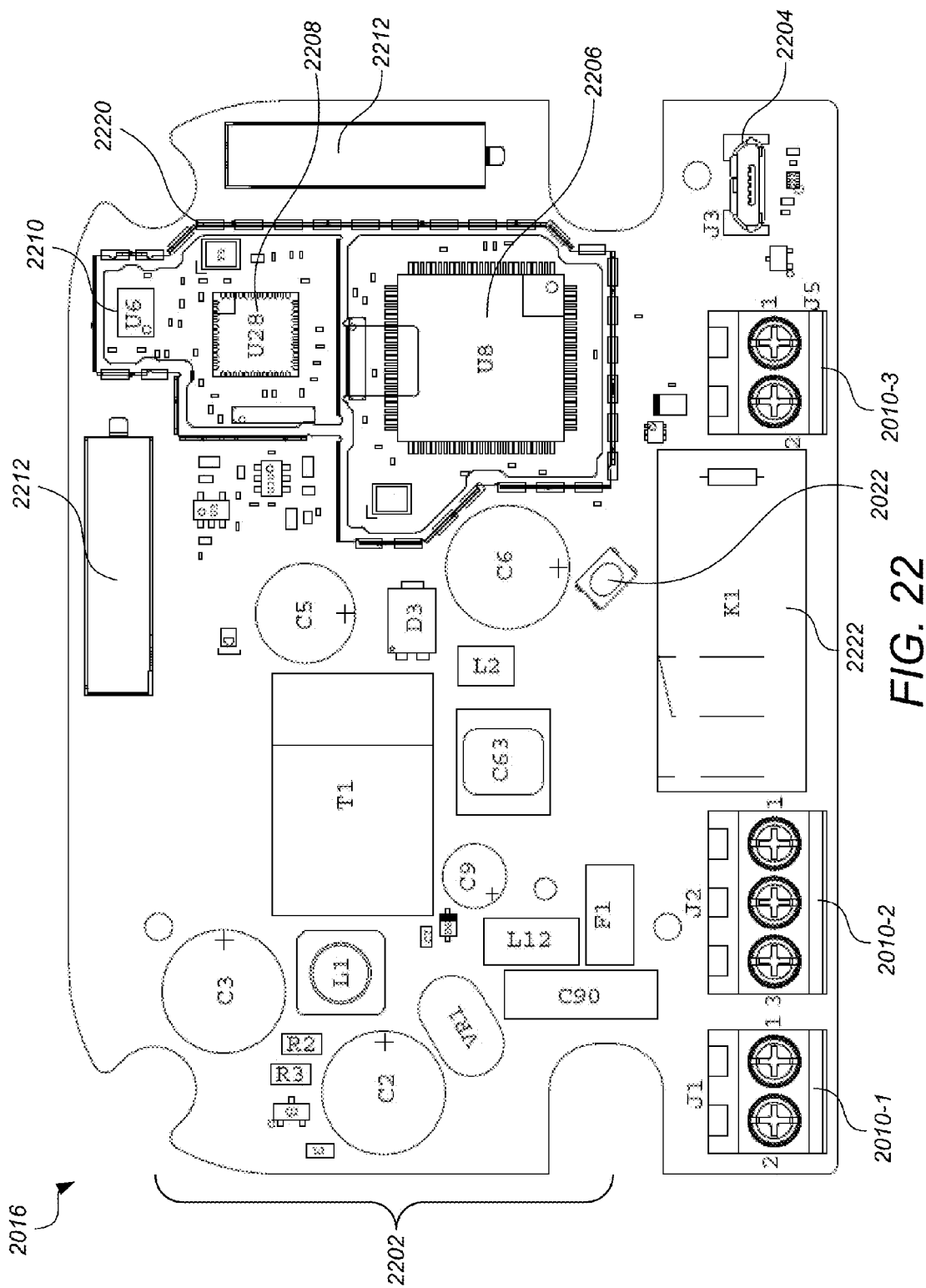
FIG. 22 illustrates a front view of a base unit circuit board of a base unit, according to some embodiments.

FIG. 22 illustrates a front view of a base unit circuit board 2016 of a base unit 2000, according to some embodiments. As will be described in greater detail below, the base unit circuit board 2016 may receive 220 VAC power from the mains power line of the enclosure. Wire connector 2010-1 may receive the "N" and "L" wires from the mains power line. Wire connector 2010-3 may receive the two-wire connection to the intelligent thermostat, if available. Wire connector 2010-2 may receive the satisfied, common, and call-for-heat wires that are connected to the boiler or zone controllers. Wire connectors 2010 may be configured such that they may receive physical wires that can be secured by a screw-down (or other) clamping mechanism.

The base unit circuit board 2016 may also include a button 2022 that can interface with the button 2004 accessible through the front cover 2002. For example, the button 2004 may be a 4.2 mm×3.2 mm×2.5 mm tactile switch available from Alps (SKRPABE010). The base unit circuit board 2016 may also include a power regulation circuit 2202 that is configured to take the 220 VAC line power input and convert it to DC voltage levels. In this embodiment, a flyback converter may be a suitable converter type for these power levels, although other suitable converters may alternatively be used. As will be understood by one having skill in the art, a flyback converter includes a first phase that charges up a storage element and a second phase that converts power from the storage element into a regulated DC voltage. Many different flyback converter designs are possible. One particular flyback converter design implemented in an embodiment uses a transformer (T1), multiple inductors (L1, L2, L12, etc.) for filtering and emissions reduction, multiple storage capacitors (C2, C3, C5, C6, etc.), and a high-performance AC/DC controller designed to drive an external power bipolar junction transistor (BJT) for peak mode flyback power supplies, such as the iW1707 digital controller available from iWatt®. Additionally, the power regulation circuit 2202 may include DC conversion circuits and filtering circuits configured to provide the DC voltage for the wired connection to the intelligent thermostat through the wire connectors 2010-3 as well as power for the base unit microcontroller and radio. This may include a 4.4 V converter, a 1.8 V buck converter (e.g., TPS62170 available from Texas Instruments®), one or more single slew rate controlled load switches (e.g., AP 2281 from Diodes Inc.®), a 6LoWPAN Pi Filter, and a 6LoWPAN FEM load switch. The base unit circuit board 2016 may also include a USB connector 2204 (e.g., Molex 105133-0031). The USB connector 2204 can be used to program the base unit processor/microcontroller 2206 and/or base unit radio 2208, and power the associated circuitry during such programming.

The base unit processor/microcontroller 2206 may be any available microcontroller or microprocessor. For example, in this embodiment, the base unit processor/microcontroller 2206 uses a 32-bit microcontroller based on the ARM Cortex-M4 core which includes high-speed USB 2.0, flash memory, and integrated ADC, such as the Kinetis K60 family of microcontrollers from Freescale Semiconductor. The base unit processor/microcontroller 2206 may be programmed through a JTAG/UART debug ZIF connector. Additionally, the base unit circuit board 2016 may include a radio 2208 in order to establish wireless communications with the radio in the head unit of the intelligent thermostat. For example, the base unit circuit board 2016 may include a wireless integrated 802.15.4 compatible radio, such as the EM357 chip available from Silicon Labs®. The radio 2208 may operate in conjunction with a wireless front end module 2210, such as the SE2432L RF front end module by Skyworks®. In order to isolate the digital noise from the base unit processor/microcontroller 2206, and to isolate RF noise generated by the radio 2208 and front end module 2210, the base unit circuit board 2016 may include metal shielding 2220 around each of these components. The base unit may also include one or more temperature sensor, which may comprise a discrete thermistor, a thermocouple, and/or an integrated circuit. The temperature sensor(s) may or may not include an integrated humidity sensor. The temperature sensor(s) may be integrated into a microcontroller or radio IC. A temperature measured by the temperature sensor(s) may be reported back to the head unit periodically and/or upon the occurrence of an anomalous condition.

The radio communications may operate using an IEEE 802.15.4 protocol compliant communication scheme. In some embodiments, the ZigBee standard, which is built on top of the IEEE 802.15.4 protocol, may be used in communication. In one embodiment, a proprietary communication scheme may be used that is built on top of the IEEE 802.15.4 protocol yet avoids the ZigBee-specific features. For example, the "Thread" protocol developed by Nest Labs, Inc., of Palo Alto, Calif. may be used for wireless communication between the base unit and the intelligent thermostat as described in U.S. Ser. No. 13/926,312, supra. This particular communication protocol requires that the radio 2208 in the base unit be paired with the radio in the intelligent thermostat. This pairing may be done before the intelligent thermostat system is sold to a consumer. The pairing may also be done after installation using an electronic device interface such as a smart phone interface, the button 2004 on the backplate, and/or any of the USB terminals on the intelligent thermostat or base unit. In some embodiments, a mixed protocol may be used that utilizes the "Thread" communication scheme but also operates as a mixed protocol where paired devices can also communicate with a larger network of smart home devices.

The base unit circuit board 2016 also includes a pair of diversity antennas 2212. In this particular embodiment, the diversity antennas 2212 are made of a raised, stamped metal that sits above the base unit circuit board 2016. It is been discovered by the inventors that mounting the base unit 2000 directly to a boiler often involves mounting the base unit 2002 to a large piece of sheet metal. The sheet metal of the boiler often causes interference with antenna reception. Therefore, the diversity antennas 2212 were raised off the circuit board in order to prevent this type of interference and improve the radiation pattern. The raised nature of the diversity antennas 2212 can be seen in FIG. 21. Note that the diversity antennas 2212 are oriented with one 90° rotated from the other. If one of the diversity antennas 2212 does not receive a signal clearly, the other of the diversity antennas 2212 should have better reception based on this antenna orientation. The base unit circuit board 2016 may include a large ground plane within a layer of the base unit circuit board 2016 located behind the diversity antennas 2212 in order to increase their performance.

In order to interface with the boiler system, a relatively large relay circuit is used to make connections between the satisfied, common, and call-for-heat wire connections. A power PCB relay 2222, such as the RTB7D012 available from Tyco Electronics® can be used in conjunction with an inductive load driver, such as the NUD3124 from On Semiconductor® to selectively make connections between these wire connections. The power PCB relay 2222 may operate with the regulated 12 VDC output from the flyback converter.

Figure 23:
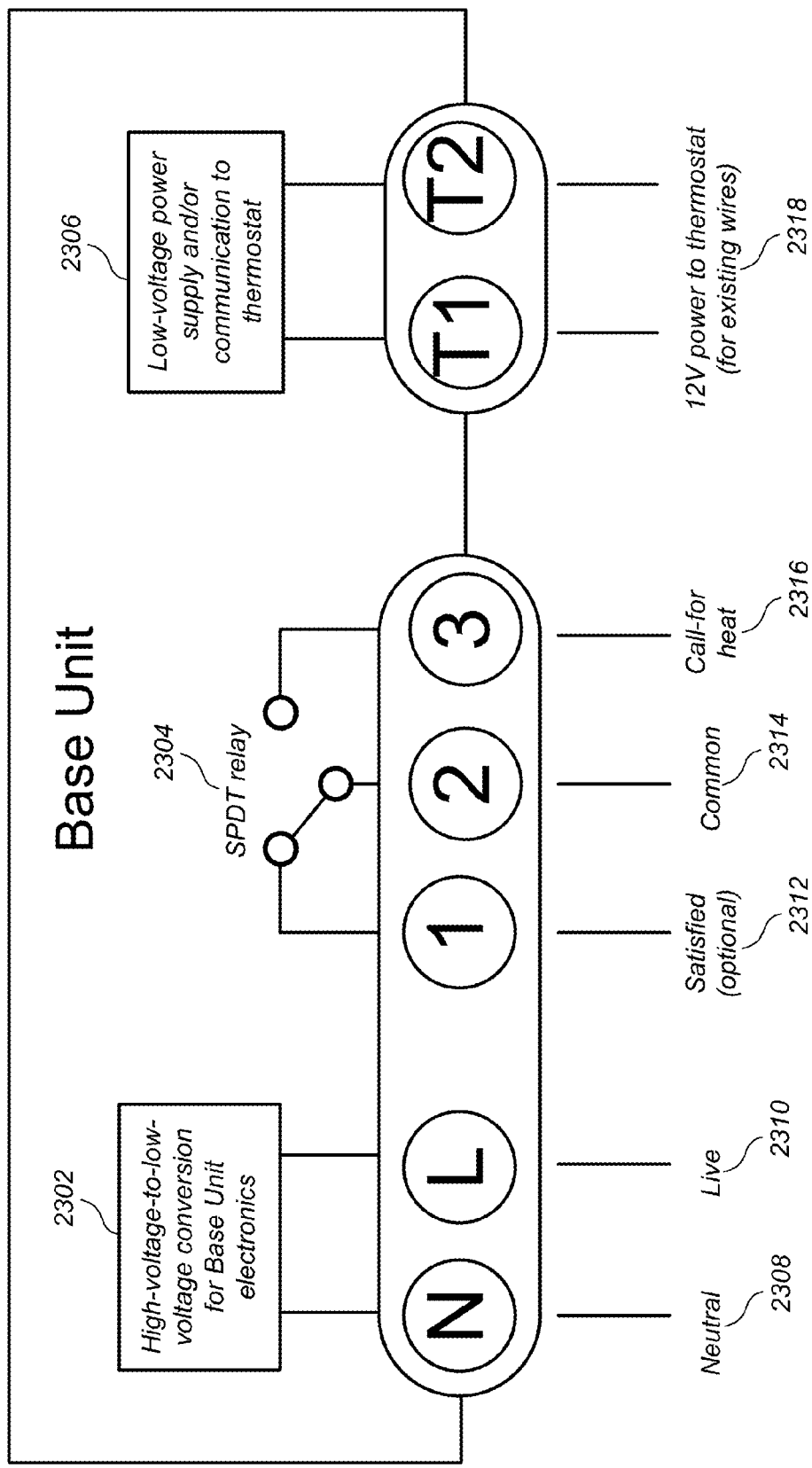
FIG. 23 illustrates a terminal wiring diagram of a base unit, according to some embodiments.

Having described the physical assembly, the circuit components, and the functional operation of the base unit, the various wiring configurations for coupling the base unit to a boiler system will now be described. FIG. 23 illustrates a terminal wiring diagram of a base unit, according to some embodiments. The base unit may include seven wire connectors. The neutral connector 2308 and live connector 2310 may generally be used to connect a power supply for the base unit 2302, such as the flyback converter described above, to a 220 VAC mains power line protected by 3 A fuse. Various configurations may also connect the neutral connector 2308 and/or the live connector 2310 to a corresponding input on the boiler system.

A second bank of wire connectors may include a satisfied connector 2312, a common connector 2314, and a call-for-heat connector 2316. Each of these three wire connectors 2312, 2314, 2316, may be coupled to the base unit relay 2304, which may correspond to the power PCB relay 2222 described above. The base unit relay 2304 may short the common connector 2314 to the satisfied connector 2312, the common connector 2314 to the call-for-heat connector 2316, and/or open connections between these three wire connectors 2312, 2314, 2316.

A third set of wire connectors may include a pair of connectors 2318 that provide power from the base unit to the intelligent thermostat. In installations where a wired connection exists or can be installed between the base unit and the intelligent thermostat, the wires may be inserted into the pair of connectors 2318 at the base unit and the corresponding wire insertion points on the intelligent thermostat backplate. The power supply for the thermostat 2306 may come from the regulated power supply in the base unit and provide, for example, 12 VDC to the intelligent thermostat. Note that in installations where no wires are present, the pair of connectors 2318 can remain unconnected.

Figure 24:
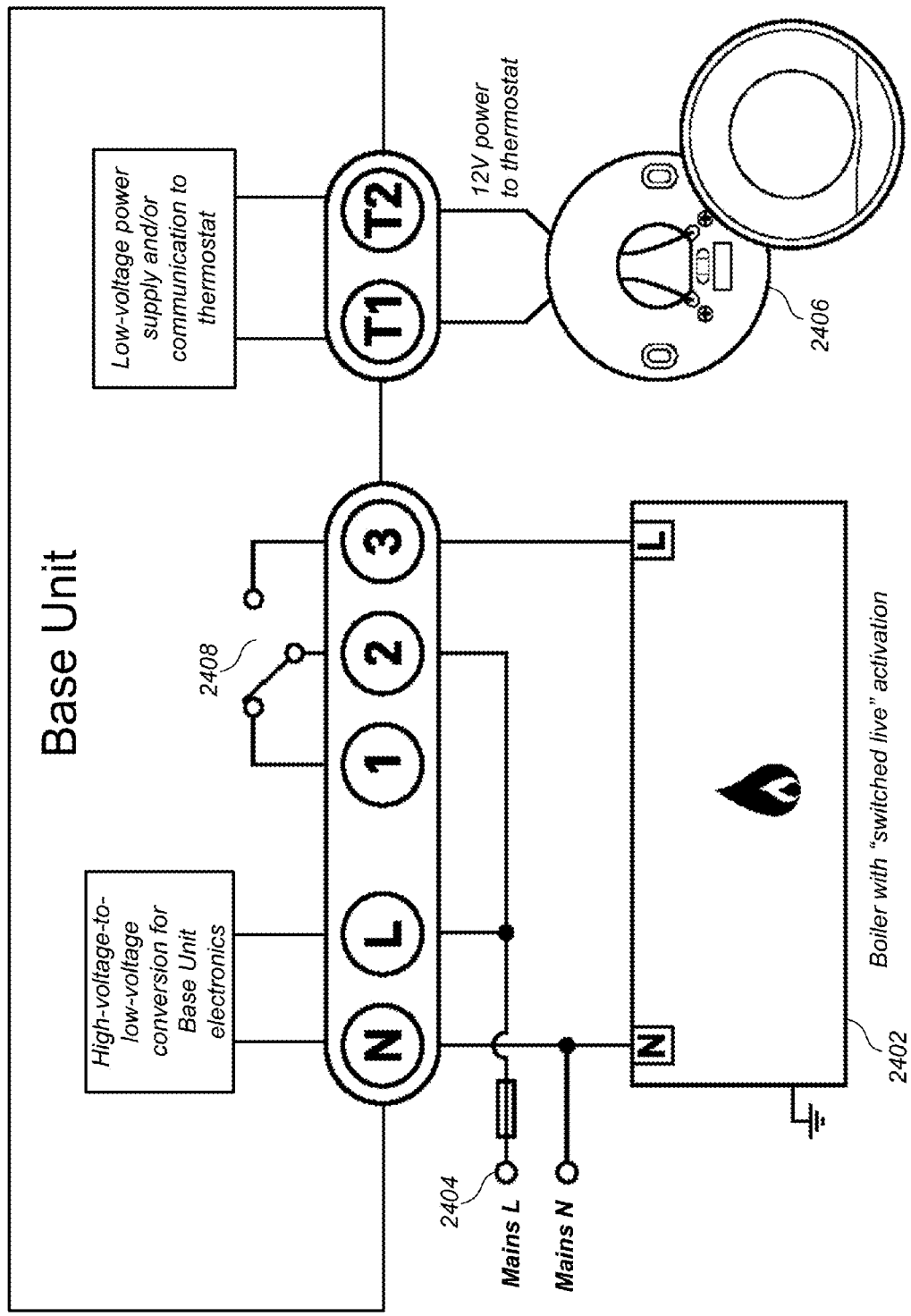
FIG. 24 illustrates a wiring diagram for a boiler with switched live activation, according to some embodiments.

FIG. 24 illustrates a wiring diagram for a boiler 2402 with switched live activation, according to some embodiments. In this configuration, the boiler 2402 is activated by simply applying power to the neutral and live inputs of the boiler 2402. The base unit can be used to control the switched live activation of the boiler 2402 by using the relay 2408 to connect the live input from the mains power supply to the live input of the boiler 2402. For example, the live mains power line can be connected to the common input of the base unit and the call-for-heat output of the base unit can be connected to the live input of the boiler 2402, such that using the relay 2408 to connect the common input to the call-for-heat input will activate the boiler. In some configurations, "activating the boiler" can mean that the boiler begins to circulate preheated water/steam throughout the enclosure. In other configurations, "activating the boiler" can include both commands to circulate water/steam through the enclosure as well as begin heating the water/steam.

Note that in this configuration, as well as the other configurations that will be discussed below, the neutral and live mains power lines are connected to the neutral and live inputs of the base unit. This provides input power to the flyback converter of the base unit that is used to power the base unit and converted into DC voltages to power the other components of the intelligent thermostat system. Additionally, each of these configurations may connect the two terminals (T1, T2) to the backplate of the intelligent thermostat 2406 to provide power and/or communications if such wires are present.

Figure 25:
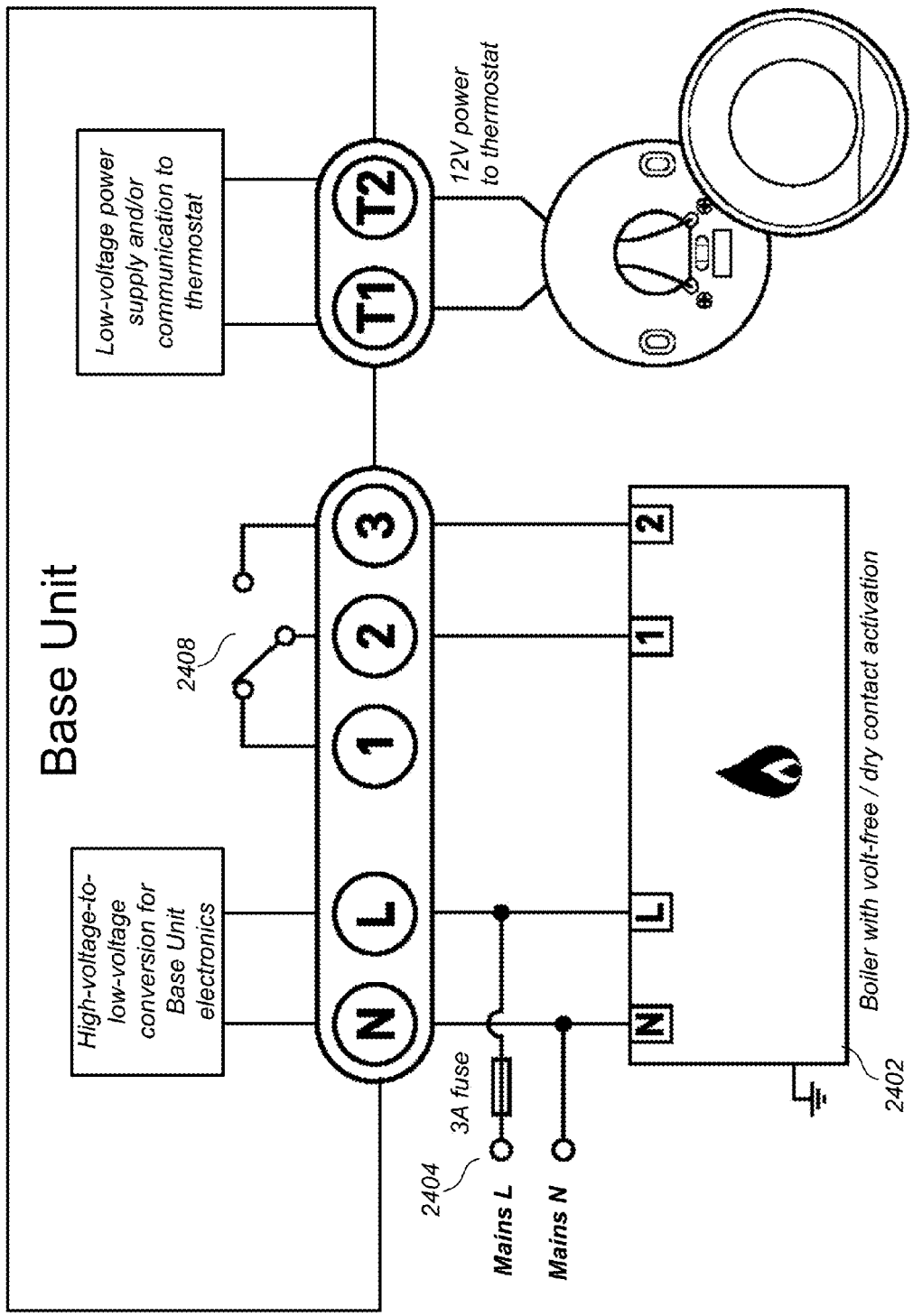
FIG. 25 illustrates a wiring diagram for a boiler with volt-free/dry contact activation, according to some embodiments.

FIG. 25 illustrates a wiring diagram for a boiler 2402 with volt-free/dry contact activation, according to some embodiments. This wiring configuration is similar to that of FIG. 24, except that the boiler 2402 always receives a live power connection and is activated using a second set of terminals. Similar to the base unit, the boiler 2402 receives a direct connection to the neutral and live mains power lines. In order to activate the second set of terminals (labeled "1" and "2" on the boiler 2402), the relay 2408 of the base unit can selectively open and close a connection between the common connector and the call-for-heat connector that are wired to the second set of terminals on the boiler 2402.

Figure 26:
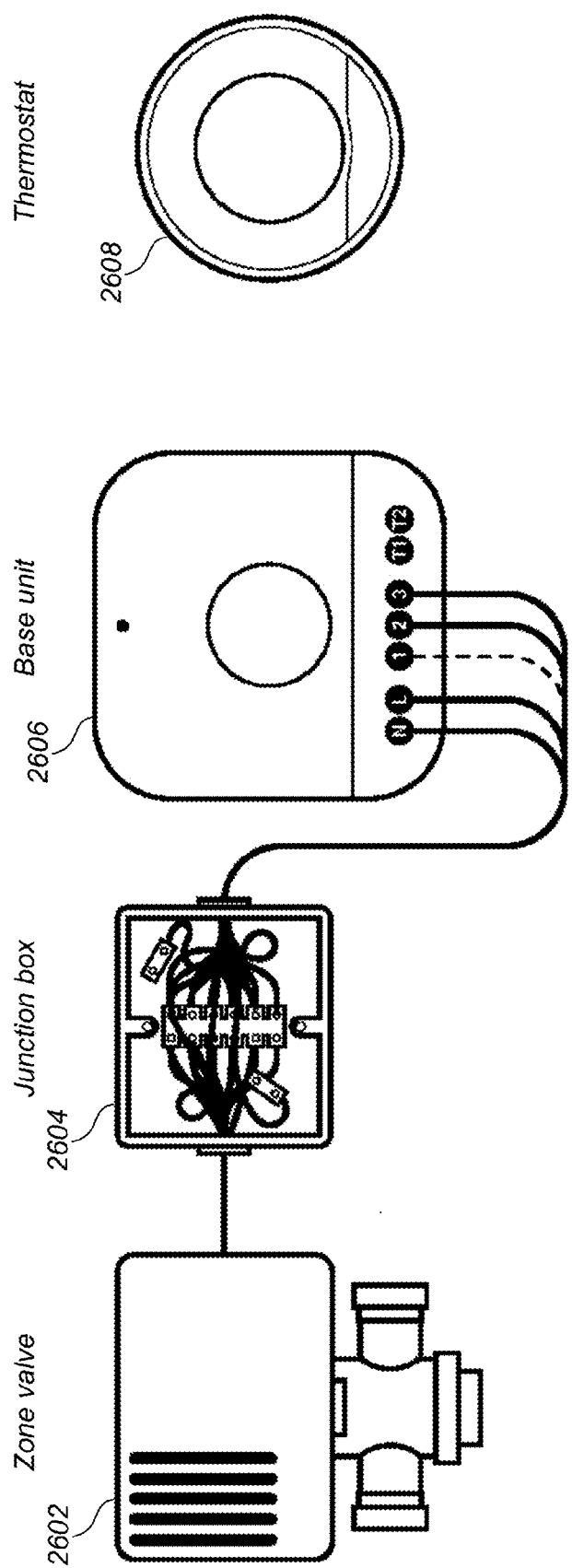
FIG. 26 illustrates a diagram of an intelligent thermostat system connected to a zone valve of a boiler-based heating system, according to some embodiments.

FIG. 26 illustrates a diagram of an intelligent thermostat system connected to a zone valve of a boiler-based heating system, according to some embodiments. The wiring configurations of FIGS. 24-25 illustrated boilers that were controlled by an intelligent thermostat without using independent valve controls for different heating zones within the enclosure. A zone valve 2602 controls the flow of heated water/steam to a particular radiator or set of radiators within the enclosure. A base unit 2606 and intelligent thermostat 2608 combination can be wired to each zone valve 2602 to independently control the temperature in each zone of the enclosure. In some cases, the base unit 2606 may be wired directly to the zone valve 2602. In other cases, the base unit 2606 can be connected to the zone valve 2602 through a junction box 2604 that provides for easier installation.

Figure 27:
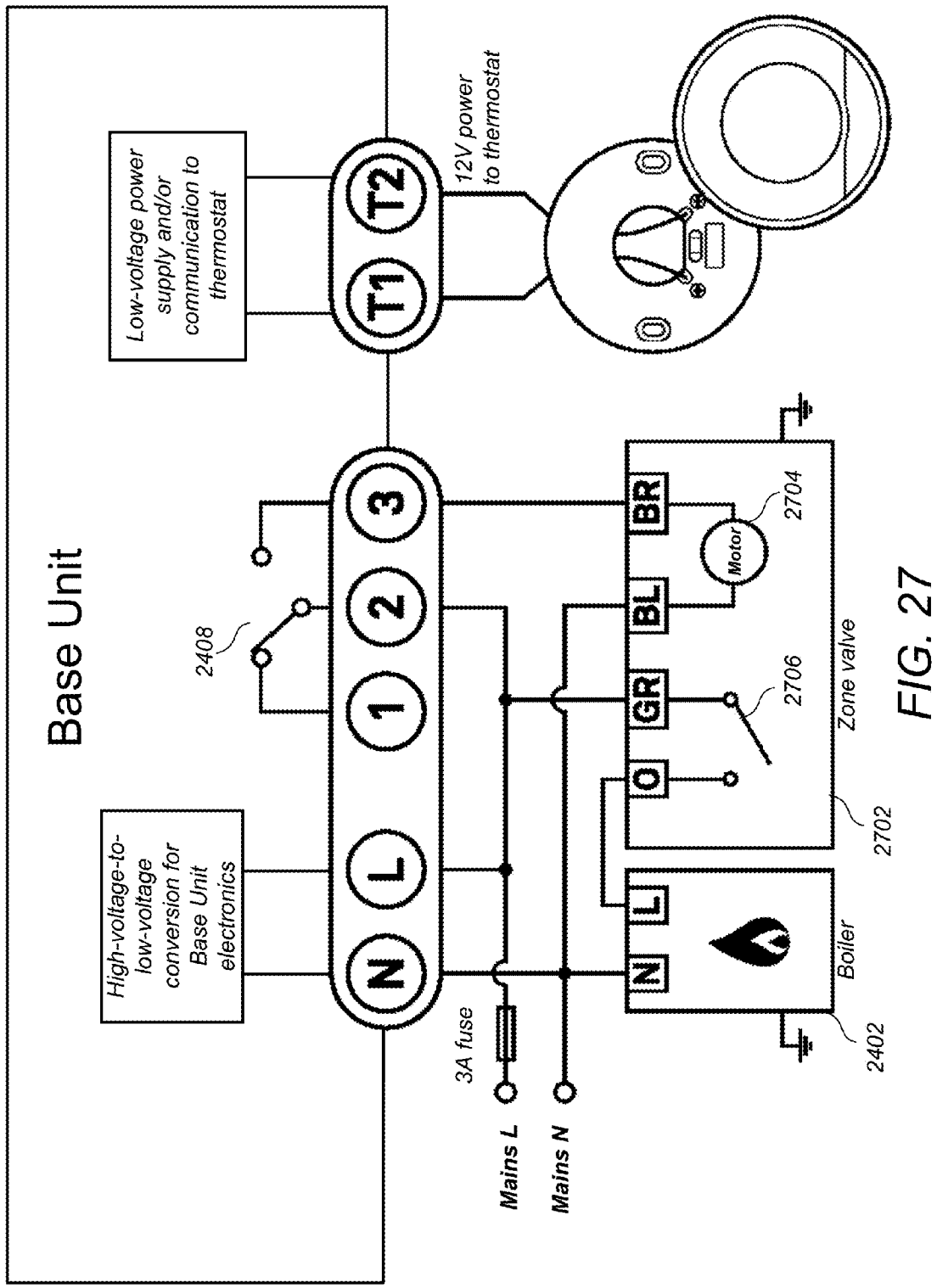
FIG. 27 illustrates a wiring diagram for a boiler with one or more zone valves, according to some embodiments.

FIG. 27 illustrates a wiring diagram for a boiler 2402 with one or more zone valves, according to some embodiments. In this configuration, the intelligent thermostat system is connected to a zone valve 2702 that controls whether heated water/steam should flow to a particular zone in the enclosure and controls the power provided to the boiler 2402. The live wire from the main power supply may be connected to the common terminal of the base unit relay 2408. When the intelligent thermostat calls for heat, the base unit relay 2408 will connect the common terminal to the call-for-heat terminal activating motor 2704 in the zone valve 2702. The motor 2704 will drive a paddle or shoe to open to a central position within the valve chamber. Heated water/steam is then allowed to flow through the valve outlet port. Once power is removed from the motor by the base unit relay 2408, a spring closes the valve stopping the heated water/steam flow. Additionally, the zone valve may include a switch 2706 that energizes the boiler and pump when the valve 2702 is open. The switch 2706 may be electrically isolated from the motor power supply in order to meet various building regulations that prevent boiler firing when no heat demand exists.

Figure 28:
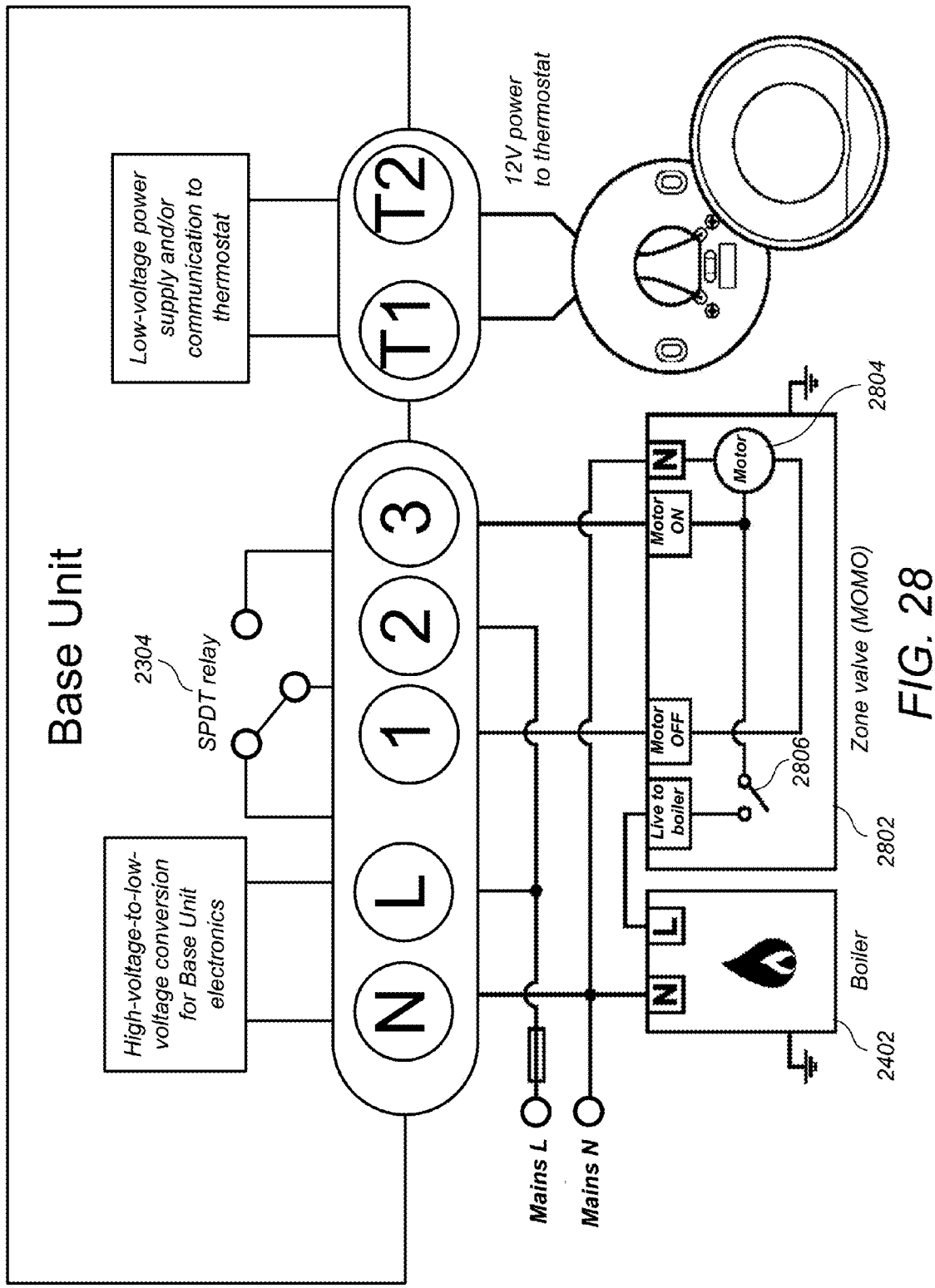
FIG. 28 illustrates a wiring diagram for a boiler with one or more MOMO zone valves, according to some embodiments.

FIG. 28 illustrates a wiring diagram for a boiler 2402 with one or more Motor-On/Motor-Off (MOMO) zone valves, according to some embodiments. In contrast to the zone valve 2702 in FIG. 27, a MOMO zone valve 2802 requires motor actuation in order to open the valve as well as to close the valve, i.e. there is no spring to force the paddle/shoe to stop the flow of heated water/steam. To connect the base unit to the boiler 2402 and the MOMO zone valve 2802, the live wire from the main power source can be connected to the common terminal of the base unit, while the satisfied terminal of the base unit can be connected to the "motor off" terminal of the MOMO zone valve 2802, and the call-for-heat terminal of the base unit can be connected to the "motor on" terminal of the MOMO zone valve 2802. When the intelligent thermostat calls for heat, the base unit relay 2408 can connect the live power line to the "motor on" terminal and thereby operate a motor 2804 to open the valve to allow heated water/steam to flow to the corresponding zone of the enclosure. This can also close a switch 2806 to activate the boiler 2402. In order to stop heating, the base unit relay 2408 can instead connect the live power line to the "motor off" terminal of the MOMO zone valve 2802, and thereby operate motor 2804 to cut off the flow of heated water/steam to the corresponding zone of the enclosure.

As described above, the two-wire connection between the intelligent thermostat backplate and the base unit can be used to provide power, such as 12 VDC, from the base unit to the intelligent thermostat. Additionally, the two-wire connection between the base unit and the backplate can also be used to communicate a call-for-heat command from the intelligent thermostat to the base unit. Special circuitry can be implemented in the backplate to send voltage/current pulses to the base unit to call for heat.

Figure 29:
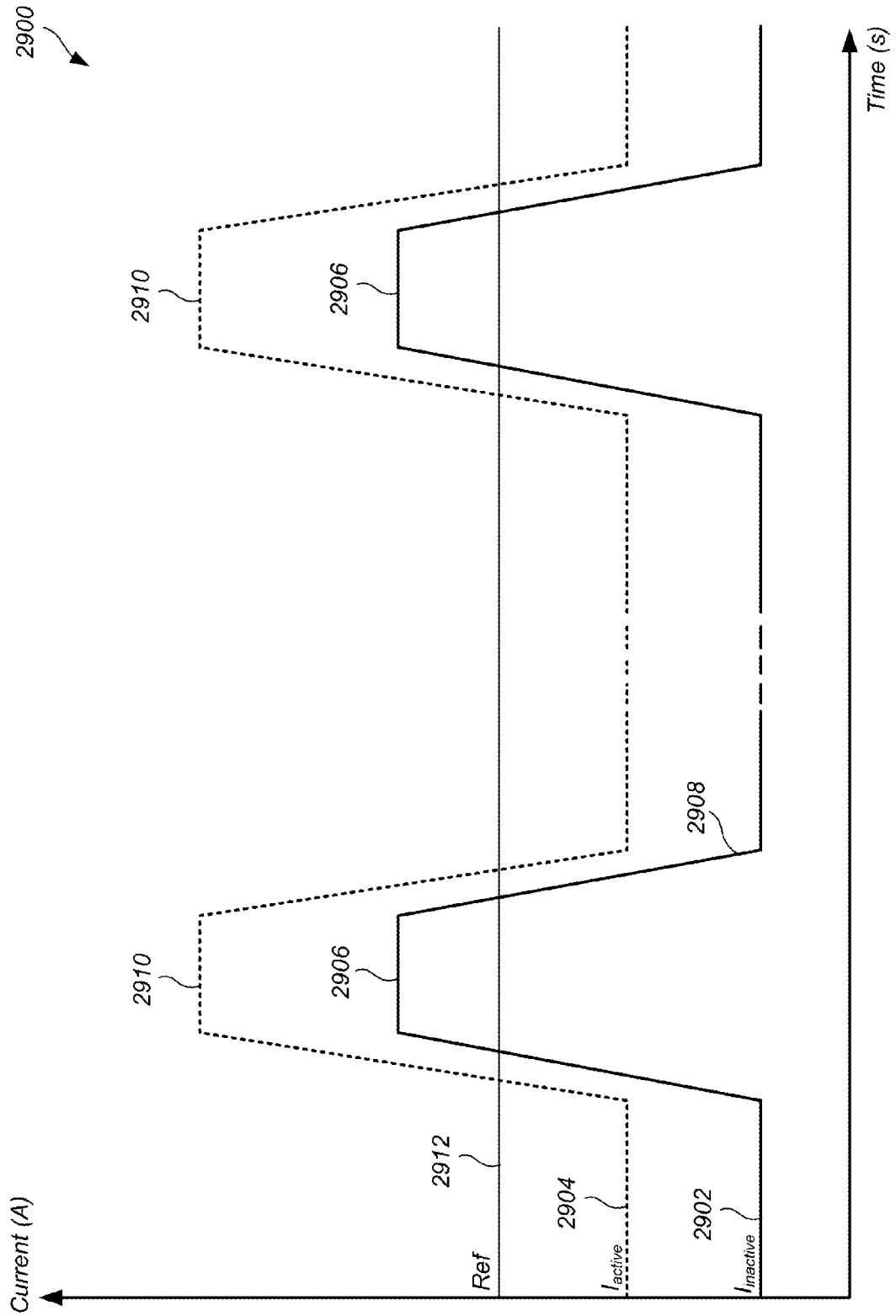
FIG. 29 illustrates a graph of a current pulse train that can be used to indicate a call-for-heat from the thermostat to the base unit, according to some embodiments.

FIG. 29 illustrates a graph of a current pulse train that can be used to indicate a call-for-heat from the thermostat to the base unit, according to some embodiments. Current trace 2902 begins at a baseline current that is drawn from the base unit by the thermostat when the head unit is inactive and not charging the rechargeable battery. For example, the head unit user interface may be off, the main processor may be in a sleep mode, and no Wi-Fi transmissions may be taking place. When the thermostat calls for heat, it can begin sending a train of current pulses to the base unit. As long as the base unit receives these current pulses, the base unit will command the boiler and/or zone valves to provide heat to an area of the enclosure governed by the thermostat. The thermostat can then end the call for heat by stopping the current pulse train.

It will be understood by one having skill in the art that many different signaling methodologies may be used to transmit a signal through the two wire connection from the thermostat to the base unit. Using a current pulse train is advantageous because small pulses may reduce the amount of heat generated by the thermostat and may reduce the power required by the intelligent thermostat system as a whole. However, other embodiments may generate sinusoids, step functions, and/or any other type of waveform that could be detected by the base unit in order to effectively communicate a call for heat. Therefore, the current pulse train is merely exemplary and not meant to be limiting. It is also possible to use a variety of modulation/demodulation schemes to transmit information across the wire pair.

In order to reduce the self-heating effect of generating current pulses, each current pulse 2906 may have a relatively small duty cycle and width. For example, each current pulse 2906 could have a 1% duty cycle with a 10 ms width. The rise and fall time on the edges 2908 can be large enough to avoid EMI issues.

In FIG. 29, current trace 2904 begins at a baseline current that is drawn from the base unit by the thermostat when the head unit is in a higher state of activity. For example, the rechargeable battery can be recharging, the user interface can be activated, and/or a Wi-Fi burst may be sent from the thermostat to a home LAN. In this case, the steady-state level of current draw will be higher than when the head unit is in a lower state of activity. Note that the current waveform remains the same, but is shifted up by the amount of additional current drawn by the head unit. In particular, the shape of the current pulses 2910 are the same as current pulses 2906. In order to detect current pulses 2906 in the inactive state as well as current pulses 2910 in the active state, a reference level 2912 can be chosen such the current drawn of the head unit in either the active state or the inactive state during normal operation will not trip the reference level 2912, while the current pulses 2906, 2910 in either state will trip the reference level 2912. Although not shown explicitly in FIG. 29, another embodiment may allow the current draw of the head unit in the active state to cross the reference level 2912. In order to detect the current pulses 2910, the circuitry may detect a sequence of negative-positive-negative-positive crossings of the reference level 2912 with an expected timing pattern. To prevent needing to adjust the reference level 2904 and to prevent needing excessive energy while providing the pulse 2910 in the active state, a guard band can be inserted around each pulse where the current used by the head unit is temporarily limited. This would bring the current draw back down below the reference level 2912 during a time interval surrounding each pulse. The first negative crossing would signal the beginning of the guard band, the first positive and second negative crossings would signal the rise and fall of the pulse, and the final positive crossing would signal the end of the guard band.

Figure 30:
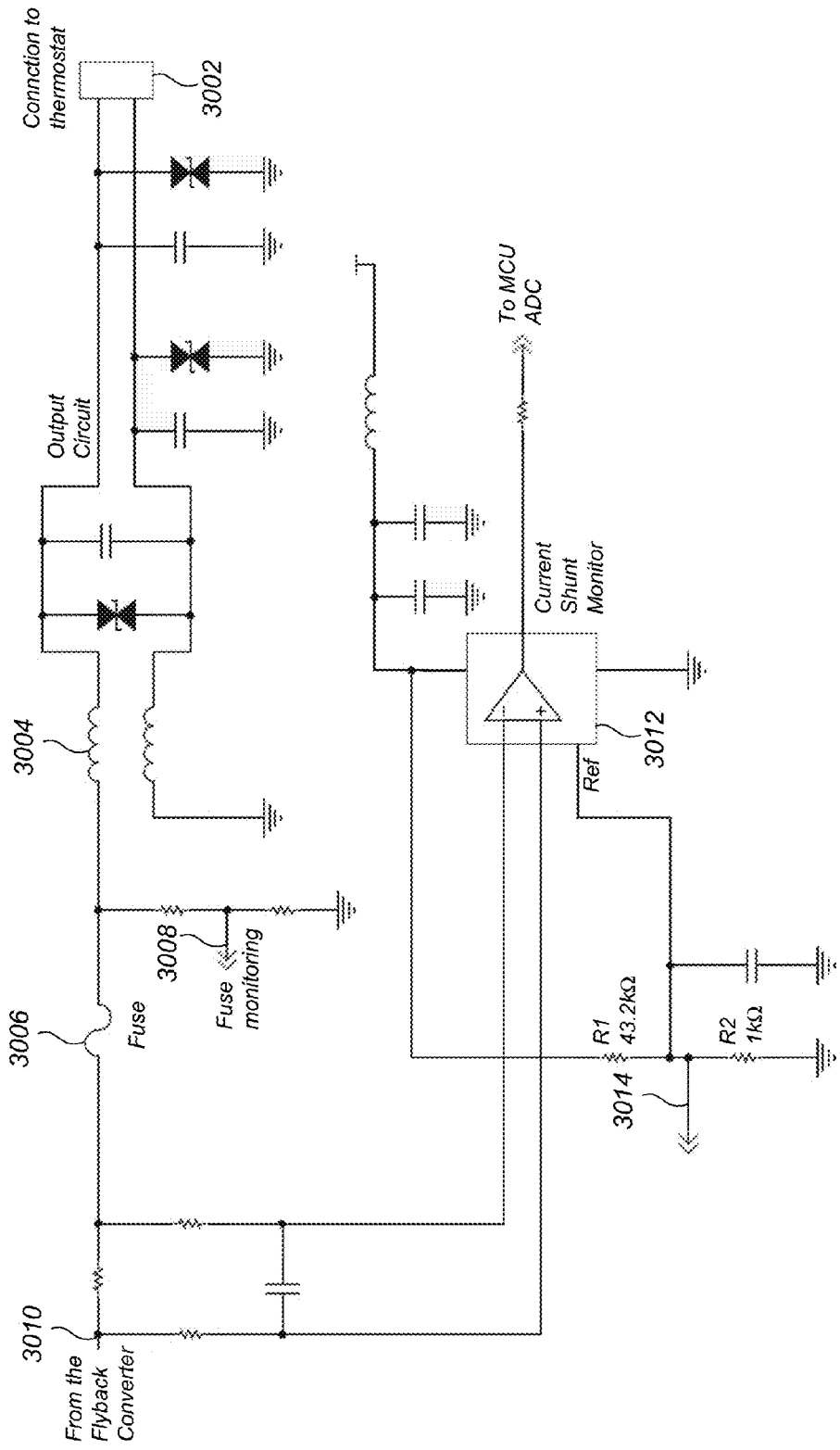
FIG. 30 illustrates a graph of a circuit that may be used by the base unit to detect current pulses generated by the thermostat, according to some embodiments.

FIG. 30 illustrates a circuit that may be used by the base unit to detect current pulses generated by the thermostat, according to some embodiments. The power output can exit through the two-wire connection to the thermostat 3002 through an output circuit. The output circuit may include ferrites 3004 for EMI and ESD filtering. A fuse 3006 can provide protection for the internal circuitry and prevent damage from faults and miswiring, and a fuse monitoring circuit 3008 can be used by the base unit processor/microcontroller to monitor the fuse 3006. The power sent to the connection to the thermostat 3002 can be a DC voltage/current sourced by the flyback converter 3010.

In order to detect a train of current pulses signifying a call for heat from the thermostat, the base unit is able to detect when the thermostat draws more current using a current shunt monitor 3012. The current shunt monitor can be used to sense current changes across the shunt independent of the supply voltage. In one embodiment the INA199 family of current shunt monitors available from Texas Instruments® may be used. The output from the current shunt monitor 3012 can be fed into one of the ADC inputs of the base unit processor/microcontroller. A reference level can be established for the current shunt monitor 3012 using resistors organized in series as a voltage divider 3014. By sampling the ADC input, the MCU can then detect instances when the current pulses occur. If a differential ADC input stage is used, the output of current shunt monitor 3012 will be measured relative to the reference set by voltage divider 3014. This may prevent the amplifier from saturating at its negative input rail and allow accurate calibration and measurement of signals close to zero current. The microcontroller may set a comparator reference level in the ADC circuitry to provide an interrupt when the level has been crossed.

Figure 31:
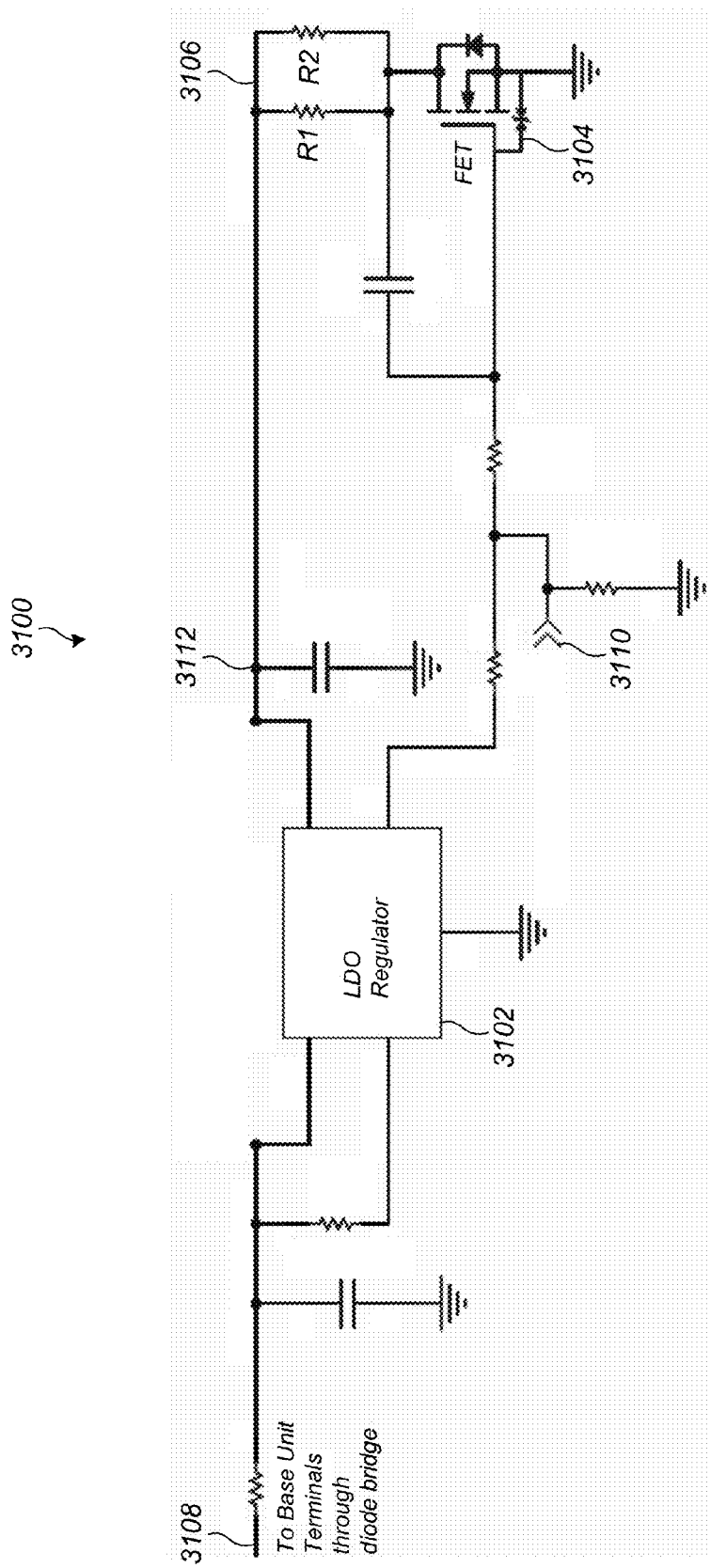
FIG. 31 illustrates a circuit that may be used by the thermostat to generate current pulses, according to some embodiments.

FIG. 31 illustrates a graph of a circuit that may be used by the thermostat to generate current pulses, according to some embodiments. The communication circuit 3100 may be connected to the base unit terminals through a diode bridge input 3108. The gate of a power FET 3104 may be controlled by an input 3110 from the backplate processor/microcontroller. The input 3110 will control when the current pulses are generated by the communication circuit 3100. An LDO regulator 3102, such as the Ricoh three mode 150 mA regulator with reverse current protection (e.g., R1163x Series and/or R1191x series) can be used to generate a voltage 3112 that will run through one or more resistors 3106 before reaching ground through the power FET 3104. When current pulses are to be generated, the input 3110 at the gate of the power FET 3104 can cause the power FET 3104 to conduct current to flow through the one or more resistors 3106 to ground. The additional current draw caused by turning on the power FET 3104 will generate the current pulses illustrated by FIG. 29. Note that the height of the current pulses are determined by the one or more resistors 3106 independent of the voltage provided by the base unit, due to the operation of the LDO. Additionally, the heat generated by the current pulse will be distributed between the one or more resistors 3106, the power FET 3104, and the LDO regulator 3102.

One having skill in the art will readily recognize that changing the characteristics of the pulses can be used to encode many different types of information and messages from the thermostat to the base unit. Additionally, signaling circuitry could be placed in the base unit and detection circuitry could be placed in the thermostat in order to achieve bidirectional communication on the power lines. The height of the current pulses may be set to a level that is not normally crossed during regular operation in order to reduce false positive detections. The height of the current pulses may also be set to a level that is above a noise level that is commonly experienced on the power lines. In some embodiments, the thermostat may sample the characteristics of the current on the power line and dynamically adjust the height of the current pulses to be above the noise level while minimizing the power draw by the thermostat communications.

Figure 32:
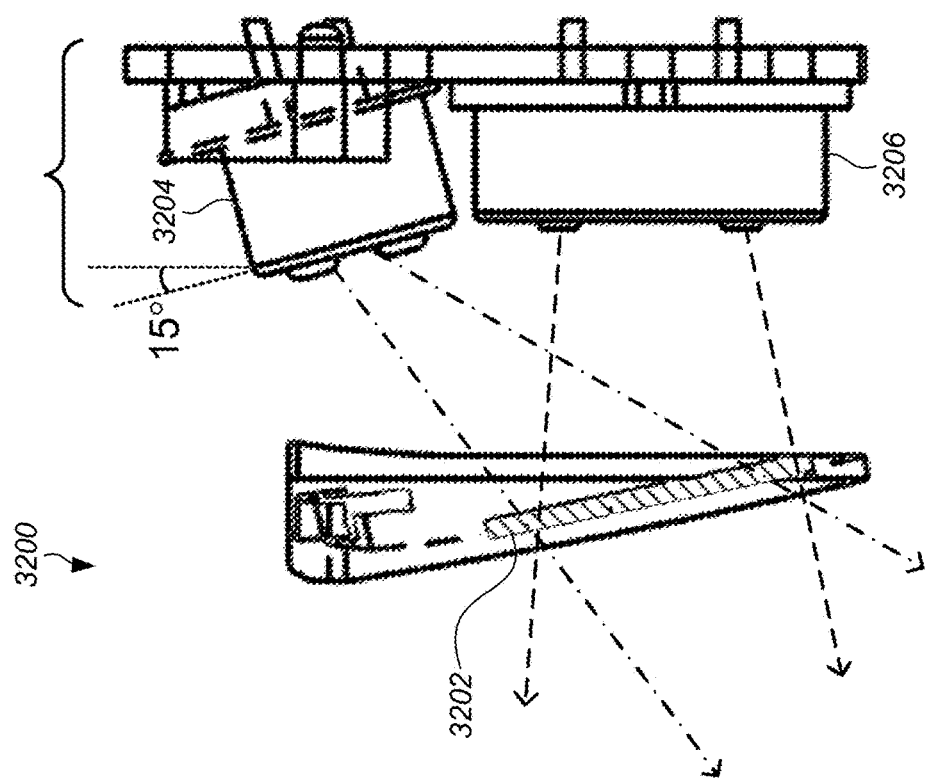
FIG. 32 illustrates a diagram of an intelligent thermostat having more than one proximity sensor, according to some embodiments.

FIG. 32 illustrates a diagram of an intelligent thermostat having more than one proximity sensor, according to some embodiments. The intelligent thermostat 3200 includes an energy directing lens 3202 configured to direct energy emitted or received by a first proximity detector 3204 and/or a second proximity detector 3206. Proximity detectors 3204, 3206 can be used by the intelligent thermostat 3200 to detect when a user is coming near the thermostat with the intent to interact with the thermostat 3200. By detecting when a user intends to interact with the thermostat 3200, the thermostat 3200 can react by activating a display screen of user interface and activate other advanced features to positively affect the user experience.

However, users may often walk by the thermostat 3200 without intending to interact with it. In these cases, it may be advantageous for the thermostat 3200 to remain inactive so as not to waste power or distract a user who walks by the thermostat 3200. In order to distinguish between users who are simply near the thermostat and users who intend to interact with the thermostat, the first proximity detector 3204 and the second proximity detector 3206 may be directed in different angles. In this embodiment, the first proximity detector 3204 may be angled towards the floor, while the second proximity detector 3006 may be directed outward from the thermostat 3200.

Figure 33:
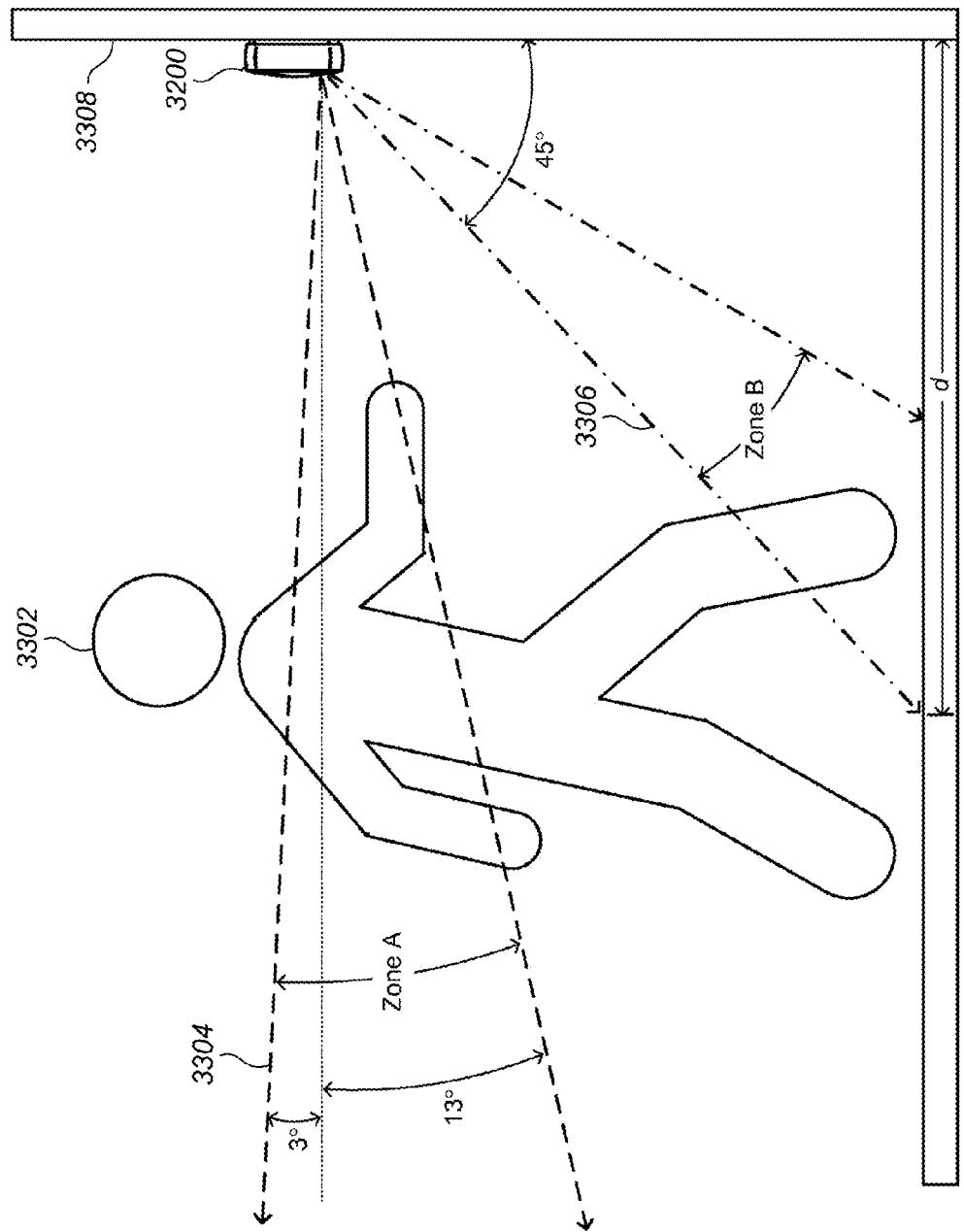
FIG. 33 illustrates a diagram of a user intending to interact with the thermostat 3200, according to some embodiments.

FIG. 33 illustrates a diagram of a user intending to interact with the thermostat 3200, according to some embodiments. The user 3302 who walks by the thermostat may only be visible to the second proximity detector that is directed towards zone 3304, or "Zone A." However, as the user 3302 walks towards the thermostat 3200 with the intent to interact with the thermostat 3200, the user 3302 will become visible to the first proximity detector that is directed towards zone 3306, or "Zone B." One or more of the processors in the intelligent thermostat 3200 can process the inputs received by the first proximity sensor and the second proximity sensor to establish a pattern or profile of users who intend to interact with the thermostat, and then react accordingly.

The dual proximity detector configuration described above works well when the thermostat 3200 is mounted to a wall 3308 of the enclosure. Both proximity detectors are able to readily view the area directly in front of the intelligent thermostat 3200. However, when the thermostat is mounted on a stand and set on a desk, table, bookshelf, and/or the like, as illustrated by FIG. 19C, the field of view for the first proximity detector may be obscured by the surface upon which the thermostat 3200 rests. In this case, the thermostat 3200 would have a difficult time distinguishing between users simply walking by the thermostat 3200 and users who intend to interact with the thermostat 3200 because zone 3306 as seen by the first proximity detector would be obscured by the desk, table, bookshelf, etc.

Figure 34B:
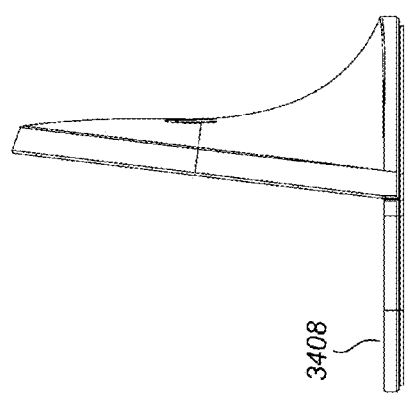
FIGS. 34A-34C illustrate perspective, side, and rear views, respectively, of an intelligent thermostat stand, according to some embodiments.
Figure 34C:
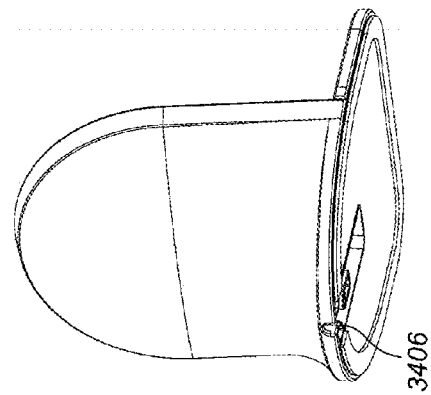
Figure 34A:
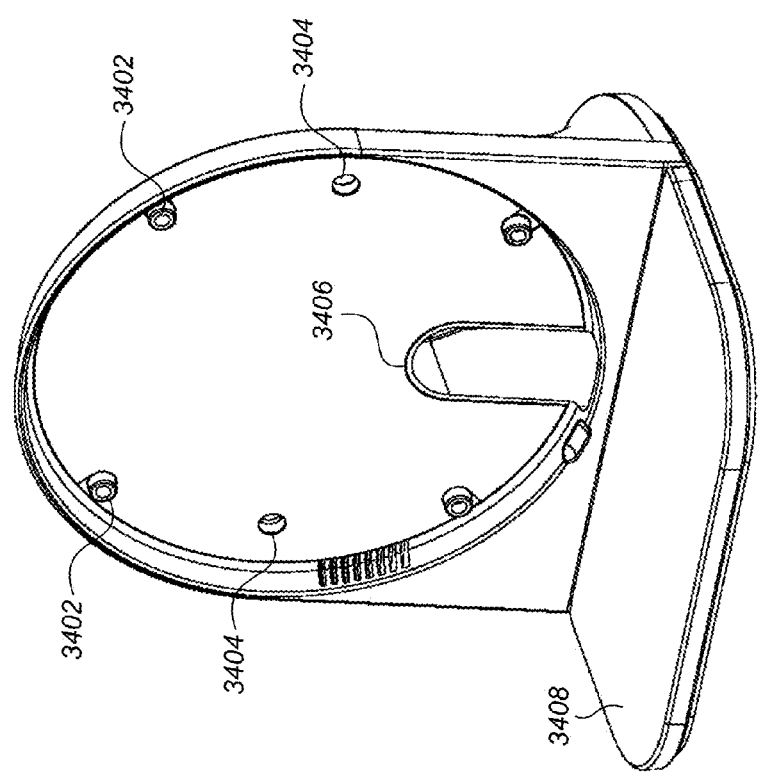

In order to overcome this problem in desktop mounting configurations, a special intelligent thermostat stand has been designed. FIGS. 34A-34C illustrate perspective, side, and rear views, respectively, of an intelligent thermostat stand, according to some embodiments. The intelligent thermostat stand includes mounting holes 3404 that are aligned with the screw holes in the backplate of the intelligent thermostat. The mounting holes 3404 may include metal threaded inserts that are configured to accept mounting screws extending through the backplate. In order to help align the intelligent thermostat stand as it is being installed in the intelligent thermostat stand, protrusions 3402 may be included that are aligned with screw holes in the back of the backplate. Therefore, a user can set the backplate in the mounting stand in perfect alignment using the protrusions 3402 and then install the mounting screws through the mounting holes 3404. The intelligent thermostat stand may also include a cavity 3406 through which the two-wire connection can be inserted, or alternatively or additionally, through which a USB connection can be inserted and coupled to the USB port of the backplate to provide power.

The intelligent thermostat stand also includes a reflective surface 3408 at the base of the stand. Reflective surface 3408 is able to reflect energy from the surrounding environment into the first proximity detector that would otherwise not be visible to the first proximity detector. This allows both proximity detectors to have a view of the surrounding environment and be used to detect occupancy patterns and user approach scenarios that indicate a user is likely to interact with the intelligent thermostat. In some embodiments, the thermostat may be secured to the thermostat stand such that the thermostat is tilted upwards forming an angle of between 90° and 110° with the reflective base 3408. The slight tilt may allow for a better reflective pattern and allow more energy to be detected by the first proximity detector. Reflective base 3408 may be constructed using a reflective material. In one embodiment, the reflective base 3408 may be constructed to include a stainless steel or metallic finish. Other embodiments may use any other smooth reflective surface that reflects energy rather than absorbs energy. One embodiment of the thermostat uses passive infrared (PIR) sensors as the proximity detectors. Another embodiment may also use an active infrared sensor or microwave sensor to detect proximity. Each of the sensor types may be configured to work best with a particular type of reflective material that corresponds to the sensor(s) used.

Figure 35:
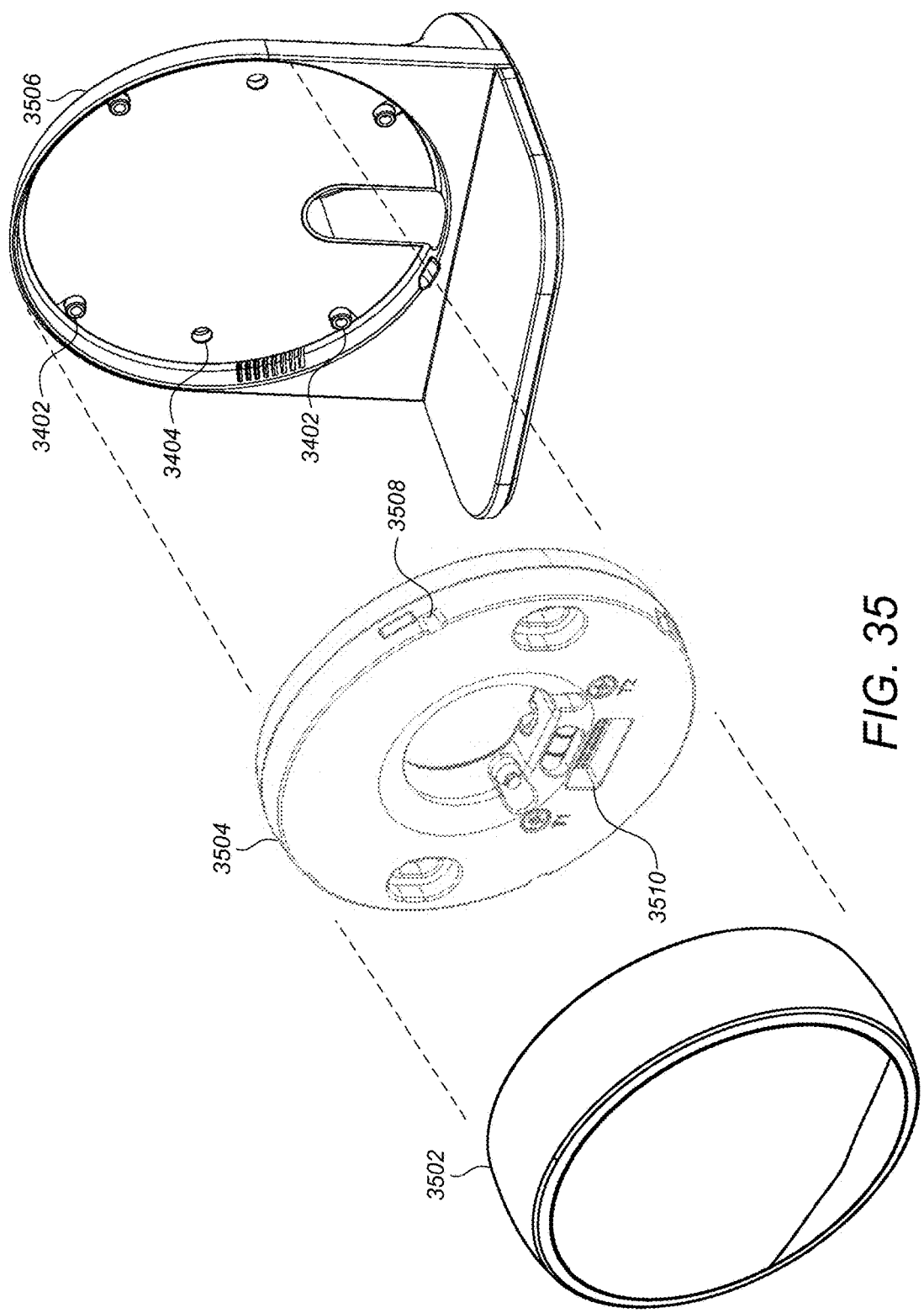
FIG. 35 illustrates an exploded view of an intelligent thermostat installed on a reflective stand, according to some embodiments.

FIG. 35 illustrates an exploded view of an intelligent thermostat installed on a reflective stand, according to some embodiments. To install the intelligent thermostat on the thermostat stand, the backplate 3504 should first be connected to a power supply, either the two wire connection from the base unit or through the USB port. As described above, the backplate 3504 may then be aligned using the protrusions 3402 and then secured to the thermostat stand 3506 via the threaded mounting holes 3404. After installing the backplate 3504, the head unit 3502 can be secured to the backplate using the mounting tabs 3508 and the connector 3510.

Figure 36:
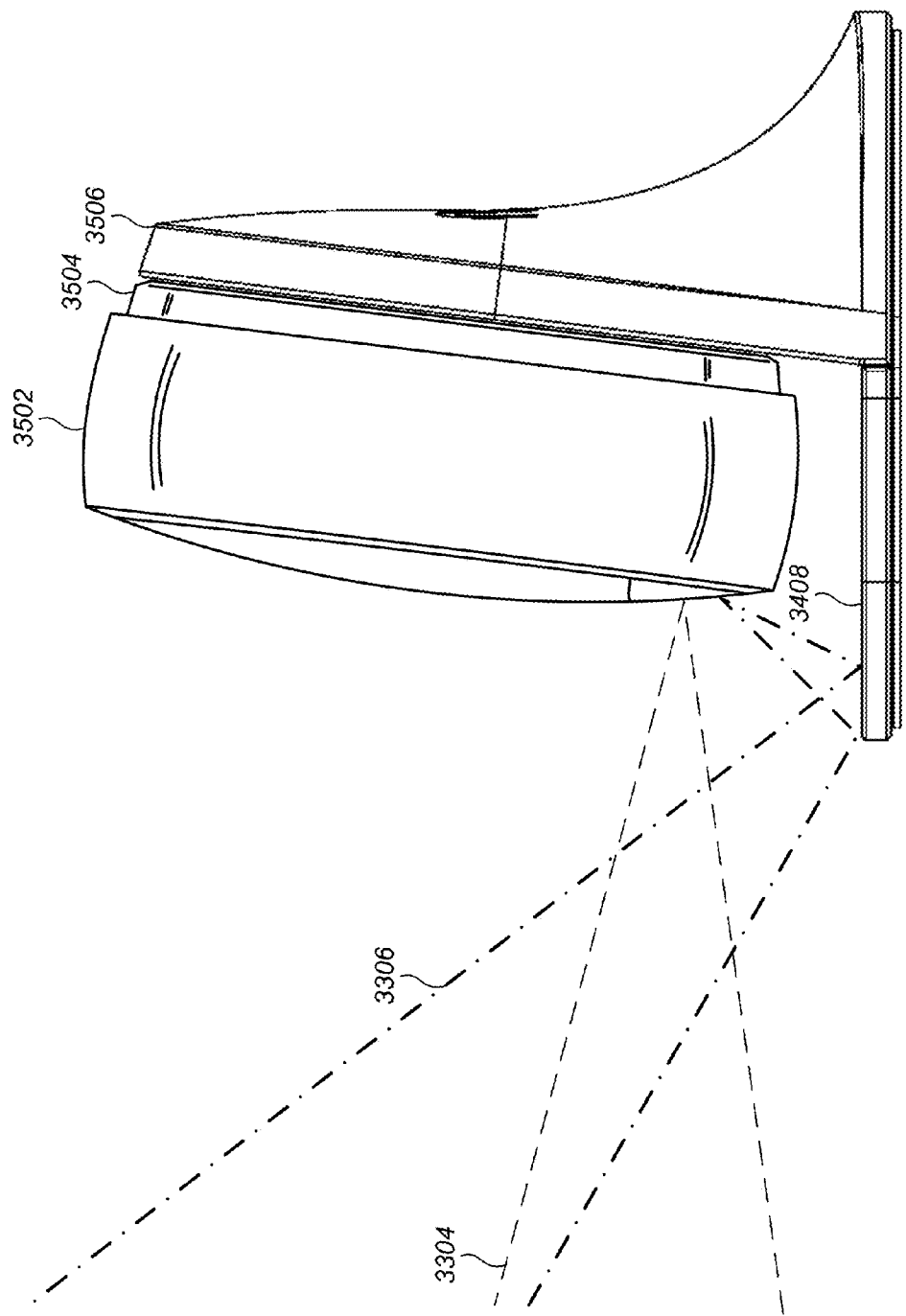
FIG. 36 illustrates a reflection diagram of signals received by a proximity sensor of an intelligent thermostat using a reflective stand, according to some embodiments.

FIG. 36 illustrates a reflection diagram of signals received by a proximity sensor of an intelligent thermostat using a reflective stand, according to some embodiments. After installation, the head unit 3502, the backplate 3504, and the thermostat stand 3506 will be mechanically secured together as a complete unit that can be set on a surface and/or moved around the room at the user's convenience. Zone 3304 from the second proximity detector is still projected outward from the head unit 3502 in the same pattern as was illustrated in FIG. 33. However, zone 3306 from the first proximity detector is now reflected off of the reflective surface 3408 such that zone 3306 is now reflected outward into the enclosure rather than towards the ground as illustrated in FIG. 33.

Algorithms were previously developed that use the responses of the two proximity detectors to detect occupancy patterns and/or approaching users intent on interacting with the thermostat. When set on a surface as illustrated in FIG. 36, the same algorithms would generally not provide reliable results without the reflective surface 3408. However, using the reflective surface 3408 on the thermostat stand 3506, the same or similar algorithms can be used to detect occupancy and/or imminent interactions with nearly the same efficiency. Algorithms for detecting occupancy patterns and/or imminent interactions with the thermostat are more fully described in U.S. Ser. No. 13/632,112, supra, and U.S. Ser. No. 13/632,070, supra.

Figure 37:
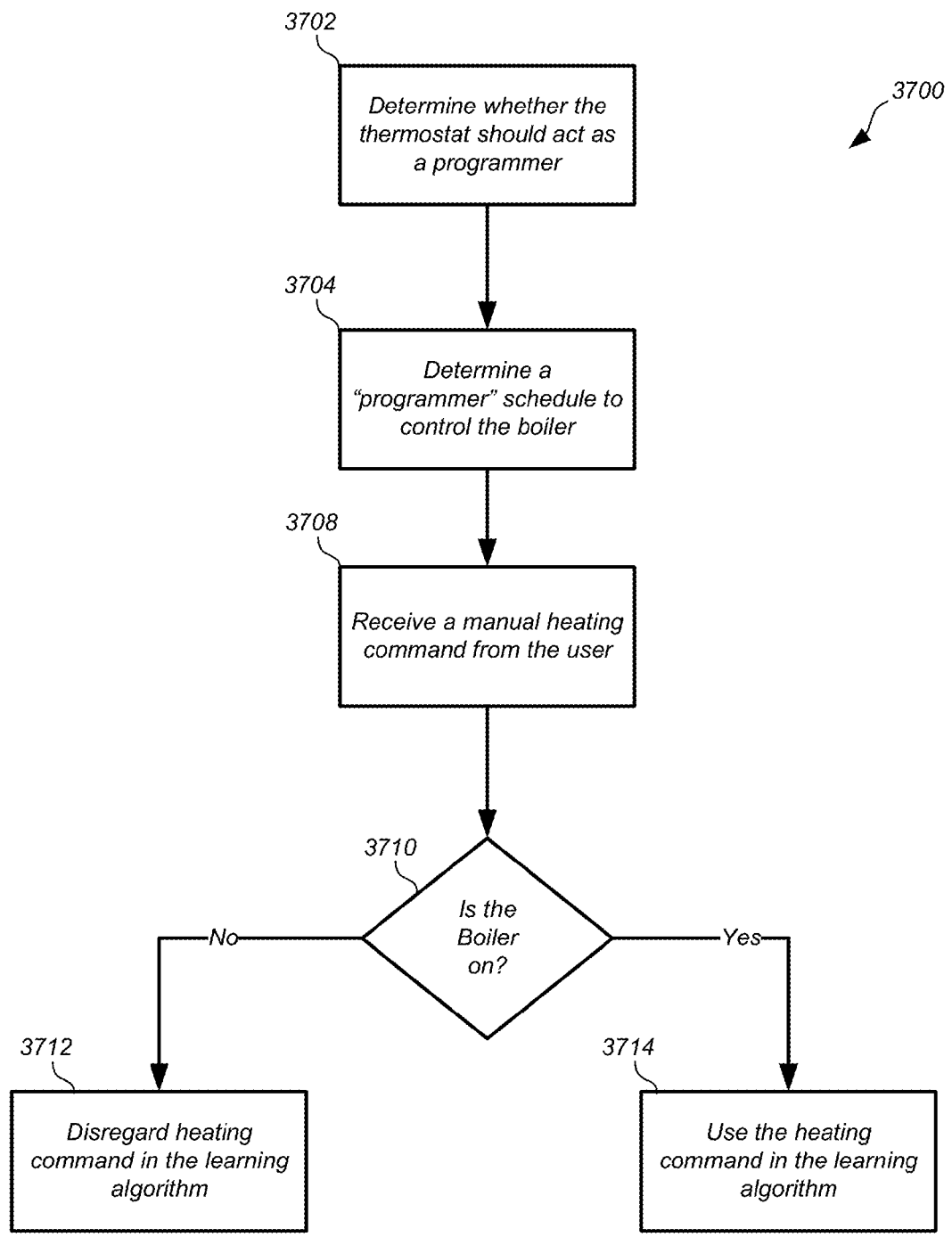
FIG. 37 illustrates a flowchart of a method for replacing a programmer with an intelligent thermostat system, according to some embodiments.
Figure 38B:
FIGS. 38A-38D illustrate examples of user interface displays that may be presented to a user during the installation process, according to some embodiments.
Figure 38D:
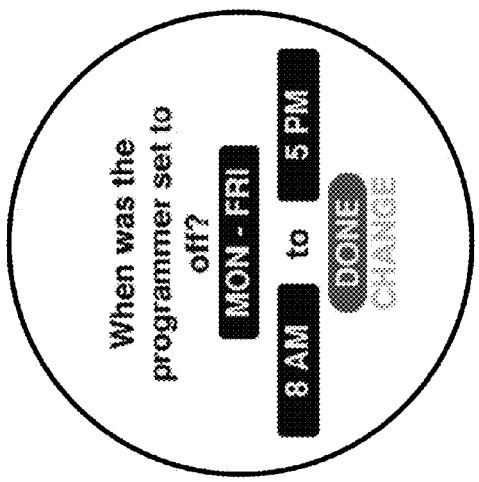
Figure 38A:
Figure 38C:
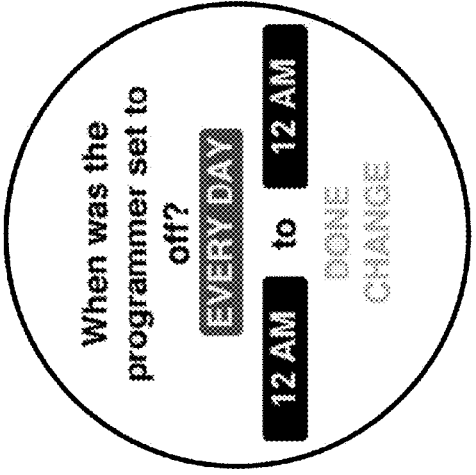

FIG. 37 illustrates a flowchart 3700 of a method for replacing a programmer with an intelligent thermostat system, according to some embodiments. As described above in relation to FIGS. 5A-5B, the intelligent thermostat system can act in conjunction with or replace an existing programmer on a boiler-based heating system. In many cases, the programmer will have previously implemented a schedule that dictated when the boiler would be on or off, and thus the user could control when water/steam was being actively heated by the boiler. During times when the enclosure was usually unoccupied or when the occupants of the enclosure were asleep, the programmer would typically turn the boiler off. The programmer would then turn the boiler back on according to the user-implement schedule when the occupants woke up or arrived home to the enclosure.

During the installation of the intelligent thermostat system, the method may include determining whether the thermostat should act as a programmer (3702). This determination may be made using a sequence of user interface displays presented to the user on a user interface of the intelligent thermostat. In some embodiments, the installation process may include an interview-style series of questions that the user can answer by rotating the outer wheel of the head unit and clicking to signify an input. One such question may explicitly ask the user whether a programmer was previously installed in the enclosure. A follow-up question could then ask the user whether they would like the intelligent thermostat system to act as a programmer and control the heating schedule of the boiler.

In another embodiment, determining whether the thermostat should act as a programmer may be made automatically without requiring user input. In configurations where the base unit is connected to the boiler through the programmer, the programmer will cut power to the base unit during times when the boiler is scheduled to turn off by the programmer. In sending routine communications to the base unit, the thermostat can detect that the base unit is unpowered when communications go unanswered. Alternatively, the base unit may detect when it is losing power and may send a message to the thermostat before local power reserves are depleted. Alternatively, if the thermostat is wired to the base unit, it may detect when the low-voltage power is removed, indicating power to the base has been removed. If the thermostat detects that the base unit is unpowered, it can automatically determine that the user intends to continue using the programmer in series with the intelligent thermostat system, and that the intelligent thermostat should not act as a programmer. Alternatively, the user could leave the programmer connected to the intelligent thermostat system during a learning period, during which the thermostat could monitor the operation of the programmer to learn its schedule. In this case, the user could provide input through the user interface of the head unit directing the thermostat to act as a programmer and learn the programmer schedule by monitoring the activity of the existing programmer. The user could then remove the programmer after the learning period is over and the thermostat has detected the programmer schedule.

The method may also include determining a programmer schedule to control the boiler (3704). When the intelligent thermostat system is configured to act as a programmer, it must then determine the times when the user wants the boiler to be off and on. In one embodiment, the user interface of the head unit can continue with the interview-style questions and ask the user about the existing programmer schedule. For example, the user could be asked questions about which days the programmer was on or off, and the hours during those days during which the programmer instructed the boiler to be active. Very complicated schedules may be designed through this user interview process. FIGS. 38A-38D illustrate examples of user interface displays that may be presented to a user during the installation process. The information presented and questions asked in each interface display may build on the information received in response to previous questions. In some embodiments, the user can enter a plurality of time intervals during which the boiler should be turned off according to the previous programmer schedule.

Turning back to FIG. 37, determining the programmer schedule may also be done automatically without requiring user inputs. As described above, the existing programmer can be left connected to the base unit during a learning interval. During this time, the thermostat can monitor when the programmer cuts power to the base unit and thereby infer times during which the programmer has directed the boiler to turn off. After a predetermined learning interval, such as one day, one week, two weeks, and/or the like, the user may be instructed by the user interface to remove the programmer and connect intelligent thermostat system directly to the boiler system.

After determining the programmer schedule by learning the schedule automatically or receiving the schedule manually from the user, the thermostat may begin operating the activity of the boiler according to the schedule. There may be times during the initial operational period of the intelligent thermostat system when the user wishes to manually call for heat during times when the boiler is off according to the programmer schedule implemented by the thermostat. Therefore, the method may further include receiving a manual heating command from the user (3708). In some instances, the manual heating command may be received through the user interface of the head unit. For example, the user may rotate the body of the head unit and adjust a setpoint temperature. In other instances, the manual heating command may be received at the base unit. For example, the user may press a button accessible on the exterior of the base unit and manually call for heat.

The method may further include determining whether the boiler is on or off according to the programmer schedule (3710). During times when the boiler is on, the thermostat may operate normally and cause the boiler to circulate heated water/steam through the enclosure, for example, by opening a valve to a particular zone controlled by the thermostat. During times when the boiler is off according to the programmer schedule implemented by the thermostat, the base unit can cause the boiler to actively heat water/steam and begin to circulate such through the enclosure. In effect, receiving the manual heating command allows the user to override the preset programmer schedule implemented by the thermostat and call for heat at any time.

In addition to causing the boiler to heat/provide water/steam to the enclosure in response to a manual call for heat, other operations of the thermostat may also be affected according to the programmer schedule implemented by the thermostat. The intelligent thermostat system can use a learning algorithm to automatically establish and adjust setpoint temperatures for regulating the temperature within the enclosure. During the initial operational interval of the thermostat after installation, the learning algorithm can monitor setpoint temperatures as entered by the user and automatically create and schedule setpoint temperatures that are dynamically adjusted over time to mimic the user's setpoint temperatures that were sent manually. After learning the user schedule, the thermostat can automatically adjust the setpoint temperatures based on what it has learned without requiring the user to manually adjust the schedule or manually program the thermostat. One learning algorithm is described in detail in the commonly assigned U.S. Pat. No. 8,630,740, which is incorporated by reference herein.

Because the learning algorithm uses manual adjustments of the setpoint temperature to create a temperature schedule, each interaction with the thermostat is typically used by the learning algorithm. However, when the thermostat is also implementing a programmer schedule, it is possible that the user will manually call for heat during times when the boiler is off. Some embodiments may disregard the heating command in the learning algorithm (3712) when the boiler is off. In these cases, there is a conflict between what may be a user-implemented programmer schedule and a single interaction with the thermostat. In some embodiments, disregarding the heating commands when the boiler is off may only occur during an initial learning interval of the thermostat's operation. For example, during the first two weeks after installation, manual heating commands may be disregarded by the learning algorithm when the boiler is on, but after two weeks these manual commands may be used by the learning algorithm to adjust both the setpoint temperatures and the programmer schedule implemented by the thermostat. After the initial learning interval, or during times when the boiler is on, the manual heating commands may generally be regarded by the learning algorithm as a valid input and adjust the schedule accordingly (3714).

Figure 39A:
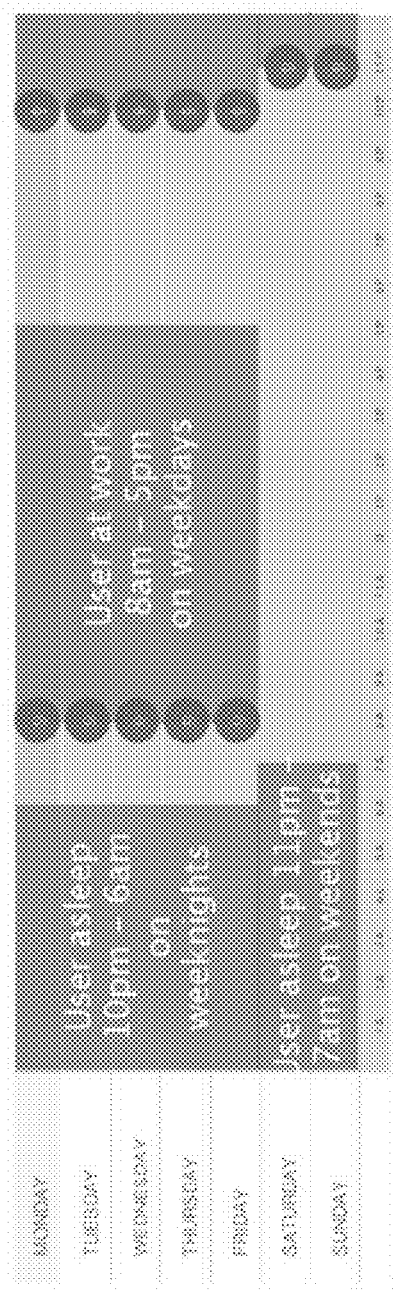
FIGS. 39A-39B illustrate setpoint temperature schedules, according to some embodiments.

FIG. 39A illustrates a setpoint temperature schedule implementing a programmer schedule. In this embodiment, the programmer schedule is implemented using the normal temperature setpoint schedule that would be generated by the learning algorithm of the thermostat. Intervals where the programmer would have turned the boiler off are set to a very low safety temperature, such as 9° C. By setting this low temperature during intervals when the user indicated they would be away from the enclosure or sleeping, the boiler will be deactivated by the thermostat unless the temperature in the enclosure dips below the safety temperature. In these cases, the thermostat can turn the boiler on to avoid freezing pipes or other environmental hazards.

Figure 39B:
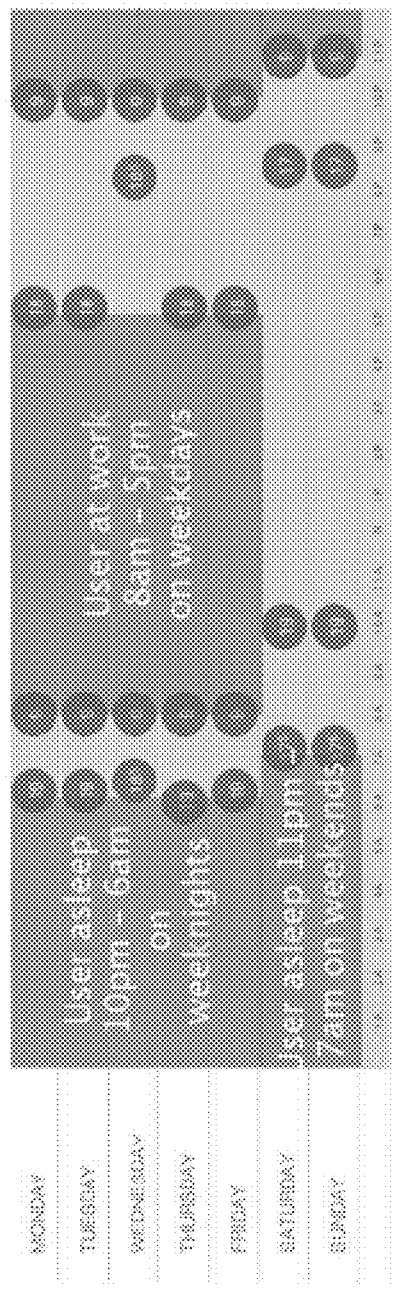

By using the same schedule as the learning algorithm, the learning algorithm can populate the remaining setpoint temperatures based on user interactions with the thermostat. FIG. 39B illustrates the same setpoint temperature schedule as FIG. 39A that also includes temperature setpoints populated by the learning algorithm. Note that the 9° C. setpoints directing the boiler to turn off have been preserved as the learning algorithm operates. However, additional setpoints may be added (18°, 19°, 17°, etc.) as the learning algorithm monitors user behavior. Note that after the learning interval is over, and manual heating adjustments while the boiler is off are allowed to affect the temperature setpoint schedule, the 9° C. temperature setpoints may also be adjusted.

For clarity of description, time intervals for which the now-bypassed programmer had previously maintained the boiler in an "off" state are referenced hereinbelow as "previous-programmer-off" time intervals. For further clarity of description, the schedule setpoints corresponding to the previous-programmer-off time intervals, such as the 9 degree C. setpoints of FIGS. 39A-39B, are referenced hereinbelow as previous-programmer-off setpoints. According to one embodiment, learning algorithms such as those described in U.S. Pat. No. 8,630,740, supra, are configured to treat the previous-programmer-off setpoints as being largely immutable, in a manner similar to the way that schedule-interface setpoints are treated. Briefly stated, according to one or more methods similar to those described in U.S. Pat. No. 8,630,740, supra, schedule-interface setpoints are setpoints that have been directly entered, according to their desired setpoint time and setpoint temperature value, by the user using the scheduling facility of the thermostat user interface and/or the smartphone/tablet/browser user interface. In contrast, many of the other setpoints in the schedule of the intelligent schedule can be called "learned setpoints" that are the result of the application of a schedule learning algorithm to immediate-control inputs (e.g., the user walks up to the dial and changes the current setpoint temperature, or uses their smartphone/tablet/browser to change the current setpoint temperature) and/or to other sensed or received inputs that could be suggestive of a desirable ambient temperature condition. It being found that most users are more satisfied with the intelligent thermostat when their schedule-interface setpoints are maintained regardless of their subsequent behaviors, the preferred learning algorithms are designed to maintain schedule-interface setpoints until such time as the user actually alters or removes them later using the scheduling facility. Thus, according to one embodiment, the previous-programmer-off setpoints are maintained and are not altered by the thermostat's schedule learning algorithms, remaining as they are until such time as the user actually goes into the scheduling facility and removes or alters them. According to a different embodiment, the previous-programmer-off setpoints are treated like schedule-interface setpoints for a first fixed time period, such as two weeks, but are then treated as "ordinary" learned setpoints thereafter by the automated schedule learning algorithms, being changeable as a function of user immediate-control inputs or other sensed user or household behaviors. In still another embodiment, a multiple-staged approach is provided, wherein the previous-programmer-off setpoints are treated like schedule-interface setpoints for a first fixed time period, such a week or two, then treated a little bit less like schedule-interface setpoints and more like ordinary learned setpoints for a send time period, such as a week or two, and then treated as "ordinary" learned setpoints thereafter by the automated schedule learning algorithms. For purposes of description, one might think of the learning thermostat's schedule setpoints a having differing degrees of "stickiness" or resistance to being changed by the schedule learning algorithms, with ordinary learned setpoints having a relatively low degree of stickiness, and with schedule-interface setpoints being extremely sticky. According to still other embodiments, the stickiness of the "previous-programmer-off" setpoints can be gradually altered over time, on a many-staged or even continuous basis, from being very highly sticky to less sticky as time goes by.

As described above, pressing the button on the base unit may direct the intelligent thermostat system to begin heating regardless of the state of the boiler. In some embodiments, pressing the button may turn the boiler on and circulate heated water/steam for a predetermined time interval, such as one hour. In other cases, pressing the button may turn the boiler on and circulate heated water/steam until a second press of the button directs the intelligent thermostat system to turn the boiler off again. In other cases, pressing the button may turn the boiler on and may leave the boiler on until the thermostat directs the boiler to turn off according to the temperature setpoint schedule, such as the schedule illustrated in FIG. 39B.

Figure 40:
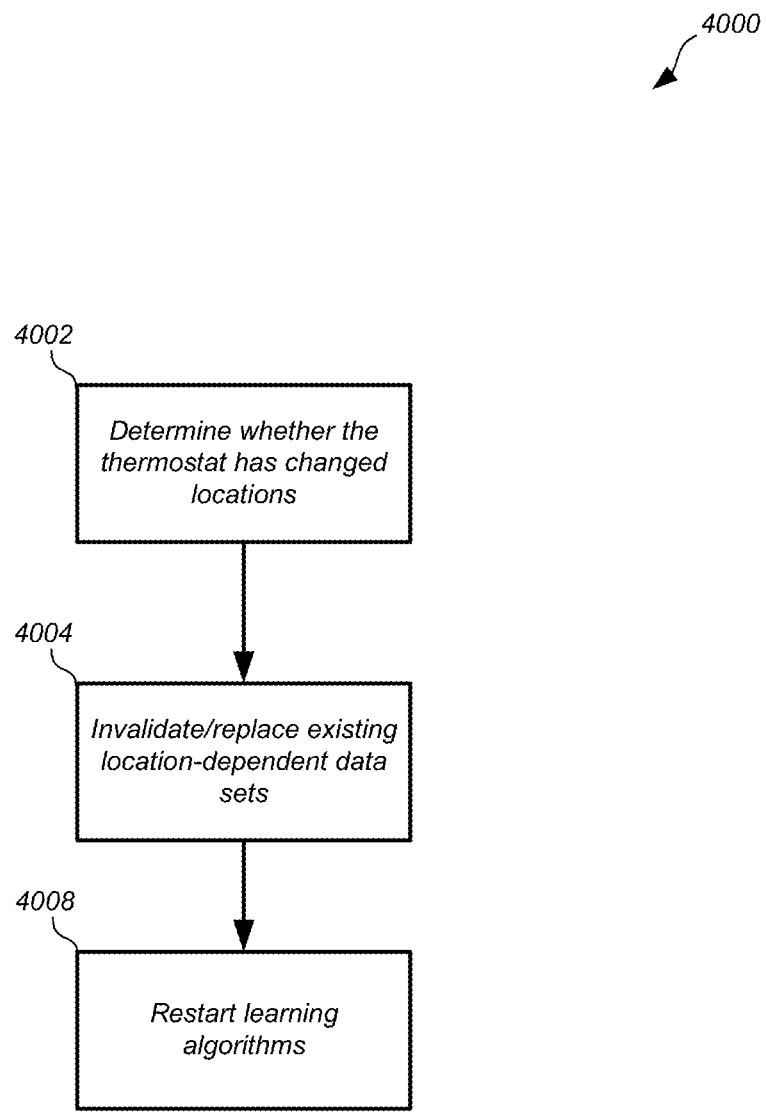
FIG. 40 illustrates a flowchart of a method for compensating for movement of an intelligent thermostat, according to some embodiments.

FIG. 40 illustrates a flowchart 4000 of a method for compensating for movement of an intelligent thermostat, according to some embodiments. In installation configurations where the thermostat is mounted to the wall, it may be very unlikely that the thermostat will move during its operational lifetime. However, in installation configurations where the thermostat is placed on a surface, possibly using the intelligent thermostat stand described above, it may be more likely that the thermostat will move within a room of an enclosure, or even between rooms within the enclosure.

As described above, an intelligent thermostat system may include many features that rely on gathering user data automatically over time, analyzing the user data with specific algorithms, and implementing thermostat actions based on the analyzed user data. For example, intelligent thermostat systems may use one or more proximity sensors to detect when a home is unoccupied and automatically adjust the temperature accordingly. This feature may be referred to as an "auto away" feature. Additionally, a "time-to-temperature" algorithm analyzes the thermal inertia of a room and determines how long it will take to transition the ambient air temperature between temperature setpoints. Other features, such as automatic sunlight correction, automatic self-heating correction, sensor confidence algorithms, user profiles, and/or the like, may rely on learning algorithms based on collected user data. Also, sensor data may measure thermal properties of the enclosure or environmental conditions. User data along with other sensor responses may be referred to herein as "parameters."

The results of the learning algorithms are typically valid as long as the thermostat stays mounted in the same location, and may occasionally remain valid so long as the thermostat is in the same room of the enclosure. However, when the intelligent thermostat is moved from one room to another room within the enclosure, the thermal characteristics of the room may change, the ability of sensors to correctly detect occupancy patterns and user interactions may change, the effect of other environmental conditions may increase or decrease, and/or the temperature schedule may no longer be relevant. In short, the user data analyzed by the learning algorithms may no longer be valid, and the thermostat features based on the analyzed user data may no longer operate as a user expects.

In order to compensate for thermostat movements, a method may include determining whether the thermostat has changed locations (4002). Determining whether the thermostat has changed locations may include receiving an indication from a user that the thermostat is moved. For example, a menu item on the user display may allow a user to provide input indicating that the thermostat is in a new location. Alternatively or additionally, the thermostat may automatically determine when it has moved based on sensor readings. For example, the intelligent thermostat may include a GPS receiver or accelerometer that could provide movement data alerting one of the processors on the thermostat that thermostat movement has likely occurred. In another example, a radio signal strength may be measured for both the Wi-Fi radio and/or the radio used to communicate between the base unit and the thermostat. Changes in the strength of the radio signal may indicate that the thermostat has moved. In another embodiment, the thermostat can detect a loss of power, such as when a user unplugs the thermostat to move the thermostat to a new room. As power is restored to the thermostat, the thermostat may automatically infer that it has moved, or automatically query the user through the user interface as to whether the thermostat has moved. In another example, an increased level of user activity in interacting with the thermostat, such as manually adjusting setpoint temperatures, may indicate that the environment has changed, i.e. users may notice that the thermostat is not operating as desired and manually adjust the temperature more often in the new room. In another example, the intelligent thermostat may determine that the thermal characteristics of the surrounding environment have changed. If temperature sensors indicate that the heating time is significantly different from the time predicted by a time-to-temperature algorithm the thermostat could automatically determine that the thermostat is in a new thermal environment.

It should be noted that detecting changes in the thermal environment can be used in situations where the thermostat has not itself moved but where the thermal characteristics of the room have changed. For example, users may install new window coverings, users may install new heating options such as radiant flooring or ceiling fans, prolonged seasonal changes may have an effect on the thermal characteristics of the enclosure, and/or the like. In these cases, this method may be used to automatically recalibrate the thresholds and time estimates calculated by the learning algorithms.

After determining whether the thermostat has changed locations (or determining that the thermal characteristics of the enclosure have changed significantly) the method may include invalidating existing location-dependent data sets (4004) and depending upon the situation, different user data sets may be invalidated (and in some cases replaced). For example, if the new location is in a room similar to the old location, the time-to-temperature data may remain valid. If the new location places the thermostat in view of the old location, then the occupancy data may still be valid. In some embodiments, the thermostat can continue operating with thresholds set by the old user data in order to determine which data sets are still valid.

After determining which data sets need to be replaced, the method may additionally include restarting the learning algorithms and collecting new user data (4008). New occupancy patterns can be detected, new thermal characteristics of the enclosure can be determined, and/or the like.

Some embodiments of the intelligent thermostat system may include other features that may be advantageous in certain circumstances. In some embodiments, the base unit may include a temperature/humidity sensor that can be used to detect dangerous conditions. For example, a temperature sensor in the base unit can be used to detect if the boiler is overheating and becoming a fire risk. A humidity sensor can be used to determine basement flooding conditions and/or conditions that may facilitate growth of mold or rot.

Some embodiments may also provide additional antenna options. For example, the internal diversity antennas may be used by default in the base unit along with a hidden antenna port to attach an external antenna with a coaxial feed cable. This allows service professionals to install a higher gain directional antenna if the internal antenna signal is not strong enough. Inserting the external antenna could automatically disable the internal antennas through a mechanical sensing fixture. For example, the external antenna connector could include a screw-down connector that has a mechanical switch to disconnect the pass-through path to the diversity antennas when an external antenna is inserted. In other embodiments, the external antenna connector may include a small shield segment that is not connected to ground. Once the external antenna is attached, the shield will short to ground. This can be detected by the internal processor and the external antenna can be selected. In other embodiments, the external antenna can simply short the antenna feed to ground as part of its construction. This allows the base unit to detect that the feed and ground are shorted once the antenna is screwed in place externally. In other embodiments, attaching the external antenna will change the impedance as seen by the power amplifier, which will change the current consumption of the amplifier. That change could be detected by the internal processor and the external antenna can be selected. In other embodiments, the base unit can use the existing wires in the wall as a waveguide to carry wireless signals to the thermostat. For example, a 2.4 GHz signal transmitted across the power line has been shown to extend wireless communication range and be compatible with wiring such as thermostat cable or plastic shielded 12AWG Romex power cable. This situation may be particularly advantageous when the building material used to separate floors in the enclosure is particularly thick or causes a high-level interference.

Figure 41:
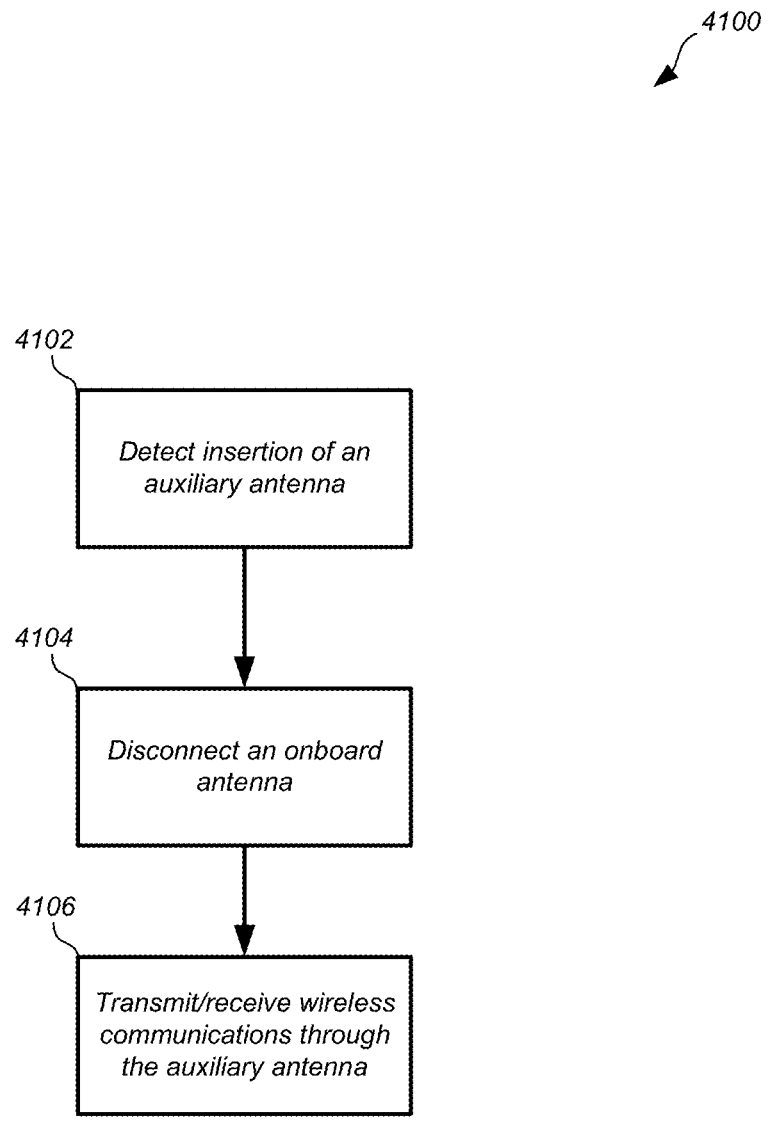
FIG. 41 illustrates a flowchart of a method for selecting between and onboard antenna and an auxiliary antenna, according to some embodiments.

FIG. 41 illustrates a flowchart 4100 of a method for selecting between and onboard antenna and an auxiliary antenna, according to some embodiments. The method may include detecting a connection of an auxiliary antenna (4102). As described in detail above, some embodiments of the base unit may include at least one onboard antenna. The onboard antenna(s) may be mounted to the base unit circuit board and located within the base unit casing. For example, the onboard antenna may comprise the pair of diversity antennas 2212 on the base unit circuit board 2016 from FIG. 22. In contrast, the auxiliary antenna may comprise an external antenna inserted during installation/testing as described above. In some embodiments, the auxiliary antenna may be permanently connected to the base unit if it is determined that the onboard antenna(s) are unable to adequately receive wireless transmissions from the head unit of the intelligent thermostat or other wireless devices.

The auxiliary antenna may be implemented using many different antenna types. For example, the auxiliary antenna may comprise a monopole antenna, a dipole antenna, a loop antenna, and/or the like. In some embodiments, the auxiliary antenna may comprise a dipole coaxial antenna that is connected to the base unit through a coaxial insertion point. The auxiliary antenna may be connected to the base unit by inserting a jack into a base unit receptacle. The auxiliary antenna may also be connected to the base unit using a mated pair of BNC connectors. In some embodiments, the auxiliary antenna may be screwed into a threaded receptacle in the base unit. Note that these examples are listed for illustrative purposes only, and not meant to be limiting. Any mechanical connection may be used to connect the auxiliary antenna to the base unit.

Connection of the auxiliary antenna can be detected in many different ways. Some embodiments may employ mechanical sensing systems to mechanically detect a physical connection of the auxiliary antenna to the base unit. For example, separation switches or contact switches may be used to detect when the auxiliary antenna is inserted into the base unit, screwed to the base unit, or otherwise coupled to the base unit. Additionally or alternatively, some embodiments may employ electrical sensing systems to electrically detect the presence of an auxiliary antenna. One such electrical sensing system will be described in detail below in relation to FIGS. 42A-42B.

The method may also include disconnecting an onboard antenna (4104). The onboard antenna may be disconnected by activating a mechanical or electrical switch in order to disconnect the onboard antenna from the base unit wireless communication module (including, for example, the base unit radio 2208 and the front end module 2210 from FIG. 22). In some embodiments, the onboard antenna may be disconnected by instructing the base unit wireless communication module to no longer send or receive communications through the onboard antenna. Therefore, disconnecting the onboard antenna may encompass an electrical and/or mechanical disconnection.

The method may additionally include transmitting/receiving wireless communications through the auxiliary antenna (4106). Transmitting/receiving wireless communications through the auxiliary antenna may occur automatically once the onboard antenna is disconnected. In some embodiments, the base unit wireless communication module can automatically redirect communications through pins connected to the auxiliary antenna. In some embodiments, the base unit wireless communication module can use a single pin to send/receive wireless transmissions and electrical/mechanical switches outside of the base unit wireless communication module can select between the auxiliary antenna and the onboard antenna.

The method may further include detecting the removal of the auxiliary antenna, reconnecting the onboard antenna, and transmitting/receiving wireless communications through the onboard antenna. Generally, the process of switching from the auxiliary antenna back to the onboard antenna may follow the reverse procedure as described above. For example, electrical/mechanical sensing circuits can detect the removal of the auxiliary antenna, and electrical/mechanical switches can reconnect to the onboard antenna. The base unit wireless communication module can then again begin transmitting/receiving wireless communications through the onboard antenna.

Although this method of switching between an auxiliary antenna and an onboard antenna is described in relation to the intelligent thermostat system of this disclosure, all embodiments need not be so limited. In general, this method of detecting and switching between antennas could be used in any wireless communication system. For example, the smart home depicted in FIG. 1 may include many intelligent sensor devices that communicate wirelessly throughout an enclosure. Any of these wireless sensor devices may benefit from this antenna switching method during installation, testing, and/or normal operation.

FIG. 42 illustrates a circuit diagram 4200 of a system for selecting between an auxiliary antenna and an onboard antenna, according to some embodiments. For exemplary purposes, the circuit diagram 4200 may be implemented in the base unit of the intelligent thermostat system described herein. The base unit circuit board 2016 includes a wireless communication module 4220 which may be include the base unit radio 2208 and the front end module 2210 from FIG. 22. Other embodiments may use different wireless communication modules. During operation without an auxiliary antenna, the wireless communication module 4220 can transmit/receive wireless communication signals through the onboard antenna(s), such as the pair of diversity antennas 2212 on the base unit circuit board 2016.

As described above, the pair of diversity antennas 2212 may be oriented at 90° angles such that one of the pair of diversity antennas 2212 may have better reception than the other. In some embodiments, the wireless communication module 4220 can select one of the pair of diversity antennas 2212 and thereafter communicate through the selected antenna. When switching between an onboard antenna and an auxiliary antenna, the wireless communication module 4220 can use a switch 4218 to disconnect one or both of the pair diversity antennas 2212. The switch 4218 can be implemented with a FET switch or a mechanical relay.

In some embodiments, the auxiliary antenna may comprise a coaxial dipole antenna 4202. The coaxial dipole antenna can be connected to the base unit circuit board 2016 through a BNC connector or any other type of coaxial connector. For purposes of illustration, the coaxial dipole antenna connector is expanded to show connectors 4206 and 4210 for the coaxial dipole antenna 402 that can be mated with the connectors 4208 and 4212 of the base unit circuit board 2016.

In order to detect the connection of the coaxial dipole antenna 4202, connectors 4208 and 4212 can be connected to pins 4222 and 4224 of the wireless communication module 4220, respectively. Pin 4224 can also be connected to a DC voltage, such as $V_{cc}$. In some embodiments, pin 4224 can be connected to the voltage through an impedance 4214. Similarly, pin 4222 can be connected to ground, and this connection can be through an impedance 4216 in some embodiments. The ground may comprise a backplane ground and/or a reflective ground for the pair of diversity antennas 2212. For example, the ground may comprise a ground plane on the underside of the base unit circuit board 2016.

When the coaxial dipole antenna 4202 is not connected to the base unit circuit board 2016, the DC voltage at pin 4222 will be approximately ground (0 V). The wireless communication module 4220 can read the voltage at pin 4222, and if the voltage at pin 4222 is approximately ground, then the wireless communication module 4220 can determine that the coaxial dipole antenna 4202 is not connected to the base unit circuit board 2016, and therefore that the wireless communication module 4220 should transmit/receive wireless communications through the pair of diversity antennas 2212 through switch 4218.

The coaxial dipole antenna 4202 may include a circuit element 4204 that connects connector 4210 to connector 4206. The circuit element 4204 may comprise a wire, an inductor, or any other conductive material or circuit element. In some embodiments, the circuit element 4204 can be sized to operate like a quarter-wave ($\lambda$/4) impedance transformer. For example, the circuit element 4204 can be sized such that the path from pin 4224 through connectors 4212 and 4210, through circuit element 4204, through connectors 4206 and 4208, to pin 4222 is approximately ½ wavelength. For example, if the wireless communication module 4220 operates at 2.4 GHz corresponding to a wavelength of 12.5 cm, then the circuit element 4204 can be sized such that the length of the path described above can be approximately 6.25 cm. By sizing the circuit element 4204 to operate as a quarter-wave impedance transformer, the circuit element 4204 can provide a DC short between connector 4210 and connector 4206. The $\lambda$/4 wave transformer will transform the short circuit into an open circuit which has no effect on the RF signals on the line. Likewise, an open circuit can be transformed into a short circuit for RF signals. Therefore, the circuit element 4204 will look like an open circuit to the RF emissions of the wireless communication module 4220.

When the coaxial dipole antenna 4202 is connected to the base unit circuit board 2016, the DC voltage at pin 4222 will measure a voltage higher than ground. The exact voltage will depend upon the ratio of impedance 4214 and impedance 4216. Thus, the wirelessly communication module 4220 can read the voltage at pin 4222. If this voltage is higher than ground (or close to a known voltage determined by the impedance ratio), then the wireless communication module 4220 can determine that the coaxial dipole antenna 4202 is connected to the base unit circuit board 2016. In response, the wireless communication module 4222 can open switch 4218 and thereby disconnect the pair of diversity antennas 4212. Therefore, when the coaxial dipole antenna 4202 is connected to the base unit circuit board 2016, the circuit element 4204 will provide a short circuit for DC signals, while simultaneously providing an open circuit for RF signals. A single pair of pins 4222 and 4224 can be used to both send and receive RF transmissions from the wireless communication module 4220 and to detect a connection of the coaxial dipole antenna 4202.

Figure 42A:
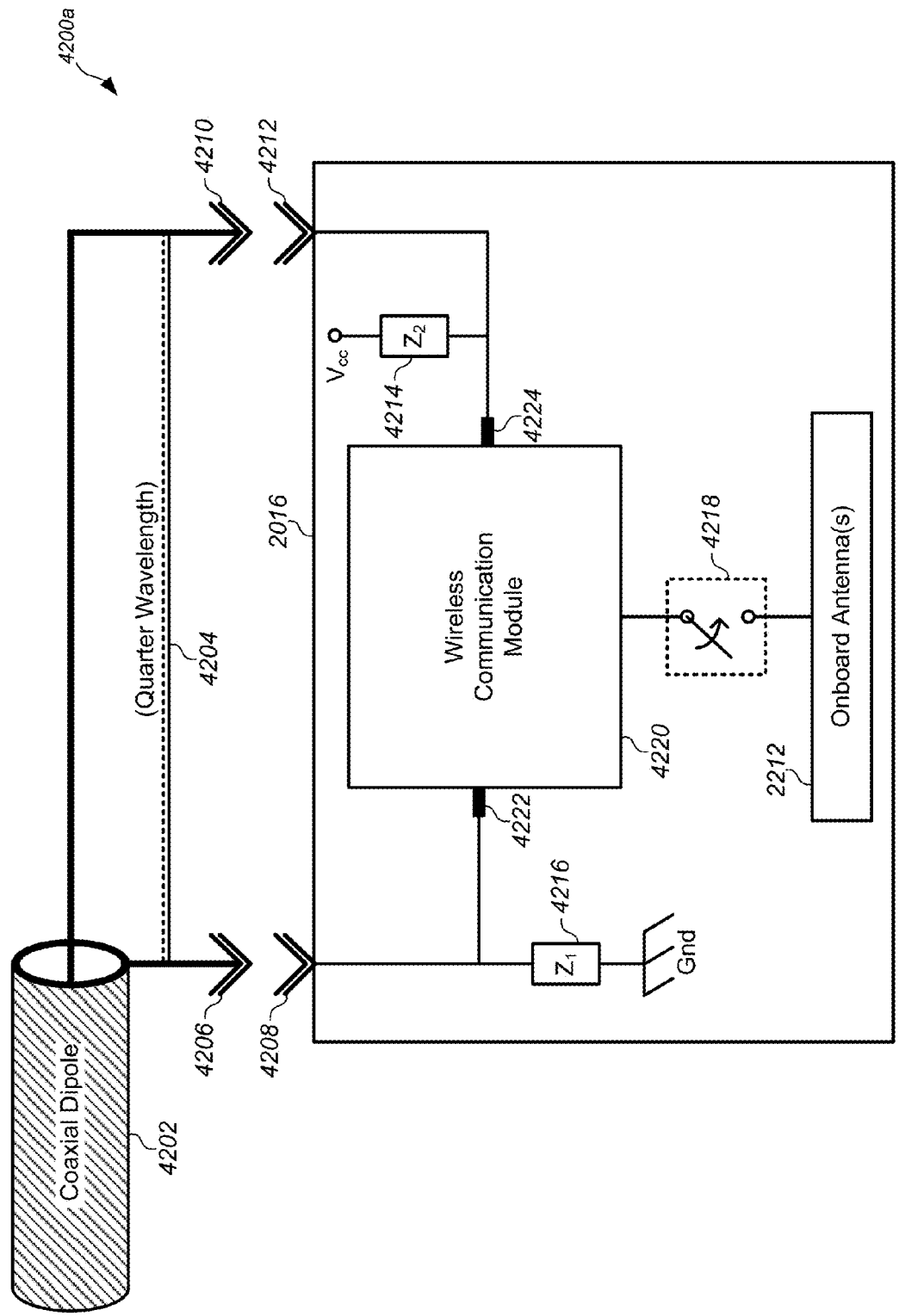
FIG. 42A illustrates a circuit diagram of a system for selecting between an auxiliary antenna and an onboard antenna, according to some embodiments.

The circuit arrangement of FIG. 42A may offer several advantages. First, the mere connection of the coaxial dipole antenna 4202 can automatically cause the wireless communication module 4220 to disconnect the pair of diversity antennas 4212. Additionally, the number of pins on the wireless communication module required for such operations can be minimized. It will be understood that the circuit arrangement of FIG. 42A is merely exemplary and not meant to be limiting. Many other hardware/software embodiments of the general method described in relation to FIG. 41 will be readily apparent in light of this disclosure.

Figure 42B:
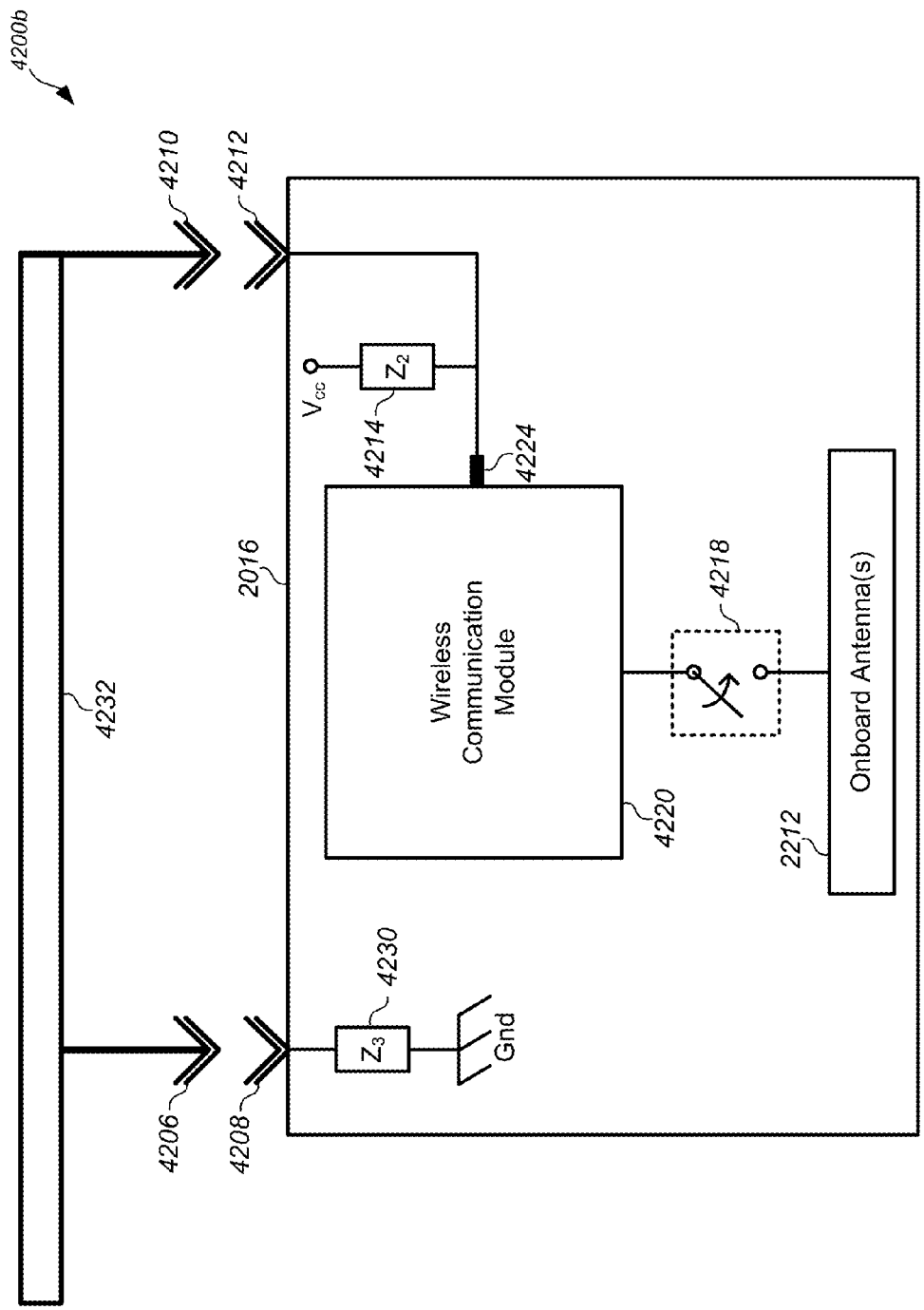
FIG. 42B illustrates a circuit diagram of a system for selecting between an auxiliary antenna and an onboard antenna, according to some embodiments.

FIG. 42B illustrates a circuit diagram 4200b of a system for selecting between an auxiliary antenna and an onboard antenna, according to some embodiments. Circuit diagram 4200b may be considered a more general circuit than the specific implementation illustrated in circuit diagram 4200a. In circuit diagram 4200b, the antenna 4232 need not be a coaxial dipole antenna. Instead, the antenna 4232 can be generalized as any antenna—such as an Inverted-F Antenna (IFA), a Planar Inverted-F Antenna (PIFA)—that will produce a DC ground at the RF "feed point" of connector 4212.

In circuit diagram 4200b, pin 4224 can be used to detect whether or not the antenna 4232 is connected externally. When the antenna 4232 is disconnected, pin 4224 will sense a Vcc voltage pulled up through impedance 4214. When the antenna 4232 is connected, the antenna 4232 will produce a DC ground at pin 4224 through impedance 4230 and the antenna 4232. As described above, the antenna 4232 can be configured to produce an RF open circuit between connectors 4206 and 4210.

It should be noted that the circuit examples illustrated in FIGS. 42A-42B are merely exemplary and not meant to be limiting. Other embodiments may implement the principle of connecting an external antenna to produce a DC ground or voltage using different circuit elements and/or arrangements. For example, the Vcc and Gnd signals may be reversed in FIG. 42B, additional impedances may be added, the switch 4218 may be combined with the output of pin 4224 such that only a single RF output needs to be provided by the wireless communication module 4220, and so forth. Many other circuit arrangements would be readily apparent to one having skill in the art in light of this disclosure.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A control system flexibly adapted for retrofit use with multiple types of pre-existing boiler-based heating systems, the control system comprising:
   a boiler control device for coupling to a boiler;
   a thermostat device having a processor and a memory and being in wireless communication with the boiler control device; and
   a user-movable stand for holding the thermostat device, wherein:
   the thermostat device is configured to learn a heating schedule according to an automated schedule learning algorithm that processes inputs including user inputs and occupancy sensing inputs and derives schedule-affecting parameters therefrom that are processed to compute the heating schedule;
   the thermostat includes circuitry for determining whether the thermostat has been moved to a new location and for determining one or more parameters associated with the new location; and
   the thermostat establishes a new heating schedule for the new location, and wherein zero or more of said previously measured schedule-affecting parameters are re-used based on the one or more parameters associated with the new location.

2. The control system of claim 1 wherein the thermostat device receives an indication from a user through a user interface that the thermostat device has been moved to the new location.

3. The control system of claim 1 wherein the circuitry for determining whether the thermostat device has been moved to a new location comprises an accelerometer.

4. The control system of claim 1 wherein the circuitry for determining whether the thermostat device has been moved to a new location comprises a power sensing circuit for detecting a loss of power to the thermostat device.

5. The control system of claim 1 wherein, prior to establishing the new heating schedule for the new location, the thermostat device receives an indication from a user through a user interface directing the thermostat device to establish the new heating schedule for the new location instead of continuing to use the heating schedule.

6. The control system of claim 1 wherein the zero or more of said previously measured schedule-affecting parameters comprises at least one schedule-affecting parameter.

7. The control system of claim 1 wherein the schedule-affecting parameters comprise a thermal characterization of a room of an enclosure.

8. The control system of claim 1 wherein the schedule-affecting parameters are used by the thermostat device to determine a time-to-temperature estimate between a measured ambient temperature and a received setpoint temperature.

9. A thermostat device flexibly adapted for relocation within an enclosure, the thermostat comprising:
a communication module configured to send control signals to a boiler control device for selectively controlling the activation of a boiler-based heating system;
a user interface;
one or more environmental sensors; and
a processing system configured to:
learn a heating schedule at a first location according to an automated schedule learning algorithm that processes inputs including user inputs and occupancy sensing inputs and derives schedule-affecting parameters therefrom that are processed to compute the heating schedule;
determine whether the thermostat has been moved to a new location;
if it is determined that the thermostat has been moved to the new location, then determine one or more parameters associated with the new location and establish a new heating schedule for the new location, and wherein zero or more of said previously measured schedule-affecting parameters are re-used based on the one or more parameters associated with the new location.

10. The thermostat device of claim 9 wherein the thermostat device receives an indication from a user through a user interface that the thermostat device has been moved to the new location.

11. The thermostat device of claim 9 wherein circuitry for determining whether the thermostat device has been moved to a new location comprises an accelerometer.

12. The thermostat device of claim 9 wherein circuitry for determining whether the thermostat device has been moved to a new location comprises a power sensing circuit for detecting a loss of power to the thermostat device.

13. The thermostat device of claim 9 wherein, prior to establishing the new heating schedule for the new location, the thermostat device receives an indication from a user through a user interface directing the thermostat device to establish the new heating schedule for the new location instead of continuing to use the heating schedule.

14. The thermostat device of claim 9 wherein the zero or more of said previously measured schedule-affecting parameters comprises at least one schedule-affecting parameter.

15. The thermostat device of claim 9 wherein the schedule-affecting parameters comprise a thermal characterization of a room of an enclosure.

16. The thermostat device of claim 9 wherein the schedule-affecting parameters are used by the thermostat device to determine a time-to-temperature estimate between a measured ambient temperature and a received setpoint temperature.

17. A method of detecting and adapting to location changes within an enclosure by a thermostat device, the method comprising:
learning, by the thermostat device, a heating schedule at a first location according to an automated schedule learning algorithm that processes inputs including user inputs and occupancy sensing inputs and derives schedule-affecting parameters therefrom that are processed to compute the heating schedule;
sending, by the thermostat device, control signals to a boiler control device for selectively controlling the activation of a boiler-based heating system based on the heating schedule;
determining, by the thermostat device, whether the thermostat has been moved to a new location;
if it is determined that the thermostat has been moved to the new location, then determining one or more parameters associated with the new location and establish a new heating schedule for the new location, and wherein zero or more of said previously measured schedule-affecting parameters are re-used based on the one or more parameters associated with the new location; and
sending, by the thermostat device, control signals to the boiler control device for selectively controlling the activation of a boiler-based heating system based on the new heating schedule.

18. The method of claim 17 further comprising receiving, by the thermostat device, an indication from a user through a user interface that the thermostat device has been moved to the new location.

19. The method of claim 17 wherein circuitry for determining whether the thermostat device has been moved to a new location comprises an accelerometer.

20. The method of claim 17 wherein circuitry for determining whether the thermostat device has been moved to a new location comprises a power sensing circuit for detecting a loss of power to the thermostat device.

* * * * *